US009546299B2

(12) United States Patent
Gesford et al.

(10) Patent No.: US 9,546,299 B2
(45) Date of Patent: Jan. 17, 2017

(54) SUPERHYDROPHOBIC AND OLEOPHOBIC COATINGS WITH LOW VOC BINDER SYSTEMS

(71) Applicant: Ross Technology Corporation, Leola, PA (US)

(72) Inventors: Josh Gesford, York, PA (US); Michael Hurley, Lancaster, PA (US); Andrew K. Jones, Lancaster, PA (US); Boon Chan Lor, Denver, PA (US); Vinod K. Sikka, Oak Ridge, TN (US); Phillip Harsh, Gilbertsville, PA (US)

(73) Assignee: Ross Technology Corporation, Leola, PA (US)

( * ) Notice: Subject to any disclaimer, the term of this patent is extended or adjusted under 35 U.S.C. 154(b) by 0 days.

(21) Appl. No.: 13/972,034

(22) Filed: Aug. 21, 2013

(65) Prior Publication Data

US 2014/0087134 A1 Mar. 27, 2014

Related U.S. Application Data

(63) Continuation of application No. PCT/US2012/025982, filed on Feb. 21, 2012.

(60) Provisional application No. 61/445,001, filed on Feb. 21, 2011.

(51) Int. Cl.
C09D 175/04 (2006.01)

(52) U.S. Cl.
CPC ...... C09D 175/04 (2013.01); *Y10T 428/24355* (2015.01)

(58) Field of Classification Search
CPC ....... C09D 5/00; C09D 125/10; C09D 7/1266; C09D 7/1275; C09D 7/1283; C09D 125/06; C09D 7/1225; C08K 3/08; C08K 3/22; C08K 5/1525
USPC ...................................... 428/141
See application file for complete search history.

(56) References Cited

U.S. PATENT DOCUMENTS

| 870,439 | A | 11/1907 | Kade |
| 2,191,701 | A | 2/1940 | Wood |
| 2,976,386 | A | 3/1961 | Salton |
| 3,185,426 | A | 5/1965 | Bjerke |
| 3,212,106 | A | 10/1965 | Noel |
| 3,244,541 | A | 4/1966 | Fain et al. |
| 3,354,022 | A | 11/1967 | Dettre et al. |
| 3,579,540 | A | 5/1971 | Ohlhausen |
| 3,716,502 | A | 2/1973 | Loew |
| 3,931,428 | A | 1/1976 | Reick |
| 3,950,588 | A | 4/1976 | McDougal |
| 3,963,349 | A | 6/1976 | Albright et al. |
| 3,967,030 | A | 6/1976 | Johnson et al. |
| 3,975,197 | A | 8/1976 | Mikelsons |
| 3,976,572 | A | 8/1976 | Reick |
| 3,980,153 | A | 9/1976 | Andrews |
| 4,142,724 | A | 3/1979 | Reick |
| 4,151,327 | A | 4/1979 | Lawton |
| 4,199,142 | A | 4/1980 | Reick |
| 4,301,197 | A | 11/1981 | Franz et al. |
| 4,301,213 | A | 11/1981 | Davies |
| 4,308,353 | A | 12/1981 | Saito et al. |
| 4,311,755 | A | 1/1982 | Rummel |
| 4,377,665 | A | 3/1983 | Shiraki et al. |
| 4,397,988 | A | 8/1983 | Sherman |
| 4,415,405 | A | 11/1983 | Ruddle et al. |
| 4,451,619 | A | 5/1984 | Heilmann et al. |
| 4,453,533 | A | 6/1984 | Scheidler et al. |
| 4,474,852 | A | 10/1984 | Craig |
| 4,492,217 | A | 1/1985 | Scheidler |
| 4,536,454 | A | 8/1985 | Haasl |
| 4,581,149 | A | 4/1986 | Horodysky et al. |
| 4,591,530 | A | 5/1986 | Lui |
| 4,614,464 | A | 9/1986 | Christensen |
| 4,622,702 | A | 11/1986 | Allen |
| 4,624,900 | A | 11/1986 | Fau |
| 4,646,948 | A | 3/1987 | Jennings |
| 4,680,173 | A | 7/1987 | Burger |
| 4,687,707 | A | 8/1987 | Matsuo et al. |
| 4,716,183 | A | 12/1987 | Gamarra et al. |
| 4,733,843 | A | 3/1988 | Bessinger |
| 4,738,426 | A | 4/1988 | Bessinger |
| D295,950 | S | 5/1988 | Johnston |
| 4,745,139 | A | 5/1988 | Haasl et al. |
| 4,749,110 | A | 6/1988 | Maeno et al. |
| 4,753,977 | A | 6/1988 | Merrill |

(Continued)

FOREIGN PATENT DOCUMENTS

| CA | 1 002 256 B | 12/1976 |
| CA | 2175848 A1 | 12/1996 |

(Continued)

OTHER PUBLICATIONS

International Search Report and Written Opinion, International Application No. PCT/US12/25982 (published as International Publication No. WO 2012/115986) (Jun. 13, 2012) (9 pages).
U.S. Appl. No. 60/699,200, filed Jul. 14, 2005, Guire et al. (Innovative Surface Technologies, Inc.).
U.S. Appl. No. 60/807,143, filed Jul. 12, 2006, Guire et al. (Innovative Surface Technologies, Inc.).
U.S. Appl. No. 60/891,876, filed Feb. 27, 2007, Lawin et al. (Innovative Surface Technology, Inc.).
U.S. Appl. No. 61/058,902, filed Jun. 4, 2008, Driver et al.
U.S. Appl. No. 61/090,002, filed Aug. 19, 2008, Driver et al.
U.S. Appl. No. 61/133,273, filed Jun. 27, 2008, Driver et al.
U.S. Appl. No. 61/198,414, filed Jun. 16, 2009, Gao.
U.S. Appl. No. 61/216,540, filed May 18, 2009, Driver et al.
U.S. Appl. No. 61/252,229, filed Oct. 16, 2009, Gao.

(Continued)

*Primary Examiner* — Nathan Van Sell
(74) *Attorney, Agent, or Firm* — Perkins Coie LLP

(57) ABSTRACT

Coating compositions for the preparation of superhydrophobic (SH) and/or oleophobic (OP) surfaces that employ low amounts of volatile organic compounds are described. Also described are the resulting coatings/coated surfaces and methods of their preparation. Such coatings/surfaces have a variety of uses, including their ability to prevent or resist water, dirt and/or ice from attaching to a surface.

25 Claims, 33 Drawing Sheets

(56) References Cited

U.S. PATENT DOCUMENTS

| | | |
|---|---|---|
| 4,768,237 A | 9/1988 | Torti |
| 4,782,112 A | 11/1988 | Kondo et al. |
| 4,835,014 A | 5/1989 | Roth et al. |
| 4,837,260 A | 6/1989 | Sato et al. |
| 4,855,176 A | 8/1989 | Ohwaki et al. |
| 4,870,907 A | 10/1989 | McKee |
| 4,923,260 A | 5/1990 | Poulsen |
| 4,971,912 A | 11/1990 | Buhl et al. |
| 4,983,459 A | 1/1991 | Franz et al. |
| 5,011,727 A | 4/1991 | Kido et al. |
| 5,011,963 A | 4/1991 | Ogawa et al. |
| 5,032,641 A | 7/1991 | Nanishi et al. |
| 5,041,304 A | 8/1991 | Kusano et al. |
| 5,057,050 A | 10/1991 | Hill |
| 5,084,191 A | 1/1992 | Nagase et al. |
| 5,104,938 A | 4/1992 | Toyama et al. |
| 5,112,911 A | 5/1992 | Mori et al. |
| 5,121,134 A | 6/1992 | Albinson et al. |
| 5,156,611 A | 10/1992 | Haynes et al. |
| 5,192,603 A | 3/1993 | Slater et al. |
| 5,202,361 A | 4/1993 | Zimmerman et al. |
| 5,212,215 A | 5/1993 | Nanri et al. |
| 5,225,274 A | 7/1993 | Ogawa et al. |
| 5,228,764 A | 7/1993 | Cherry et al. |
| 5,228,905 A | 7/1993 | Grunewalder et al. |
| 5,238,746 A | 8/1993 | Soga et al. |
| 5,240,774 A | 8/1993 | Ogawa et al. |
| 5,274,159 A | 12/1993 | Pellerite et al. |
| 5,284,707 A | 2/1994 | Ogawa et al. |
| 5,294,252 A | 3/1994 | Gun |
| 5,300,239 A | 4/1994 | Ozaki et al. |
| 5,308,705 A | 5/1994 | Franz et al. |
| 5,312,573 A | 5/1994 | Rosenbaum et al. |
| 5,314,940 A | 5/1994 | Stone |
| 5,316,799 A | 5/1994 | Brunken et al. |
| 5,317,129 A | 5/1994 | Taplan et al. |
| 5,324,566 A | 6/1994 | Ogawa et al. |
| 5,328,768 A | 7/1994 | Goodwin |
| 5,338,345 A | 8/1994 | Scarborough et al. |
| 5,348,547 A | 9/1994 | Payne et al. |
| 5,352,733 A | 10/1994 | Hart |
| 5,362,145 A | 11/1994 | Bird et al. |
| 5,364,299 A | 11/1994 | Hill et al. |
| 5,366,810 A | 11/1994 | Merrifield et al. |
| 5,368,892 A | 11/1994 | Berquier |
| 5,372,888 A | 12/1994 | Ogawa et al. |
| 5,380,585 A | 1/1995 | Ogawa et al. |
| 5,385,966 A | 1/1995 | Hermansen et al. |
| 5,395,657 A | 3/1995 | Strepparola et al. |
| 5,424,130 A | 6/1995 | Nakanishi et al. |
| 5,429,433 A | 7/1995 | Bird et al. |
| 5,435,839 A | 7/1995 | Ogawa |
| 5,437,894 A | 8/1995 | Ogawa et al. |
| 5,437,900 A | 8/1995 | Kuzowski |
| 5,441,338 A | 8/1995 | Kane et al. |
| 5,441,809 A | 8/1995 | Akhter |
| 5,458,976 A | 10/1995 | Horino et al. |
| 5,466,770 A | 11/1995 | Audenaert et al. |
| 5,489,328 A | 2/1996 | Ono et al. |
| 5,500,216 A | 3/1996 | Julian et al. |
| 5,527,536 A | 6/1996 | Merkle et al. |
| 5,534,580 A | 7/1996 | Mitsui et al. |
| 5,539,054 A | 7/1996 | LaFleur |
| 5,540,493 A | 7/1996 | Kane et al. |
| 5,556,667 A | 9/1996 | Teranishi et al. |
| 5,558,940 A | 9/1996 | Michels et al. |
| 5,564,809 A | 10/1996 | Kane et al. |
| 5,576,096 A | 11/1996 | Ono et al. |
| 5,578,361 A | 11/1996 | Tsujioka et al. |
| 5,584,957 A | 12/1996 | Schultheis et al. |
| 5,585,896 A | 12/1996 | Yamazaki et al. |
| 5,599,893 A | 2/1997 | Asai et al. |
| 5,612,433 A | 3/1997 | Ono et al. |
| 5,618,627 A | 4/1997 | Merrifield et al. |
| 5,618,883 A | 4/1997 | Plamthottam et al. |
| 5,651,921 A | 7/1997 | Kaijou |
| 5,658,969 A | 8/1997 | Gerace |
| 5,674,967 A | 10/1997 | Goodwin |
| 5,679,460 A | 10/1997 | Schakenraad et al. |
| 5,688,864 A | 11/1997 | Goodwin |
| 5,697,991 A | 12/1997 | Frazer |
| 5,707,740 A | 1/1998 | Goodwin |
| 5,719,226 A | 2/1998 | Kegley |
| 5,725,789 A | 3/1998 | Huber et al. |
| 5,735,589 A | 4/1998 | Herrmann et al. |
| 5,747,561 A | 5/1998 | Smirnov et al. |
| 5,753,734 A | 5/1998 | Maruyama |
| 5,777,043 A | 7/1998 | Shafer et al. |
| 5,798,144 A | 8/1998 | Varanasi et al. |
| 5,800,918 A | 9/1998 | Chartier et al. |
| 5,813,741 A | 9/1998 | Fish et al. |
| 5,814,411 A | 9/1998 | Merrifield et al. |
| 5,824,421 A | 10/1998 | Kobayashi et al. |
| 5,830,529 A | 11/1998 | Ross |
| 5,840,201 A | 11/1998 | Elledge |
| 5,843,338 A | 12/1998 | Inoue et al. |
| 5,853,690 A | 12/1998 | Hibino et al. |
| 5,853,800 A | 12/1998 | Dombrowski et al. |
| 5,856,378 A | 1/1999 | Ring et al. |
| 5,858,551 A | 1/1999 | Salsman |
| 5,876,806 A | 3/1999 | Ogawa |
| 5,890,907 A | 4/1999 | Minasian |
| 5,910,557 A | 6/1999 | Audenaert et al. |
| 5,921,411 A | 7/1999 | Merl |
| 5,924,359 A | 7/1999 | Watanabe |
| 5,945,482 A | 8/1999 | Fukuchi et al. |
| 5,947,574 A | 9/1999 | Avendano |
| 5,948,685 A | 9/1999 | Angros |
| 5,952,053 A | 9/1999 | Colby |
| 5,958,601 A | 9/1999 | Salsman |
| 5,980,990 A | 11/1999 | Goodwin |
| 6,013,724 A | 1/2000 | Mizutani et al. |
| 6,017,609 A | 1/2000 | Akamatsu et al. |
| 6,017,831 A | 1/2000 | Beardsley et al. |
| 6,017,997 A | 1/2000 | Snow et al. |
| 6,020,419 A | 2/2000 | Bock et al. |
| 6,024,948 A | 2/2000 | Samain et al. |
| 6,025,025 A | 2/2000 | Bartrug et al. |
| 6,033,738 A | 3/2000 | Teranishi et al. |
| 6,040,382 A | 3/2000 | Hanes |
| 6,045,650 A | 4/2000 | Mitchnick et al. |
| 6,068,911 A | 5/2000 | Shouji et al. |
| 6,090,447 A | 7/2000 | Suzuki et al. |
| 6,093,559 A | 7/2000 | Bookbinder et al. |
| 6,096,380 A | 8/2000 | Takebe et al. |
| 6,105,233 A | 8/2000 | Neal |
| 6,114,446 A | 9/2000 | Narisawa et al. |
| 6,117,555 A | 9/2000 | Fujimori et al. |
| 6,119,626 A | 9/2000 | Miyazawa et al. |
| 6,120,720 A | 9/2000 | Meier et al. |
| 6,136,210 A | 10/2000 | Biegelsen et al. |
| 6,153,304 A | 11/2000 | Smith et al. |
| 6,162,870 A | 12/2000 | Yamada et al. |
| 6,187,143 B1 | 2/2001 | Juppo et al. |
| 6,191,122 B1 | 2/2001 | Lux et al. |
| 6,201,058 B1 | 3/2001 | Mahr et al. |
| 6,207,236 B1 | 3/2001 | Araki et al. |
| 6,214,278 B1 | 4/2001 | Yamada et al. |
| 6,221,434 B1 | 4/2001 | Visca et al. |
| 6,224,974 B1 | 5/2001 | Wuu |
| 6,228,435 B1 | 5/2001 | Yoshikawa et al. |
| 6,228,972 B1 | 5/2001 | Hikita et al. |
| 6,235,383 B1 | 5/2001 | Hong et al. |
| 6,235,833 B1 | 5/2001 | Akamatsu et al. |
| 6,245,387 B1 | 6/2001 | Hayden |
| 6,248,850 B1 | 6/2001 | Arai |
| 6,264,751 B1 | 7/2001 | Kamura et al. |
| 6,280,834 B1 | 8/2001 | Veerasamy et al. |
| 6,288,149 B1 | 9/2001 | Kroll |
| 6,291,054 B1 | 9/2001 | Thomas et al. |
| 6,333,074 B1 | 12/2001 | Ogawa et al. |
| 6,333,558 B1 | 12/2001 | Hasegawa |
| 6,337,133 B1 | 1/2002 | Akamatsu et al. |
| 6,340,502 B1 | 1/2002 | Azzopardi et al. |

(56) References Cited

U.S. PATENT DOCUMENTS

| | | |
|---|---|---|
| 6,342,268 B1 | 1/2002 | Samain |
| 6,352,758 B1 | 3/2002 | Huang et al. |
| 6,358,569 B1 | 3/2002 | Badyal et al. |
| 6,361,868 B1 | 3/2002 | Bier et al. |
| 6,376,592 B1 | 4/2002 | Shimada et al. |
| 6,379,751 B1 | 4/2002 | Schaefer et al. |
| 6,383,642 B1 | 5/2002 | Le Bellac et al. |
| 6,403,397 B1 | 6/2002 | Katz |
| 6,410,673 B1 | 6/2002 | Arai et al. |
| 6,419,985 B1 | 7/2002 | Ishizuka |
| 6,423,372 B1 | 7/2002 | Genzer et al. |
| 6,423,381 B1 | 7/2002 | Colton et al. |
| 6,432,181 B1 | 8/2002 | Ludwig |
| 6,451,432 B1 | 9/2002 | Azzopardi et al. |
| 6,451,876 B1 | 9/2002 | Koshy |
| 6,458,420 B1 | 10/2002 | Akamatsu et al. |
| 6,458,467 B1 | 10/2002 | Mizuno et al. |
| 6,461,537 B1 | 10/2002 | Turcotte et al. |
| 6,461,670 B2 | 10/2002 | Akamatsu et al. |
| 6,462,115 B1 | 10/2002 | Takahashi et al. |
| 6,471,761 B2 | 10/2002 | Fan et al. |
| 6,476,095 B2 | 11/2002 | Simendinger, III |
| 6,479,612 B1 | 11/2002 | Del Pesco et al. |
| 6,482,524 B1 | 11/2002 | Yamamoto et al. |
| 6,488,347 B1 | 12/2002 | Bienick |
| 6,559,234 B1 | 5/2003 | Arai et al. |
| 6,564,935 B1 | 5/2003 | Yamamoto et al. |
| 6,566,453 B1 | 5/2003 | Arai et al. |
| 6,579,620 B2 | 6/2003 | Mizunno et al. |
| 6,582,825 B2 | 6/2003 | Amarasekera et al. |
| 6,584,744 B1 | 7/2003 | Schultheis et al. |
| 6,589,641 B1 | 7/2003 | Stirniman et al. |
| 6,596,060 B1 | 7/2003 | Michaud |
| 6,610,363 B2 | 8/2003 | Arora et al. |
| 6,613,860 B1 | 9/2003 | Dams et al. |
| 6,623,863 B2 | 9/2003 | Kamitani et al. |
| 6,641,654 B2 | 11/2003 | Akamatsu et al. |
| 6,649,222 B1 | 11/2003 | D'Agostino et al. |
| 6,652,640 B2 | 11/2003 | Asai et al. |
| 6,660,339 B1 | 12/2003 | Datta et al. |
| 6,660,363 B1 | 12/2003 | Barthlott |
| 6,660,686 B2 | 12/2003 | Inagaki et al. |
| 6,683,126 B2 | 1/2004 | Keller et al. |
| 6,685,992 B1 | 2/2004 | Ogawa et al. |
| 6,689,200 B2 | 2/2004 | Scarborough et al. |
| 6,692,565 B2 | 2/2004 | Johansen, Jr. et al. |
| 6,706,798 B2 | 3/2004 | Kobayashi et al. |
| 6,720,371 B2 | 4/2004 | Furuta et al. |
| 6,729,704 B2 | 5/2004 | Ames |
| 6,733,892 B1 | 5/2004 | Yoneda et al. |
| 6,743,467 B1 | 6/2004 | Jones et al. |
| 6,767,984 B2 | 7/2004 | Toui et al. |
| 6,770,323 B2 | 8/2004 | Genzer et al. |
| 6,780,497 B1 | 8/2004 | Walter |
| 6,786,562 B2 | 9/2004 | Obrock et al. |
| 6,793,821 B2 | 9/2004 | Lee et al. |
| 6,800,354 B2 | 10/2004 | Baumann et al. |
| 6,806,299 B2 | 10/2004 | Baumann et al. |
| 6,808,835 B2 | 10/2004 | Green et al. |
| 6,811,716 B1 | 11/2004 | Stengaard et al. |
| 6,811,844 B2 | 11/2004 | Trouilhet |
| 6,811,884 B2 | 11/2004 | Goodwin |
| 6,835,778 B2 | 12/2004 | Swisher et al. |
| 6,845,788 B2 | 1/2005 | Extrand |
| 6,852,389 B2 | 2/2005 | Nun et al. |
| 6,852,390 B2 | 2/2005 | Extrand |
| 6,855,375 B2 | 2/2005 | Nakagawa et al. |
| 6,855,759 B2 | 2/2005 | Kudo et al. |
| 6,858,284 B2 | 2/2005 | Nun et al. |
| 6,871,923 B2 | 3/2005 | Dietz et al. |
| 6,872,441 B2 | 3/2005 | Baumann et al. |
| 6,884,904 B2 | 4/2005 | Smith et al. |
| 6,890,360 B2 | 5/2005 | Cote et al. |
| 6,923,216 B2 | 8/2005 | Extrand et al. |
| 6,926,946 B2 | 8/2005 | Ogawa et al. |
| 6,931,888 B2 | 8/2005 | Shekunov et al. |
| 6,938,774 B2 | 9/2005 | Extrand |
| 6,942,746 B2 | 9/2005 | Niejelow et al. |
| 6,966,990 B2 | 11/2005 | Chattopadhyay et al. |
| 6,976,585 B2 | 12/2005 | Extrand |
| 6,976,998 B2 | 12/2005 | Rizzo et al. |
| 6,982,242 B2 | 1/2006 | Liss et al. |
| 6,992,858 B2 | 1/2006 | Kaneko |
| 6,994,033 B2 | 2/2006 | Kweon |
| 6,994,045 B2 | 2/2006 | Paszkowski |
| 6,998,051 B2 | 2/2006 | Chattopadhyay et al. |
| 7,004,184 B2 | 2/2006 | Handique et al. |
| 7,005,372 B2 | 2/2006 | Levy et al. |
| 7,019,069 B2 | 3/2006 | Kobayashi et al. |
| 7,022,416 B2 | 4/2006 | Teranishi |
| 7,026,018 B2 | 4/2006 | Kranovich |
| 7,037,591 B2 | 5/2006 | Henze et al. |
| 7,048,889 B2 | 5/2006 | Arney et al. |
| 7,052,244 B2 | 5/2006 | Fouillet et al. |
| 7,056,409 B2 | 6/2006 | Dubrow |
| 7,057,832 B2 | 6/2006 | Wu et al. |
| 7,057,881 B2 | 6/2006 | Chow et al. |
| 7,074,273 B2 | 7/2006 | Shimomura et al. |
| 7,074,294 B2 | 7/2006 | Dubrow |
| 7,083,748 B2 | 8/2006 | Chattopadhyay et al. |
| 7,083,828 B2 | 8/2006 | Muller et al. |
| 7,109,256 B2 | 9/2006 | Amano et al. |
| 7,112,369 B2 | 9/2006 | Wang et al. |
| 7,124,450 B2 | 10/2006 | Davidson |
| 7,141,276 B2 | 11/2006 | Lehmann et al. |
| 7,144,947 B2 | 12/2006 | Camus et al. |
| 7,148,181 B2 | 12/2006 | Tanaka et al. |
| 7,150,904 B2 | 12/2006 | D'Urso et al. |
| 7,153,357 B2 | 12/2006 | Baumgart et al. |
| 7,157,018 B2 | 1/2007 | Scheidler |
| 7,166,235 B2 | 1/2007 | Majeti et al. |
| 7,175,723 B2 | 2/2007 | Jones et al. |
| 7,179,758 B2 | 2/2007 | Chakrapani et al. |
| 7,179,864 B2 | 2/2007 | Wang |
| 7,188,917 B2 | 3/2007 | Bienick |
| 7,198,855 B2 | 4/2007 | Liebmann-Vinson et al. |
| 7,204,298 B2 | 4/2007 | Hodes et al. |
| 7,211,223 B2 | 5/2007 | Fouillet et al. |
| 7,211,313 B2 | 5/2007 | Nun et al. |
| 7,211,329 B2 | 5/2007 | Metz et al. |
| 7,211,605 B2 | 5/2007 | Coronado et al. |
| 7,213,309 B2 | 5/2007 | Wang et al. |
| D547,640 S | 7/2007 | Remmers |
| 7,238,751 B2 | 7/2007 | Wang et al. |
| 7,253,130 B2 | 8/2007 | Chiang et al. |
| 7,258,731 B2 | 8/2007 | D'Urso et al. |
| 7,264,845 B2 | 9/2007 | Papadaki et al. |
| 7,265,180 B2 | 9/2007 | Chang et al. |
| 7,265,468 B1 | 9/2007 | Mancl et al. |
| 7,268,179 B2 | 9/2007 | Brown |
| 7,273,658 B2 | 9/2007 | Benayoun et al. |
| 7,285,331 B1 | 10/2007 | Reihs et al. |
| 7,288,311 B2 | 10/2007 | Kawashima et al. |
| 7,288,592 B2 | 10/2007 | Stark et al. |
| 7,291,653 B2 | 11/2007 | Baumann et al. |
| 7,297,375 B2 | 11/2007 | Wegner et al. |
| 7,306,895 B2 | 12/2007 | Kano et al. |
| 7,309,278 B2 | 12/2007 | Shibata |
| 7,312,057 B2 | 12/2007 | Bookbinder et al. |
| 7,323,033 B2 | 1/2008 | Kroupenkine et al. |
| 7,338,835 B2 | 3/2008 | Bao |
| 7,342,551 B2 | 3/2008 | King |
| 7,344,619 B2 | 3/2008 | Helmeke |
| 7,344,758 B2 | 3/2008 | Franchina et al. |
| 7,344,783 B2 | 3/2008 | Shea |
| 7,354,328 B2 | 4/2008 | Lee |
| 7,354,624 B2 | 4/2008 | Millero et al. |
| 7,354,650 B2 | 4/2008 | Nakajima et al. |
| D568,344 S | 5/2008 | Baacke et al. |
| 7,368,510 B2 | 5/2008 | Lee et al. |
| 7,393,515 B2 | 7/2008 | Hoshino et al. |
| 7,396,395 B1 | 7/2008 | Chen et al. |
| 7,419,615 B2 | 9/2008 | Strauss |
| 7,449,233 B2 | 11/2008 | Arora |

(56) References Cited

U.S. PATENT DOCUMENTS

| | | |
|---|---|---|
| 7,468,333 B2 | 12/2008 | Kimbrell, Jr. et al. |
| 7,497,533 B2 | 3/2009 | Remmers |
| 7,524,531 B2 | 4/2009 | Axtell, III et al. |
| 7,527,832 B2 | 5/2009 | Sakoske et al. |
| 7,531,598 B2 | 5/2009 | Müller et al. |
| 7,544,411 B2 | 6/2009 | Baumann et al. |
| D596,931 S | 7/2009 | Fernandez |
| D596,932 S | 7/2009 | Kleinsasser |
| 7,563,505 B2 | 7/2009 | Reihs |
| 7,568,583 B2 | 8/2009 | Wing et al. |
| 7,607,744 B2 | 10/2009 | Casoli et al. |
| D607,020 S | 12/2009 | Baacke et al. |
| D612,404 S | 3/2010 | Picken et al. |
| D612,405 S | 3/2010 | Eicher |
| D613,316 S | 4/2010 | Schmidt |
| 7,726,615 B2 | 6/2010 | Rutz |
| 7,731,316 B2 | 6/2010 | Wing |
| 7,748,806 B2 | 7/2010 | Egan |
| 7,767,758 B2 | 8/2010 | Moorlag et al. |
| 7,901,731 B2 | 3/2011 | Russell et al. |
| 7,919,180 B2 | 4/2011 | Furukawa |
| 7,935,209 B2 | 5/2011 | Ward |
| 7,943,234 B2 | 5/2011 | Lawin et al. |
| 7,950,756 B2 | 5/2011 | Collins et al. |
| 7,989,619 B2 | 8/2011 | Guire et al. |
| 8,231,191 B2 | 7/2012 | Leconte et al. |
| 8,258,206 B2 | 9/2012 | Kanagasabapathy et al. |
| 8,286,561 B2 | 10/2012 | Driver et al. |
| 8,513,342 B2 | 8/2013 | Gao et al. |
| 8,580,884 B2 | 11/2013 | Ding |
| 8,596,205 B2 | 12/2013 | Driver et al. |
| 8,715,906 B2 | 5/2014 | Blanchet et al. |
| 8,779,025 B1 | 7/2014 | Stone |
| 8,899,704 B2 | 12/2014 | Bienick |
| 9,067,821 B2 | 6/2015 | Bleecher et al. |
| 9,096,786 B2 | 8/2015 | Sikka et al. |
| 9,139,744 B2 | 9/2015 | Sikka et al. |
| 9,243,175 B2 | 1/2016 | Sikka et al. |
| 9,279,073 B2 | 3/2016 | Bleecher et al. |
| 2001/0018130 A1 | 8/2001 | Hayden |
| 2001/0019773 A1 | 9/2001 | Akamatsu et al. |
| 2001/0024728 A1 | 9/2001 | Kamitani et al. |
| 2001/0030808 A1 | 10/2001 | Komatsu et al. |
| 2001/0055677 A1 | 12/2001 | Wuu |
| 2002/0001676 A1 | 1/2002 | Hayden |
| 2002/0034627 A1 | 3/2002 | Jacquiod et al. |
| 2002/0045007 A1 | 4/2002 | Arora et al. |
| 2002/0049276 A1 | 4/2002 | Zwick |
| 2002/0077412 A1 | 6/2002 | Kobayashi et al. |
| 2002/0111402 A1 | 8/2002 | Mizuno et al. |
| 2002/0115736 A1 | 8/2002 | Koshy |
| 2002/0161130 A1 | 10/2002 | Arai et al. |
| 2002/0177655 A1 | 11/2002 | Pratt et al. |
| 2002/0192472 A1 | 12/2002 | Metz et al. |
| 2002/0197490 A1 | 12/2002 | Amidaiji et al. |
| 2003/0009049 A1 | 1/2003 | Smith et al. |
| 2003/0013795 A1 | 1/2003 | Nun et al. |
| 2003/0021902 A1 | 1/2003 | Yamamoto et al. |
| 2003/0026972 A1 | 2/2003 | Reihs |
| 2003/0040243 A1 | 2/2003 | Ward |
| 2003/0040568 A1 | 2/2003 | Furuta et al. |
| 2003/0065093 A1 | 4/2003 | Custro et al. |
| 2003/0070677 A1 | 4/2003 | Handique et al. |
| 2003/0072723 A1 | 4/2003 | Gers-Barlag et al. |
| 2003/0073067 A1 | 4/2003 | Bookfinder et al. |
| 2003/0077533 A1 | 4/2003 | Murota et al. |
| 2003/0091809 A1 | 5/2003 | Scarborough et al. |
| 2003/0096120 A1 | 5/2003 | Schafheutle et al. |
| 2003/0110976 A1 | 6/2003 | Abidh et al. |
| 2003/0117051 A1 | 6/2003 | Kweon |
| 2003/0119684 A1 | 6/2003 | Tsao |
| 2003/0125656 A1 | 7/2003 | Davankov et al. |
| 2003/0143339 A1 | 7/2003 | Kobayashi |
| 2003/0149218 A1 | 8/2003 | Cote' et al. |
| 2003/0166840 A1 | 9/2003 | Urry et al. |
| 2003/0170401 A1 | 9/2003 | Shimomura et al. |
| 2003/0176572 A1 | 9/2003 | Maekawa et al. |
| 2003/0176574 A1 | 9/2003 | St. Clair et al. |
| 2003/0179494 A1 | 9/2003 | Kaneko |
| 2003/0194565 A1 | 10/2003 | Schaefer |
| 2003/0203771 A1 | 10/2003 | Rosenberg et al. |
| 2003/0203991 A1 | 10/2003 | Schottman et al. |
| 2004/0005469 A1 | 1/2004 | Metz et al. |
| 2004/0020104 A1 | 2/2004 | Feldhege et al. |
| 2004/0025747 A1 | 2/2004 | Kamitani et al. |
| 2004/0039128 A1 | 2/2004 | Sasagawa et al. |
| 2004/0050297 A1 | 3/2004 | Kobayashi et al. |
| 2004/0053058 A1 | 3/2004 | Kamitani et al. |
| 2004/0056575 A1 | 3/2004 | Dietz et al. |
| 2004/0097616 A1 | 5/2004 | Hoppler et al. |
| 2004/0102124 A1 | 5/2004 | Suzuki |
| 2004/0102588 A1 | 5/2004 | Arai et al. |
| 2004/0121168 A1 | 6/2004 | Goodwin et al. |
| 2004/0137814 A1 | 7/2004 | Kimbrell, Jr. et al. |
| 2004/0138083 A1 | 7/2004 | Kimbrell, Jr. et al. |
| 2004/0142557 A1 | 7/2004 | Levy et al. |
| 2004/0154106 A1 | 8/2004 | Oles et al. |
| 2004/0192844 A1 | 9/2004 | Ikematsu et al. |
| 2004/0201048 A1 | 10/2004 | Seki et al. |
| 2004/0202872 A1 | 10/2004 | Fang et al. |
| 2004/0209203 A1 | 10/2004 | Kano et al. |
| 2004/0213904 A1 | 10/2004 | Muller et al. |
| 2004/0216227 A1 | 11/2004 | Papadaki et al. |
| 2005/0000463 A1 | 1/2005 | Mochizuki |
| 2005/0004264 A1 | 1/2005 | Tanabe |
| 2005/0008859 A1 | 1/2005 | Forgacs |
| 2005/0009953 A1 | 1/2005 | Shea |
| 2005/0020763 A1* | 1/2005 | Milic .................. 524/507 |
| 2005/0022313 A1 | 2/2005 | Scheidler |
| 2005/0053793 A1 | 3/2005 | Benay-Oun et al. |
| 2005/0075020 A1 | 4/2005 | Benayoun et al. |
| 2005/0075455 A1 | 4/2005 | Chang et al. |
| 2005/0106762 A1 | 5/2005 | Chakrapani et al. |
| 2005/0121782 A1 | 6/2005 | Nakamura et al. |
| 2005/0143547 A1 | 6/2005 | Stark et al. |
| 2005/0165194 A1 | 7/2005 | Benayoun et al. |
| 2005/0170098 A1 | 8/2005 | Baumann et al. |
| 2005/0197447 A1 | 9/2005 | Gu et al. |
| 2005/0221098 A1 | 10/2005 | Azzopardi et al. |
| 2005/0239211 A1 | 10/2005 | Uchihara et al. |
| 2005/0245395 A1 | 11/2005 | Tanaka et al. |
| 2006/0013983 A1 | 1/2006 | Sebastian et al. |
| 2006/0029808 A1 | 2/2006 | Zhai et al. |
| 2006/0040164 A1 | 2/2006 | Vyas et al. |
| 2006/0051561 A1 | 3/2006 | Badyal |
| 2006/0052556 A1 | 3/2006 | Franchina et al. |
| 2006/0057390 A1 | 3/2006 | Kittle et al. |
| 2006/0058458 A1* | 3/2006 | Hasskerl et al. ........... 524/599 |
| 2006/0062695 A1 | 3/2006 | Haab et al. |
| 2006/0062929 A1 | 3/2006 | Kittle et al. |
| 2006/0081394 A1 | 4/2006 | Li et al. |
| 2006/0089466 A1 | 4/2006 | Shimomura et al. |
| 2006/0110541 A1 | 5/2006 | Russell et al. |
| 2006/0110542 A1 | 5/2006 | Dietz et al. |
| 2006/0113443 A1 | 6/2006 | Remmers |
| 2006/0147634 A1 | 7/2006 | Strauss |
| 2006/0147705 A1 | 7/2006 | Huang et al. |
| 2006/0151739 A1 | 7/2006 | Sandner et al. |
| 2006/0154048 A1 | 7/2006 | Teranishi et al. |
| 2006/0162373 A1 | 7/2006 | McMillin et al. |
| 2006/0172641 A1 | 8/2006 | Hennige et al. |
| 2006/0185555 A1 | 8/2006 | Giessler et al. |
| 2006/0205874 A1 | 9/2006 | Uzee et al. |
| 2006/0207032 A1 | 9/2006 | Reiners et al. |
| 2006/0213791 A1 | 9/2006 | Holden |
| 2006/0213792 A1 | 9/2006 | Nguyen et al. |
| 2006/0213849 A1 | 9/2006 | Bienick |
| 2006/0222865 A1 | 10/2006 | Hoshino et al. |
| 2006/0240218 A1* | 10/2006 | Parce .................. 428/98 |
| 2006/0263516 A1 | 11/2006 | Jones et al. |
| 2006/0266258 A1 | 11/2006 | Asakura et al. |
| 2006/0269758 A1 | 11/2006 | Helmeke |
| 2006/0281889 A1 | 12/2006 | Kobayashi et al. |
| 2006/0286305 A1 | 12/2006 | Thies et al. |

(56) References Cited

U.S. PATENT DOCUMENTS

| | | |
|---|---|---|
| 2006/0292345 A1 | 12/2006 | Dave et al. |
| 2007/0003705 A1 | 1/2007 | Strauss |
| 2007/0005024 A1 | 1/2007 | Weber et al. |
| 2007/0009657 A1 | 1/2007 | Zhang et al. |
| 2007/0014970 A1 | 1/2007 | Nun et al. |
| 2007/0026193 A1 | 2/2007 | Luzinov et al. |
| 2007/0036906 A1* | 2/2007 | Reeve ................. 427/421.1 |
| 2007/0046160 A1 | 3/2007 | Egan |
| 2007/0065668 A1 | 3/2007 | Idei |
| 2007/0075199 A1 | 4/2007 | Stewart et al. |
| 2007/0141114 A1 | 6/2007 | Muisener et al. |
| 2007/0141306 A1 | 6/2007 | Kasai et al. |
| 2007/0148407 A1 | 6/2007 | Chen et al. |
| 2007/0166513 A1 | 7/2007 | Sheng et al. |
| 2007/0172650 A1 | 7/2007 | O'Rear, III et al. |
| 2007/0172658 A1 | 7/2007 | Deruelle et al. |
| 2007/0172661 A1 | 7/2007 | Fechner et al. |
| 2007/0176379 A1 | 8/2007 | Sonnendorfer et al. |
| 2007/0196656 A1 | 8/2007 | Rowell |
| 2007/0202342 A1 | 8/2007 | Whiteford et al. |
| 2007/0213230 A1 | 9/2007 | Pfeiffer et al. |
| 2007/0215004 A1 | 9/2007 | Kuroda et al. |
| 2007/0218265 A1 | 9/2007 | Harris et al. |
| 2007/0224898 A1 | 9/2007 | Deangelis et al. |
| 2007/0231517 A1 | 10/2007 | Golownia |
| 2007/0238807 A1 | 10/2007 | Safir et al. |
| 2007/0259156 A1 | 11/2007 | Kempers et al. |
| 2007/0274871 A1 | 11/2007 | Jiang |
| 2007/0275245 A1 | 11/2007 | Persson et al. |
| 2007/0298216 A1 | 12/2007 | Jing et al. |
| 2008/0008838 A1* | 1/2008 | Arpac et al. ................. 427/386 |
| 2008/0012459 A1 | 1/2008 | Picken et al. |
| 2008/0015306 A1 | 1/2008 | Wright et al. |
| 2008/0017071 A1 | 1/2008 | Moebus et al. |
| 2008/0018709 A1 | 1/2008 | Takenaka et al. |
| 2008/0020127 A1 | 1/2008 | Whiteford et al. |
| 2008/0021212 A1 | 1/2008 | Whiteford et al. |
| 2008/0032403 A1 | 2/2008 | Saito et al. |
| 2008/0039558 A1 | 2/2008 | Lazzari et al. |
| 2008/0039576 A1 | 2/2008 | Griswold et al. |
| 2008/0044635 A1 | 2/2008 | O'Neill et al. |
| 2008/0050567 A1 | 2/2008 | Kawashima et al. |
| 2008/0063870 A1 | 3/2008 | O'Rear et al. |
| 2008/0066648 A1 | 3/2008 | Asakura et al. |
| 2008/0070146 A1 | 3/2008 | Fomitchev et al. |
| 2008/0081858 A1 | 4/2008 | Okazaki |
| 2008/0088192 A1 | 4/2008 | Hsu |
| 2008/0090004 A1 | 4/2008 | Zhang et al. |
| 2008/0101041 A1 | 5/2008 | Chang et al. |
| 2008/0102347 A1 | 5/2008 | Blunk |
| 2008/0107864 A1 | 5/2008 | Zhang et al. |
| 2008/0131653 A1 | 6/2008 | Lyons et al. |
| 2008/0160257 A1 | 7/2008 | Takada et al. |
| 2008/0166549 A1 | 7/2008 | Shieh et al. |
| 2008/0171805 A1 | 7/2008 | Mingarelli |
| 2008/0172937 A1 | 7/2008 | Palmer et al. |
| 2008/0176991 A1 | 7/2008 | Osawa et al. |
| 2008/0193740 A1 | 8/2008 | Nesbitt |
| 2008/0197760 A1 | 8/2008 | Leconte et al. |
| 2008/0199657 A1 | 8/2008 | Capron et al. |
| 2008/0199659 A1 | 8/2008 | Zhao |
| 2008/0205950 A1 | 8/2008 | Moorlag et al. |
| 2008/0206550 A1 | 8/2008 | Borlner |
| 2008/0207581 A1 | 8/2008 | Whiteford et al. |
| 2008/0213601 A1 | 9/2008 | Yamamoto et al. |
| 2008/0220170 A1 | 9/2008 | Van Der Flaas |
| 2008/0220676 A1 | 9/2008 | Marin et al. |
| 2008/0221009 A1 | 9/2008 | Kanagasabapathy et al. |
| 2008/0221263 A1 | 9/2008 | Kanagasabapathy et al. |
| 2008/0226694 A1 | 9/2008 | Gelbert et al. |
| 2008/0237126 A1 | 10/2008 | Hoek et al. |
| 2008/0241512 A1 | 10/2008 | Boris et al. |
| 2008/0241523 A1 | 10/2008 | Huignard et al. |
| 2008/0245273 A1 | 10/2008 | Vyorkka et al. |
| 2008/0246804 A1 | 10/2008 | Kawase et al. |
| 2008/0248263 A1 | 10/2008 | Kobrin |
| 2008/0250978 A1* | 10/2008 | Baumgart et al. ....... 106/287.19 |
| 2008/0261024 A1 | 10/2008 | Xenopoulos et al. |
| 2008/0268233 A1 | 10/2008 | Lawin et al. |
| 2008/0269358 A1 | 10/2008 | Inoue et al. |
| 2008/0280699 A1 | 11/2008 | Jarvholm |
| 2008/0286556 A1 | 11/2008 | D'Urso et al. |
| 2008/0295347 A1 | 12/2008 | Braham |
| 2008/0296252 A1 | 12/2008 | D'Urso et al. |
| 2008/0306202 A1 | 12/2008 | Lin et al. |
| 2008/0310660 A1 | 12/2008 | Lin |
| 2009/0010870 A1 | 1/2009 | Greiner et al. |
| 2009/0011222 A1 | 1/2009 | Xiu et al. |
| 2009/0011227 A1 | 1/2009 | Furukawa |
| 2009/0011960 A1 | 1/2009 | Wu |
| 2009/0018249 A1 | 1/2009 | Kanagasabapathy et al. |
| 2009/0025508 A1 | 1/2009 | Liao et al. |
| 2009/0025609 A1 | 1/2009 | Egami et al. |
| 2009/0032088 A1 | 2/2009 | Rabinowitz |
| 2009/0035519 A1 | 2/2009 | Gaeta et al. |
| 2009/0036978 A1 | 2/2009 | Kleiner et al. |
| 2009/0042469 A1 | 2/2009 | Simpson |
| 2009/0058247 A1 | 3/2009 | Collins et al. |
| 2009/0064894 A1 | 3/2009 | Baumgart et al. |
| 2009/0076430 A1 | 3/2009 | Simpson et al. |
| 2009/0084574 A1 | 4/2009 | Balfour et al. |
| 2009/0084914 A1 | 4/2009 | Picken et al. |
| 2009/0085453 A1 | 4/2009 | Daley et al. |
| 2009/0087670 A1 | 4/2009 | Peng et al. |
| 2009/0095941 A1 | 4/2009 | Nakata et al. |
| 2009/0099301 A1 | 4/2009 | Naraghi et al. |
| 2009/0105409 A1 | 4/2009 | Munzmay et al. |
| 2009/0105679 A1 | 4/2009 | Joubert et al. |
| 2009/0111344 A1 | 4/2009 | Murphy et al. |
| 2009/0115302 A1 | 5/2009 | Benz et al. |
| 2009/0123728 A1 | 5/2009 | Cheung et al. |
| 2009/0134758 A1 | 5/2009 | Vardon |
| 2009/0136737 A1 | 5/2009 | Ring et al. |
| 2009/0142604 A1 | 6/2009 | Imai et al. |
| 2009/0155566 A1 | 6/2009 | Gentleman et al. |
| 2009/0162592 A1 | 6/2009 | Baikerikar et al. |
| 2009/0163637 A1 | 6/2009 | Li et al. |
| 2009/0182085 A1 | 7/2009 | Escobar Barrios et al. |
| 2009/0186070 A1 | 7/2009 | Guire et al. |
| 2009/0188877 A1 | 7/2009 | Stewart |
| 2009/0193743 A1 | 8/2009 | Wiercinski |
| 2009/0195136 A1 | 8/2009 | Wing et al. |
| 2009/0208739 A1 | 8/2009 | Husemann et al. |
| 2009/0212505 A1 | 8/2009 | McMillin et al. |
| 2009/0240004 A1 | 9/2009 | Maier et al. |
| 2009/0263604 A1 | 10/2009 | Arai et al. |
| 2009/0286023 A1 | 11/2009 | Dobreski et al. |
| 2009/0298369 A1 | 12/2009 | Koene et al. |
| 2009/0324910 A1 | 12/2009 | Gemici et al. |
| 2010/0001625 A1 | 1/2010 | Eckartsberg et al. |
| 2010/0003493 A1 | 1/2010 | Cheng et al. |
| 2010/0004373 A1 | 1/2010 | Zhu et al. |
| 2010/0006223 A1 | 1/2010 | Krawinkel et al. |
| 2010/0026156 A1 | 2/2010 | Leconte et al. |
| 2010/0052491 A1 | 3/2010 | Vardon |
| 2010/0102693 A1 | 4/2010 | Driver et al. |
| 2010/0109498 A1 | 5/2010 | Ramm et al. |
| 2010/0117502 A1 | 5/2010 | Kang et al. |
| 2010/0133970 A1 | 6/2010 | Shin et al. |
| 2010/0176703 A1 | 7/2010 | Kim |
| 2010/0181884 A1 | 7/2010 | De La Garza et al. |
| 2010/0196702 A9 | 8/2010 | Furukawa |
| 2010/0213334 A1 | 8/2010 | Davenport |
| 2010/0272913 A1 | 10/2010 | Russell et al. |
| 2010/0314575 A1 | 12/2010 | Gao et al. |
| 2010/0330347 A1 | 12/2010 | Badyal et al. |
| 2011/0020637 A1 | 1/2011 | Ikishima et al. |
| 2011/0027531 A1 | 2/2011 | Uchida et al. |
| 2011/0033662 A1 | 2/2011 | Ikishima et al. |
| 2011/0111656 A1 | 5/2011 | Gao et al. |
| 2011/0184082 A1 | 7/2011 | Wright et al. |
| 2011/0206925 A1 | 8/2011 | Kissel et al. |
| 2011/0217544 A1 | 9/2011 | Young et al. |
| 2011/0243985 A1 | 10/2011 | Pagani et al. |

(56) References Cited

U.S. PATENT DOCUMENTS

| | | |
|---|---|---|
| 2011/0251318 A1 | 10/2011 | Ishizaki et al. |
| 2011/0303156 A1 | 12/2011 | Sikka et al. |
| 2011/0313082 A1 | 12/2011 | Popp |
| 2012/0009396 A1 | 1/2012 | Sikka et al. |
| 2012/0040577 A1 | 2/2012 | Kissel et al. |
| 2012/0045954 A1 | 2/2012 | Bleecher et al. |
| 2013/0139309 A1 | 6/2013 | Bleecher et al. |
| 2013/0216820 A1 | 8/2013 | Riddle et al. |
| 2014/0205804 A1 | 7/2014 | Jones et al. |
| 2014/0296409 A1 | 10/2014 | Sikka et al. |
| 2014/0349061 A1 | 11/2014 | Sikka et al. |
| 2015/0005424 A1 | 1/2015 | Jones et al. |
| 2015/0030779 A1 | 1/2015 | Bleecher et al. |
| 2015/0097475 A1 | 4/2015 | Sikka et al. |
| 2015/0320646 A1 | 11/2015 | Kameya et al. |
| 2015/0368500 A1 | 12/2015 | Sikka et al. |

FOREIGN PATENT DOCUMENTS

| | | |
|---|---|---|
| CA | 2 796 305 A1 | 9/2011 |
| DE | 10 2010 022 265 A | 5/2010 |
| EP | 0 166 363 A2 | 1/1986 |
| EP | 0 207 282 A2 | 7/1987 |
| EP | 0 307 915 A2 | 3/1989 |
| EP | 0 317 057 A2 | 5/1989 |
| EP | 0 332 141 A2 | 9/1989 |
| EP | 0 386 991 A1 | 9/1990 |
| EP | 0 399 568 A2 | 11/1990 |
| EP | 0 446 391 A1 | 9/1991 |
| EP | 0 452 723 A1 | 10/1991 |
| EP | 0 472 215 A2 | 2/1992 |
| EP | 0 476 510 A1 | 3/1992 |
| EP | 0 493 270 A2 | 7/1992 |
| EP | 0 545 201 A2 | 6/1993 |
| EP | 0 623 656 A2 | 11/1994 |
| EP | 0 649 887 A2 | 4/1995 |
| EP | 0 657 393 A1 | 6/1995 |
| EP | 0 714 870 A1 | 6/1996 |
| EP | 0 714 921 A1 | 6/1996 |
| EP | 0 719 743 A1 | 7/1996 |
| EP | 0 719 821 A1 | 7/1996 |
| EP | 0 739 714 A2 | 10/1996 |
| EP | 0 745 567 A1 | 12/1996 |
| EP | 0 745 568 A1 | 12/1996 |
| EP | 0 752 459 A2 | 1/1997 |
| EP | 0 770 706 A1 | 5/1997 |
| EP | 0 799 791 A1 | 10/1997 |
| EP | 0 811 430 A1 | 12/1997 |
| EP | 0 863 191 A2 | 9/1998 |
| EP | 0 903 389 A1 | 3/1999 |
| EP | 0 904 343 A1 | 3/1999 |
| EP | 0 914 873 A1 | 5/1999 |
| EP | 0 915 103 A1 | 5/1999 |
| EP | 0 930 351 A1 | 7/1999 |
| EP | 1 047 735 A2 | 11/2000 |
| EP | 1 048 696 A2 | 11/2000 |
| EP | 1 097 979 A1 | 5/2001 |
| EP | 1 108 735 A1 | 6/2001 |
| EP | 1 113 064 A1 | 7/2001 |
| EP | 1 136 539 A1 | 9/2001 |
| EP | 1 180 533 A1 | 2/2002 |
| EP | 1 187 872 A1 | 3/2002 |
| EP | 1 193 289 A1 | 4/2002 |
| EP | 1 215 252 A2 | 6/2002 |
| EP | 1 261 559 A1 | 12/2002 |
| EP | 1 360 253 A2 | 11/2003 |
| EP | 1 362 904 A1 | 11/2003 |
| EP | 1 387 011 A1 | 2/2004 |
| EP | 1 387 169 A1 | 2/2004 |
| EP | 1 392 619 A1 | 3/2004 |
| EP | 1 392 772 A1 | 3/2004 |
| EP | 1 401 903 A2 | 3/2004 |
| EP | 1 407 792 A1 | 4/2004 |
| EP | 1 429 919 ZA1 | 6/2004 |
| EP | 1 433 821 A1 | 6/2004 |
| EP | 0 969 718 B1 | 9/2004 |
| EP | 1 473 355 A1 | 11/2004 |
| EP | 1 475 234 A1 | 11/2004 |
| EP | 1 479 738 A1 | 11/2004 |
| EP | 1 492 837 A1 | 1/2005 |
| EP | 1 503 813 A1 | 2/2005 |
| EP | 1 524 290 A1 | 4/2005 |
| EP | 1 583 615 A1 | 10/2005 |
| EP | 1 902 091 A2 | 1/2007 |
| EP | 1 752 284 A1 | 2/2007 |
| EP | 1 857 497 A2 | 11/2007 |
| EP | 1 873 218 A1 | 1/2008 |
| EP | 1 875 279 A1 | 1/2008 |
| EP | 1 883 669 A1 | 2/2008 |
| EP | 1 908 804 A1 | 4/2008 |
| EP | 1 988 129 A2 | 11/2008 |
| EP | 1 997 619 A1 | 12/2008 |
| EP | 2 346 678 | 7/2011 |
| EP | 2 678 400 | 8/2012 |
| EP | 2 547 832 | 1/2013 |
| EP | 2 791 255 | 6/2013 |
| EP | 2 864 430 | 4/2015 |
| GB | 1 341 605 A | 12/1973 |
| GB | 1 465 495 | 2/1977 |
| GB | 2 484 751 A | 4/2012 |
| JP | 62-246960 A | 10/1987 |
| JP | H05-186738 A | 7/1993 |
| JP | H07-090691 A | 4/1995 |
| JP | H10-309768 A | 11/1998 |
| JP | 2002-020575 A | 1/2002 |
| JP | 2004-143352 A | 5/2004 |
| JP | 2004162133 A | 6/2004 |
| JP | 2004308984 A | 11/2004 |
| JP | 2005082616 A | 3/2005 |
| JP | 2005-533946 A | 11/2005 |
| JP | 2006131938 A | 5/2006 |
| JP | 2006-176559 A | 7/2006 |
| JP | 2007144917 A | 6/2007 |
| JP | 2007182491 A | 7/2007 |
| JP | 2007-526366 A | 9/2007 |
| JP | 2008228958 A | 10/2008 |
| JP | 2009071672 A | 4/2009 |
| JP | 2009-100879 A | 5/2009 |
| JP | 2009-120792 A | 6/2009 |
| KR | 10-2003-052853 | 6/2003 |
| KR | 10-2009-90240 | 10/2010 |
| MX | 175646 | 8/1994 |
| MX | 183533 | 12/1996 |
| MX | 192053 | 5/1999 |
| MX | 195031 | 1/2000 |
| MX | 199899 | 11/2000 |
| MX | 201072 | 3/2001 |
| MX | 203880 | 8/2001 |
| MX | 205074 | 11/2001 |
| MX | PA01011653 A | 12/2002 |
| MX | 215752 | 8/2003 |
| MX | PA02006399 A | 9/2003 |
| MX | PA04010165 A | 2/2005 |
| MX | PA05006898 A | 8/2005 |
| MX | PA02012841 A | 1/2006 |
| MX | 234477 | 2/2006 |
| MX | PA06003323 A | 3/2006 |
| WO | WO 86-05389 A1 | 9/1986 |
| WO | WO 91-04305 A1 | 4/1991 |
| WO | WO 93-16131 A1 | 8/1993 |
| WO | WO 94-13734 A1 | 6/1994 |
| WO | WO 96-04123 A1 | 2/1996 |
| WO | WO 96-07621 A1 | 3/1996 |
| WO | WO 97-07993 A1 | 3/1997 |
| WO | WO 98-20960 A1 | 5/1998 |
| WO | WO 99-23137 A1 | 5/1999 |
| WO | WO 99-23437 A1 | 5/1999 |
| WO | WO 99-40431 A1 | 8/1999 |
| WO | WO 99-47578 A1 | 9/1999 |
| WO | WO 99-48339 A1 | 9/1999 |
| WO | WO 99-57185 A1 | 11/1999 |
| WO | WO 99-64363 A1 | 12/1999 |
| WO | WO 00-05321 A1 | 2/2000 |
| WO | WO 00-14297 A1 | 3/2000 |

(56) References Cited

FOREIGN PATENT DOCUMENTS

| | | |
|---|---|---|
| WO | WO 00-25938 A1 | 5/2000 |
| WO | WO 00-34361 A1 | 6/2000 |
| WO | WO 00-39240 A1 | 7/2000 |
| WO | WO 00-46464 A1 | 8/2000 |
| WO | WO 00-66241 A1 | 11/2000 |
| WO | WO 01-19745 A1 | 3/2001 |
| WO | WO 01-62682 A1 | 8/2001 |
| WO | WO 01-74739 A1 | 10/2001 |
| WO | WO 01-79142 A1 | 10/2001 |
| WO | WO 01-79371 A2 | 10/2001 |
| WO | WO 01-98399 A1 | 12/2001 |
| WO | WO 02-14417 A1 | 2/2002 |
| WO | WO 02-28951 A1 | 4/2002 |
| WO | WO 02-062910 A2 | 8/2002 |
| WO | WO 02-074869 A1 | 9/2002 |
| WO | WO 02-098983 A1 | 12/2002 |
| WO | WO 03-010255 A2 | 2/2003 |
| WO | WO 03-012004 A1 | 2/2003 |
| WO | WO 03-030879 A1 | 4/2003 |
| WO | WO 03-037702 A1 | 5/2003 |
| WO | WO 03-045693 A1 | 6/2003 |
| WO | WO 03-063646 A2 | 8/2003 |
| WO | WO 03-080258 A2 | 10/2003 |
| WO | WO 03-082998 A1 | 10/2003 |
| WO | WO 03-093568 A1 | 11/2003 |
| WO | WO 2004-009920 A1 | 1/2004 |
| WO | WO 2004-012625 A1 | 2/2004 |
| WO | WO 2004-043319 A2 | 5/2004 |
| WO | WO 2004-058418 A1 | 7/2004 |
| WO | WO 2004-104116 A1 | 12/2004 |
| WO | WO 2004-110132 A2 | 12/2004 |
| WO | WO 2005-021843 A1 | 3/2005 |
| WO | WO 2005-023935 A1 | 3/2005 |
| WO | WO 2005-028562 A1 | 3/2005 |
| WO | WO 2005-068399 A1 | 7/2005 |
| WO | WO 2005-077429 A1 | 8/2005 |
| WO | WO 2006/044641 A2 | 4/2006 |
| WO | WO 2006-044642 A2 | 4/2006 |
| WO | WO 2006-081891 A1 | 8/2006 |
| WO | WO 2006-083600 A1 | 8/2006 |
| WO | WO 2006-101934 A1 | 9/2006 |
| WO | WO 2006-135755 A2 | 12/2006 |
| WO | WO 2007-011731 A2 | 1/2007 |
| WO | WO 2007-027276 A1 | 3/2007 |
| WO | WO 2007-052260 A2 | 5/2007 |
| WO | WO 2007-053266 A1 | 5/2007 |
| WO | WO 2007-056427 A2 | 5/2007 |
| WO | WO 2007-070801 A2 | 6/2007 |
| WO | WO 2007-075407 A1 | 7/2007 |
| WO | WO 2007-092746 A2 | 8/2007 |
| WO | WO 2007-102960 A2 | 9/2007 |
| WO | WO 2007-104494 A1 | 9/2007 |
| WO | WO 2007-126432 A1 | 11/2007 |
| WO | WO 2007-126743 A1 | 11/2007 |
| WO | WO 2007-130294 A2 | 11/2007 |
| WO | WO 2007-149617 A1 | 12/2007 |
| WO | WO 2008-004827 A1 | 1/2008 |
| WO | WO 2008-004828 A1 | 1/2008 |
| WO | WO 2008-006078 A2 | 1/2008 |
| WO | WO 2008-021791 A2 | 2/2008 |
| WO | WO 2008-035347 A2 | 3/2008 |
| WO | WO 2008-035917 A1 | 3/2008 |
| WO | WO 2008-050895 A1 | 5/2008 |
| WO | WO 2008-051221 A2 | 5/2008 |
| WO | WO 2008-066828 A2 | 6/2008 |
| WO | WO 2008-078346 A1 | 7/2008 |
| WO | WO 2008-106494 A1 | 9/2008 |
| WO | WO 2008-112158 A1 | 9/2008 |
| WO | WO 2008-123650 A1 | 10/2008 |
| WO | WO 2008-123955 A1 | 10/2008 |
| WO | WO 2008-123961 A1 | 10/2008 |
| WO | WO 2008-134243 A1 | 11/2008 |
| WO | WO 2008-137973 A1 | 11/2008 |
| WO | WO 2008-151991 A1 | 12/2008 |
| WO | WO 2008-153687 A2 | 12/2008 |
| WO | WO 2009-003847 A1 | 1/2009 |
| WO | WO 2009-005465 A1 | 1/2009 |
| WO | WO 2009-012116 A2 | 1/2009 |
| WO | WO 2009-018327 A2 | 2/2009 |
| WO | WO 2009-032988 A1 | 3/2009 |
| WO | WO 2009-037717 A2 | 3/2009 |
| WO | WO 2009-041752 A1 | 4/2009 |
| WO | WO 2009-061199 A1 | 5/2009 |
| WO | WO 2009-076108 A1 | 6/2009 |
| WO | WO 2009-148611 A1 | 12/2009 |
| WO | WO 2009-158567 A1 | 12/2009 |
| WO | WO 2010/033288 A2 | 3/2010 |
| WO | WO 2010/042191 A1 | 4/2010 |
| WO | WO 2010-042668 A1 | 4/2010 |
| WO | WO 2011-116005 A1 | 9/2011 |
| WO | WO 2011-151151 A1 | 12/2011 |
| WO | WO 2012-115986 A1 | 8/2012 |
| WO | WO 2013-090939 A1 | 6/2013 |
| WO | WO 2014-003852 A9 | 1/2014 |
| WO | WO 2015-048539 A1 | 4/2015 |

OTHER PUBLICATIONS

EP App 06787306.7 prosecution history, now EP 1 902 091, as of May 22, 2013, Guire (Innovative Surface Technologies) (published as WO2007/11731).

"Composition," in *Collins English Dictionary*, found at http://www.credoreference.com/entry/hcengdict/composition, 2000 (viewed Aug. 26, 2013).

"NeverWet—product characteristics," found at http://www.neverwet.com/product-characteristics.php, NeverWet LLC (viewed Mar. 7, 2013).

"Yield strength, elastic limit, and ultimate strength," found at http://inventor.grantadesign.com/en/notes/science/material/S04%20strength.htm, Granta Design Ltd. (viewed Feb. 10, 2015).

2009 R&D 100 Award Entry Form (p. 5 excerpt from another document) showing Fig. 1 Schematic of NICE ("no ice nanocoating") (2009).

Bae et al., "Superhydrophobicity of cotton fabrics treated with silica nanoparticles and water-repellent agent," *J Colloid Interface Sci*, abstract only (May 3, 2009; epublication ahead of print).

Bayer Materials Science product information on Bayhydrol® 110 polyurethane dispersion (two first pages of this brochure) (Aug. 2002).

Bayer Materials Science product information on Bayhydrol® 122 polyurethane dispersion (Jan. 2004).

Bayer Materials Science product information on Bayhydrol® 124 polyurethane dispersion (Jan. 2004).

Bayer Materials Science product information on Bayhydrol® 140AQ, polyurethane dispersion (Aug. 2002).

Bayer Materials Science product information on Bayhydrol® A145, aqueous hydroxyl-functional polyurethane dispersion (Jan. 2010).

Beyler et al, "Thermal Decomposition of Polymers," Chapter 7 of *The SFPE Handbook of Fire Protection Engineering* ($3^{rd}$ ed.), pp. 1-110-1-131 (2002).

Bliznakov et al., "Double-scale roughness and superhydrophobicity on metalized Toray carbon fiber paper," *Langmuir*, 25(8):4760-4766, abstract only (Apr. 21, 2009).

Boinovich et al., "Principles of design of superhydrophobic coatings by deposition from dispersions," *Langmuir*, 25(5):2907-2912, abstract only (Mar. 3, 2009).

Boinovich et al., "Principles of Design of Superhydrophobic Coatings by Deposition from Dispersions," *Langmuir*, abstract only (Feb. 10, 2009; epublication ahead of print).

Bravo et al., "Transparent superhydrophobic films based on silica nanoparticles," *Langmuir*, 23(13):7293-7298, abstract only (Jun. 19, 2007; published May 25, 2007).

Choi et al., "Large slip of aqueous liquid flow over a nanoengineered superhydrophobic surface," *Phys Rev Lett*, 96(6):066001, abstract only (Feb. 17, 2006; published Feb. 16, 2006).

Clark, M.D.T. et al. "Paints and Pigments" available at nzic.org.nz/ChemProcesses/polymers/10D.pdf (copyright 2005-2008 at http://nzic.org.nz/ChemProcesses/polymers/).

(56) References Cited

OTHER PUBLICATIONS de Givenchy et al., "Fabrication of Superhydrophobic PDMS Surfaces by Combining Acidic Treatment and Perfluorinated Monolayers," *Langmuir*, 25(11):6448-6453, abstract only (Jun. 2, 2009).
Du, "Surfactants, Dispersants, and Defoamers for the Coatings, Inks, and Adhesives Industries," in *Coatings Technology Handbook*, Third Edition, Tracton (ed.), CRC Press (2005).
EPO Communication dated Dec. 5, 2011, regarding third-party observations filed in European Application No. 09771098.2.
Expancel DE product list, "Product Specification for Expancel® Microspheres," Issue 10.2010, AkzoNobel (Oct. 2010).
Extended European search report for European Application No. 920119918, dated Jul. 22, 1997.
Extended European search report for European Application No. 09771098.2, dated Dec. 27, 2011.
Extended European search report for European Application No. 09819518, dated Jul. 22, 2014.
Fürstner et al., "Wetting and self-cleaning properties of artificial superhydrophobic surfaces," *Langmuir*, 21(3):956-961, abstract only (Feb. 1, 2005).
García et al., "Use of p-toluenesulfonic acid for the controlled grafting of alkoxysilanes onto silanol containing surfaces; preparation of tunable hydrophilic, hydrophobic, and super-hydrophobic silica," *J Am Chem Soc*, 129(16):5052-5060, abstract only (Apr. 25, 2007; epublished Mar. 31, 2007).
Gonçalves et al., "Superhydrophobic cellulose nanocomposites," *J. Colloid Interface Sci*, 324(1-2):42-46, abstract only (Aug. 2008; epublished May 7, 2008).
Guo et al., "A novel approach to stable superhydrophobic surfaces," *Chemphyschem*, 7(8):1674-1677, abstract only (Aug. 11, 2006; epublished Jul. 17, 2006).
International Preliminary Report on Patentability for International Application No. PCT/US2010/059909, dated Apr. 21, 2011.
International Search Report and Written Opinion for International Application No. PCT/US2009/005512, dated Dec. 8, 2009.
International Search Report and Written Opinion for International Application No. PCT/US2009/048775, dated Nov. 19, 2009.
International Search Report and Written Opinion for International Application No. PCT/US2009/059909, dated Dec. 4, 2009.
International Search Report and Written Opinion for International Application No. PCT/US2010/048711, dated Mar. 17, 2011.
International Search Report and Written Opinion for International Application No. PCT/US2010/054936, dated Feb. 16, 2011.
International Search Report and Written Opinion for International Application No. PCT/US2010/070200, dated Feb. 27, 2013.
International Search Report and Written Opinion for International Application No. PCT/US2013/031751, dated Dec. 23, 2013.
International Search Report and Written Opinion for International Application No. PCT/US2014/057848, dated Dec. 29, 2014.
Jauregui-Beloqui et al., "Thermoplastic polyurethane-fumed silica composites: influence of the specific surface area of fumed silica on the viscoelastic and adhesion properties," *Journal of Adhesive Science and Technology*, 13(6):695-711, abstract only (1999).
Kietzig et al., "Patterned superhydrophobic metallic surfaces," *Langmuir*, 25(8):4821-4827, abstract only (Apr. 21, 2009).
Kim et al., "A simple fabrication route to a highly transparent super-hydrophobic surface with a poly(dimethylsiloxane) coated flexible mold," *Chem Commun (Camb)*, 22:2237-2239, abstract only (Jun. 14, 2007; epublished Mar. 6, 2007).
Kobayashi et al., Surface Tension of Poly[(3,3,4,4,5,5,6,6,6-nonafluorohexyl)-methylsiloxane], *Macromolecules*, 23:4929-4933 (1990).
Kraton® FG1924 G Polymer, Data Document, Identifier K123DDeO9U, the KRATON Polymers Group of Companies (Aug. 10, 2009).
Le Marechal et al., "Textile Finishing Industry as an Important Source of Organic Pollutants," in *Organic Pollutants Ten Years After the Stockholm Convention—Environmental and Analytical Update*, Puzyn (ed.), Chapter 2, pp. 29-54, InTech (2012).
Lee et al., "Impact of a superhydrophobic sphere onto water," *Langmuir*, 24(1):142-145, abstract only (Jan. 1, 2008; epublished Nov. 14, 2007).
Li et al., "Conversion of a metastable superhydrophobic surface to an ultraphobic surface," *Langmuir*, 24(15):8008-8012, abstract only (Aug. 5, 2008; epublished Jul. 8, 2008).
Ling et al., "Stable and transparent superhydrophobic nanoparticle films," *Langmuir*, 25(5):3260-3263, abstract only (Mar. 3, 2009).
Litvinov et al., "Structure of a PDMS Layer Grafted onto a Silica Surface Studied by Means of DSC and Solid-State NMR," *Macromolecules*, 35(11):4356-4364 (2002).
Manca et al., "Durable superhydrophobic and antireflective surfaces by trimethylsilanized silica nanoparticles-based sol-gel processing," *Langmuir*, 25(11):6357-6362, abstract only (Jun. 2, 2009).
Marmur, "Super-hydrophobicity fundamentals: implications to biofouling prevention," *Biofouling*, 22(1-2):107-115, abstract only (2006).
Ming et al., "Toward Superlyophobic Surfaces," *Contact Angle, Wettability and Adhesion* (ed. Mittal), vol. 6, pp. 191-205, Koninklijke Brill NV, Leiden (2009).
Nosonovsky et al., "Patterned nonadhesive surfaces: superhydrophobicity and wetting regime transitions," *Langmuir*, 24(4):1525-1533, abstract only (Feb. 19, 2008; epublished Dec. 12, 2007).
Park et al., "Wetting transition and optimal design for microstructured surfaces with hydrophobic and hydrophilic materials," *J. Colloid Interface Sci*, 336(1):298-303, abstract only (Aug. 1, 2009; epublished Apr. 15, 2009).
Perez, Jr., et al., "Performance and Processing Enhancements of Aromatic Polyurea Elastomer Systems Prepared from High 2,4'-MDI Isocyanates," in *Polyurethanes Conference 2000: Defining the Future Through Technology*, Boston, Massachusetts, pp. 219-232 (Oct. 8-11, 2000).
Piret et al., "Biomolecule and nanoparticle transfer on patterned and heterogeneously wetted superhydrophobic silicon nanowire surfaces," *Langmuir*, 24(5):1670-1672, abstract only (Mar. 4, 2008; epublished Feb. 6, 2008).
Puukilainen et al., "Superhydrophobic polyolefin surfaces: controlled micro- and nanostructures," *Langmuir*, 23(13):7263-7268, abstract only (Jun. 19, 2007; epublished May 23, 2007).
Sakai et al., "Direct observation of internal fluidity in a water droplet during sliding on hydrophobic surfaces," *Langmuir*, 22(11):4906-4909, abstract only (May 23, 2006).
Sherwin Williams Chemical Coatings product information for CC-D14, POLANE® 2.8T, plus polyurethane enamel (Oct. 19, 2006).
Sherwin Williams Chemical Coatings product information for CC-D5, POLANE® T, polyurethane enamel (Sep. 2001).
Sherwin Williams Chemical Coatings product information for CC-E14, POLANE® 700T, water reducible enamel (May 2010).
Shirtcliffe et al., "Wetting and wetting transitions on copper-based super-hydrophobic surfaces," *Langmuir*, 21(3):937-943, abstract only (Feb. 1, 2005).
Smith et al., "Modeling of PDMS—Silica Nanocomposites," *NSTI-Nanotech*, 3:115-118 (2004).
*SSW Holding Company, Inc. v. Schott Gemtron Corporation*, Civil Docket, Civil Action No. 3:12-cv-00661-CRS (as of Dec. 6, 2013).
*SSW Holding Company, Inc. v. Schott Gemtron Corporation*, Complaint for Patent Infringement, Demand for Jury Trial, Civil Action No. 3:12-cv-00661-CRS (Oct. 16, 2012).
Su et al., "From Suerhydrophophilic to Superhydrophobic: Controlling Wettability of Hydroxide Zinc Carbonate Film on Zinc Plates," *Langmuir*, abstract only (Feb. 10, 2009; epublication ahead of print).
Synytska et al., "Wetting on Fractal Superhydrophobic Surfaces from 'Core-Shell' Particles: A Comparison of Theory and Experiment," *Langmuir*, abstract only (Feb. 10, 2009; epublication ahead of print).
Torró-Palau et al., "Characterization of polyurethanes containing different silicas," *International Journal of Adhesion and Adhesives*, 21(1):1-9, abstract only (2001).

(56) References Cited

OTHER PUBLICATIONS

Two webpages re pigment particle size: http://www.specialchem4coatings.com/tc/color-handbook/index.aspx?id=size and http://www.specialchem4coatings.com/tc/tio2/index.aspx?id=whiteness, SpecialChem, S.A. (printed on Jul. 19, 2013).
Venkateswara et al., "Preparation of MTMS based transparent superhydrophobic silica films by sol-gel method," *J Colloid Interface Sci*, 332(2):484-490, abstract only (Apr. 15, 2009; epublished Jan. 14, 2009).
Wang et al., "One-step coating of fluoro-containing silica nanoparticles for universal generation of surface superhydrophobicity," *Chem Commun (Camb)*,7:877-879, abstract only (Feb. 21, 2008; epublished Dec. 18, 2007).
Yang et al., "Influence of surface roughness on superhydrophobicity," *Phys Rev Lett*, 97(11):116103, abstract only (Sep. 15, 2006; epublished Septenber 14, 2006).
Zhang et al., "Application of superhydrophobic edge effects in solving the liquid outflow phenomena," *Langmuir*, 23(6):3230-3235, abstract only (Mar. 13, 2007; epublished Jan. 25, 2007).
Zhou et al., "Study on the morphology and tribological properties of acrylic based polyurethane/fumed silica composite coatings," *Journal of Materials Science*, 39:1593-1594, abstract only (2004).
"Surfactant," found at https://en.wikipedia.org/wiki/Surrfactant, Wikipedia (viewed Dec. 28, 2015).
"TABER® Test Method Reference," found at http://www.taberindustries.com/documents/Taber Test Reference by Method.pdf (Jun. 2014, viewed Oct. 6, 2015) (2 pages).
Extended European search report for European Application No. 12749985.3, dated Oct. 15, 2015.
Extended European search report for European Application No. 12857248.4, dated Apr. 7, 2015.
International Search Report and Written Opinion for International Application No. PCT/US2011/028541 (published as WO Publication No. 2011/116005), dated May 17, 2011.
Kovalchuk et al., "Fluoro- vs hydrocarbon surfactants: Why do they differ in wetting performance?," *Advances in Colloid and Interface Science*, 210:65-71 (available online Apr. 13, 2014).
Kraton® FG1901 G Polymer, Data Document, Identifier K127DDh14U, the KRATON Polymers Group of Companies (Jun. 17, 2014).
Kraton™ Polymers for Modification of Thermoplastics, found at http://docs.kraton.com/kraton/attachments/downloads/81311AM.pdf (last accessed on Aug. 3, 2015).
Mohammadi et al., "Effect of Surfactants on Wetting of Super-Hydrophobic Surfaces," *Langmuir*, 20:9657- 9662 (available online Oct. 2, 2004).
Prosecution History of U.S. Appl. No. 13/082,319, filed Apr. 7, 2011, as downloaded on Jan. 5, 2016.
Prosecution History of U.S. Appl. No. 13/082,327, filed Apr. 7, 2011, as downloaded on Jan. 5, 2016.
Prosecution History of U.S. Appl. No. 13/618,779, filed Sep. 14, 2012, as downloaded on Jan. 5, 2016.
Prosecution History of U.S. Appl. No. 14/229,047, filed Mar. 28, 2014, as downloaded on Jan. 14, 2016.
Prosecution History of U.S. Appl. No. 14/305,425, filed Jun. 16, 2014, as downloaded on Jan. 5, 2016.
Prosecution History of U.S. Appl. No. 14/320,315, filed Jun. 30, 2014, as downloaded on Jan. 5, 2016.
Prosecution History of U.S. Appl. No. 14/320,358, filed Jun. 30, 2014, as downloaded on Jan. 5, 2016.
Prosecution History of U.S. Appl. No. 14/323,660, filed Jul. 3, 2014, as downloaded on Jan. 5, 2016.
Prosecution History of U.S. Appl. No. 14/837,253, filed Aug. 27, 2015, as downloaded on Jan. 12, 2016.
International Preliminary Report on Patentability for International Application No. PCT/US2009/048775, dated January, Nov. 19, 2009.
Extended European search report for European Application No. 11756868.8, dated Feb. 5, 2016.
Extended European search report for European Application No. 13809987.4, dated Feb. 22, 2016.
Machine translation, German Application No. DE10306891, 8 pages, (prepared Aug. 6, 2015).
Machine translation, Japanese Application No. JP 2002-020575 A, 15 pages, (prepared Aug. 6, 2015).
Machine translation, Japanese Application No. JP 2004-143352 A, 13 pages, (prepared Aug. 6, 2015).
Machine translation, Japanese Application No. JP 2006-176559 A, 15 pages, (prepared Aug. 6, 2015).
Machine translation, Japanese Application No. JP 2009-120792 A, 24 pages, (prepared Aug. 6, 2015).
Shang et al., "Facile fabrication of superhydrophpobic surface via SiO2/fluoro-containing polymer composite particles," CAPlus Abstract, Accession No. 2013:1045604, 2 pages (Jul. 5, 2013).

\* cited by examiner

Figure 1: Abrasion Resistance for loss of superhydrophobicity (measured in Taber cycles for various BAYHYDROL®s in a one-step superhydrophobic coating.

Figure 2: Schematic showing the effect of different BAYHYDROL®s in distribution of TS720 nano particles across the coating thickness.

Figure 3: Surface roughness (Ra) as a function of coating thickness for one step coating made with BAYHYDROL® 140AQ Figure 4: Taber cycle variation with coating thickness of one-step coating prepared using BAYHYDROL® 140AQ.

Figure 5: Taber cycle variation with increasing surface roughness of coatings prepared using BAYHYDROL® 140AQ.

Figure 6: Surface roughness, Ra, as a function of thickness for one-step superhydrophobic coating on steel plates using BAYHYDROL® 140AQ and clear 700T with TS720 ranging from 11-20%.

Figure 7: Surface roughness, Rz, as a function of thickness for one-step superhydrophobic coating on steel plates using BAYHYDROL® 140AQ and clear 700T with TS720 ranging from 11-20%.

Figure 8: Taber cycles as a function of thickness for one-step superhydrophobic coating on steel plates using BAYHYDROL® 140AQ and clear 700T with TS720 ranging from 11-20%.

Figure 9: Surface roughness, Ra, as a function of thickness for one-step superhydrophobic coating on steel plates using BAYHYDROL® 140AQ and clear 700T with TS720 ranging from 11-20%.

Figure 10: Surface roughness, Rz, as a function of thickness for one-step superhydrophobic coating on steel plates using BAYHYDROL® 140AQ and clear 700T with TS720 ranging from 11-20% & 7% of Tiger Drylac First particle.

Figure 11: Taber cycles as a function of thickness for one-step superhydrophobic coating on steel plates using BAYHYDROL® 140AQ and clear 700T with TS720 ranging from 11-20% & 7% of Tiger Drylac First particle.

Figure 12: Surface roughness, Ra, as a function of thickness for one-step superhydrophobic coating on steel plates using BAYHYDROL® 140AQ and white 700T with TS720 ranging from 11-20%.

Figure 13: Surface roughness, Rz, as a function of thickness for one-step superhydrophobic coating on steel plates using BAYHYDROL® 140AQ and white 700T with TS720 ranging from 11-20%.

Figure 14: Taber cycles as a function of thickness for one-step superhydrophobic coating on steel plates using BAYHYDROL® 140AQ and white 700T with TS720 ranging from 11-20%.

Figure 15: Surface roughness, Ra, as a function of thickness for one-step superhydrophobic coating on steel plates using BAYHYDROL® 140AQ and white 700T with TS720 ranging from 11-20% & 7% of Tiger Drylac First particle.

Figure 16: Surface roughness, Rz, as a function of thickness for one-step superhydrophobic coating on steel plates using BAYHYDROL® 140AQ and clear 700T with TS720 ranging from 11-20% & 7% of Tiger Drylac First particle.

Figure 17: Taber cycles as a function of thickness for one-step superhydrophobic coating on steel plates using BAYHYDROL® 140AQ and white 700T with TS720 ranging from 11-20% & 7% of Tiger Drylac First particle.

Figure 18: Taber cycles as a function of coating thickness for one-step superhydrophobic coating on steel plates using BAYHYDROL® 140AQ and with clear 700T. Data for 5, 7, and 9% TS720 are included for comparison.

Figure 19: Taber cycles as a function of coating thickness for one-step superhydrophobic coating on steel plates using BAYHYDROL® 140AQ and with white 700T. Data for 5, 7, and 9% TS720 are included for comparison.

Figure 20: Taber cycles as a function of coating thickness for one-step superhydrophobic coating on steel plates using BAYHYDROL® 140AQ and with clear 700T. Data for 11% TS720 are included for comparison.

Figure 21: Taber cycles as a function of coating thickness for one-step superhydrophobic coating on steel plates using BAYHYDROL® 140AQ and with white 700T. Data for 11% TS720 are included for comparison.

Figure 22: Taber cycles as a function of coating thickness for one-step superhydrophobic coating on steel plates using BAYHYDROL® 140AQ and with clear and white 700T with TS720 of 11% and same compared with first particle of 7%. Four cases are compared.

Figure 23: Taber cycles as a function of coating thickness for one-step superhydrophobic coating on steel plates using BAYHYDROL® 140AQ and with clear and white 700T with TS720 of 15% and same compared with first particle of 7%. Four cases are compared.

Figure 24: Taber cycles as a function of coating thickness for one-step superhydrophobic coating on steel plates using BAYHYDROL® 140AQ and with clear and white 700T with TS720 of 20% and same compared with first particle of 7%. Four cases are compared.

Figure 25: Taber cycles as a function of coating thickness for one-step superhydrophobic coating on steel plates using BAYHYDROL® 140AQ with clear or white 700T with TS720 of 11%.

Figure 26: Surface roughness, Ra, as a function of thickness for one-step superhydrophobic coating on steel plates using BAYHYDROL® 140AQ and with clear and white 700T with TS720 ranging from 11% and first particle of 7%.

Figure 27: Surface roughness, Ra, as a function of thickness for one-step superhydrophobic coating on steel plates using BAYHYDROL® 140AQ and with clear and white 700T with TS720 of 11% and no first particle.

Figure 28: Surface roughness, Ra, as a function of thickness for one-step superhydrophobic coating on steel plates using BAYHYDROL® 140AQ and with clear and white 700T with TS720 of 11% and first particle of 7%.

Figure 29: Comparison of Taber cycles between clear 700T and same with S60 at 250-g load.

Figure 30: Comparison of Taber cycles between clear 700T and same with S60 at 500-g load.

Figure 31: Comparison of Taber cycles between clear 700T and same with S60 at 1000-g load.

Figure 32: Comparison of Taber cycles between clear 700T and same with S60 at 1000-g load.

SUPERHYDROPHOBIC AND OLEOPHOBIC COATINGS WITH LOW VOC BINDER SYSTEMS

This application is a continuation of International Application No. PCT/US2012/025982, which was filed Feb. 21, 2012 and which claims the benefit of U.S. Provisional Application No. 61/445,001, which was filed Feb. 21, 2011, each of which applications is hereby incorporated by reference in its entirety.

BACKGROUND

The superhydrophobic (SH) and superoleophobic surfaces are defined as those where water or oil droplet contact angles exceed 150°. Such surfa have a variety of uses, including their ability to prevent or resist water, dirt and/or ice from attaching to a surface. A variety of hydrophobic and oleophobic surface coating compositions have been described that employ high amounts of volatile organic compounds (VOCs) including those that participate in atmospheric photochemical reactions. Those contrast with the coating compositions described herein that utilize water and/or VOC-exempt organic solvents that have been found to undergo limited amounts of atmospheric photochemical reactions and lower amounts of photochemically active VOCs.

SUMMARY

This disclosure sets forth coating compositions that employ water-based binder systems that have a low VOC content and/or low non-exempt VOC content, thereby providing a variety of environmental benefits in their application. The coating compositions described herein remain substantially hydrophobic/oleophobic even when abraded, and have increased durability and/or life span when subjected to normal wear and tear compared to coatings where hydrophobic and/or oleophobic components are restricted to the coating's surfaces.

DETAILED DESCRIPTION

Low VOC Coatings

Figure 1:
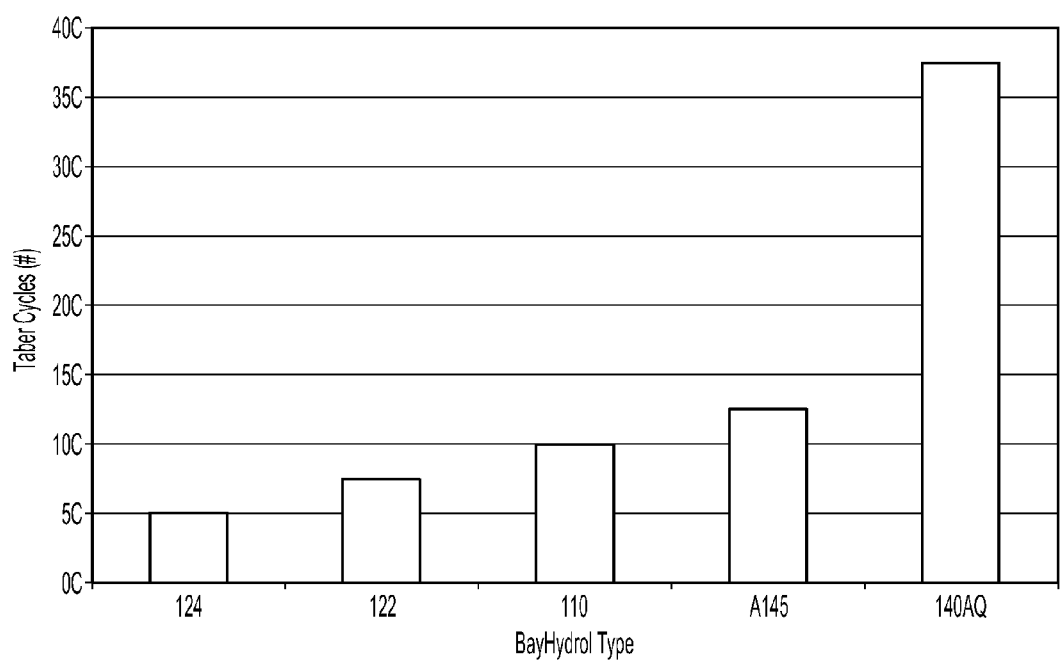
FIG. 1 is a histogram plotting the amount of abrasion (measured in Taber cycles using a CS 10 wheel and 250 g load) causing a loss of superhydrophobicity for five one-step coatings prepared with various BAYHYDROL® based binders (see Appendix A).

Compositions for forming hydrophobic and/or oleophobic coatings described in this disclosure include one-step compositions that employ water-based polyurethanes (or combinations of water based polyurethanes) as a binder in combination with one or more types of second particles. The compositions set forth in this disclosure may optionally include one or more types of first particles in addition to third particles.

The low VOC coating compositions described herein provide coatings that do not lose hydrophobicity and/or oleophobicity when their surface is abraded. As the coatings do not lose hydrophobicity and/or oleophobicity when abraded, the coatings permit thickness to be used as the basis to increase the abrasion resistance and durability.

1 Binders

To reduce the amount of VOC's, particularly non-exempt VOC's, that are released from coating compositions used to prepare hydrophobic and/or oleophobic coatings, water-based (also denoted as waterborne) binders may be used to prepare coating compositions that result in SH and/or OP coatings, including water-based polyurethanes (e.g., water-based polyurethane dispersions (PUDs), emulsions, and/or suspension).

In addition to low volatile organic compound content, water-based polyurethanes permit the formation of hydrophobic and/or oleophobic coatings that remain substantially hydrophobic and/or oleophobic even after substantial surface abrasion. Moreover, water-based polyurethanes offer mechanical flexibility, size/dimensional stability of the dried and cured coating, and they can resist embrittlement due to heat and/or light exposure. UV curable versions of water-based polyurethanes (e.g., PUDs) are also available that avoid the need to heat cure coatings, which is economically and environmentally desirable due to reduced energy expenditure associated with light cureable coating applications relative to those requiring or whose curing is enhanced by heating.

1.1 Water-Based Polyurethanes as Binders

A wide variety of water-based polyurethanes (polyurethane coating compositions comprising more than insubstantial amounts of water as a solvent and/or diluent) may be used to prepare hydrophobic and/or oleophobic coatings described herein. Polyurethanes are polymers consisting of a chain of organic units joined by urethane (carbamate) linkages. Polyurethane polymers are typically formed through polymerization of at least one type of monomer containing at least two isocyanate functional groups with at least one other monomer containing at least two hydroxyl (alcohol) groups. A catalyst may be employed to speed the polymerization reaction. Other components may be present in the polyurethane coating compositions to impart desirable properties including, but not limited to, surfactants and other additives that bring about the carbamate forming reaction(s) yielding a coating of the desired properties in a desired cure time.

In some embodiments, the polyurethane employed in the durable coatings may be formed from a polyisocyanate and a mixture of —OH (hydroxyl) and NH (amine) terminated monomers. In such systems the polyisocyanate can be a trimer or homopolymer of hexamethylene diisocyanate (HDI).

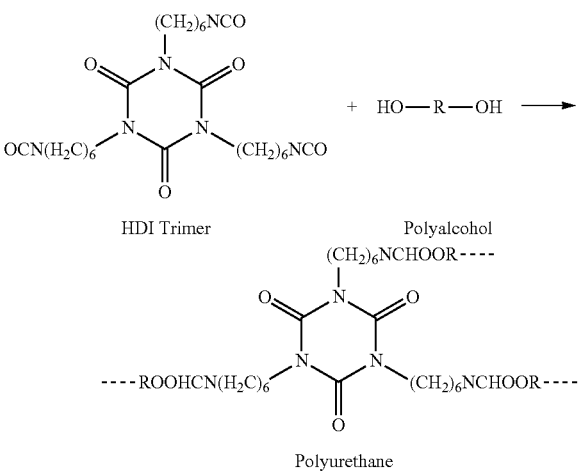

Some solvents compatible with such systems include water, n-butyl acetate, toluene, xylene, ethyl benzene, cyclohexanone, isopropyl acetate, N-methylpyrrolidone, and methyl isobutyl ketone and mixtures thereof; although not all of these solvents are VOC-exempt.

A variety of water-based (waterborne) polyurethane compositions may be employed for the preparation of hydrophobic, SH and/or oleophobic surfaces may be employed.

Among the commercial water-based polyurethanes that may be employed in the preparation of SH and OP surfaces are those that comprise polycarbonate, polyester, polyethers and/or polyacrylic urethanes, and their aliphatic counterparts (aliphatic polyester urethane resins, aliphatic polycarbonate urethane resins, and/or aliphatic acrylic urethanes. The structures of some examples of polyacrylic urethanes, polyester urethanes, and polycarbonate urethanes are provided below.

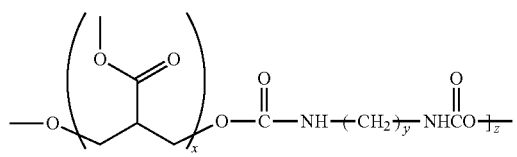

Polyacrylic urethane where x>1, 30>y>2, and z>1

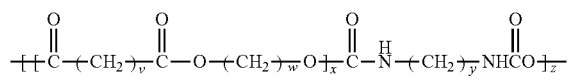

Polyester urethane where v>1, w>1, x>1, 2>y>30 and z>1

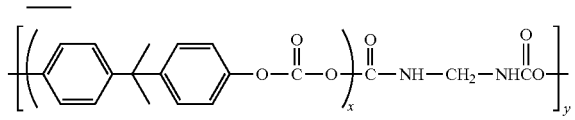

Polycarbonate urethane where x>1 and

In some embodiments, the water-based polyurethanes are selected from one or more members of the POLANE® (e.g., POLANE® 700T, Sherwin Williams, Cleveland, Ohio), KEM AQUA® (Sherwin-Williams), or the BAYHYDROL® (e.g., BAYHYDROL 110, 122, 124, A145, and 140AQ) families of polyurethane emulsion/dispersions. The polyurethane emulsions or PUDs used as binders to prepare the hydrophobic and/or oleophobic coatings described herein may be prepared in water, or a water containing medium comprising a cosolvent that is water miscible (e.g., isopropanol and/or acetone), particularly cosolvents that are VOC-exempt and water miscible (e.g., acetone).

Water-based polyurethane binders are compatible with, and show good adhesion to, a wide variety of surfaces. Using water-based polyurethane binders, superhydrophobic coatings may be formed on many, if not most surfaces including, but not limited to, those of various woods, metals, glasses, ceramics, stone, rubbers, fabrics, and plastics.

In some embodiments, the coating compositions for preparing hydrophobic and/or oleophobic coatings contain binder comprising water-based polyurethane emulsions or PUDs, such as polyacrylic urethanes or polyurethane-acrylic enamels. In one embodiment the PUDs employed as a binder are POLANE® compositions (Sherwin Williams), such as POLANE® 700T. In other embodiments, compositions for SH and OP coating preparation comprising BAYHYDROL® binders are employed for coating plastics and very flexible substrates. In such an embodiment, flexible materials, such as polycarbonate, ABS, PET, polystyrene, PVC and polyurethane Reaction Injection Molding (RIM) products, can typically be coated using a one (1) component (1K) waterborne coating.

In another embodiment, the coating compositions for preparing hydrophobic and/or oleophobic coatings contain a binder comprising water-based polyester-urethane or aliphatic polyester urethane dispersion or emulsion in a water containing medium. In another embodiment, the coating compositions for preparing hydrophobic and/or oleophobic coatings contain a binder comprising water-based polycarbonate urethane or aliphatic polycarbonate urethane dispersion or emulsion in a water containing medium. In one embodiment, the polyurethane emulsion or PUD employed as a binder system is a BAYHYDROL® (Bayer Material Sciences), such as BAYHYDROL® 110, 122, 124, A145, 140AQ. In some embodiments the polyurethane binders are UV curable such as BAYHYDROL® UV 2282, UV 2317, UV VP LS 2280, UV VP LS 2317, UV XP 2629, UV XP 2687, UV XP 2689, or UV XP 2690. Water-based polyurethanes may come as a single component ready to apply composition, or as a two or three part (component) system.

Data for a number of BAYHYDROL® compositions and data for some water based polyurethane compositions, such as POLANE®s (e.g., POLANE® 700T) can be obtained from the manufacturers.

In some embodiments, the water-based polyurethane binders comprise a polycarbonate and/or polyester modified waterborne PUD or an acrylic modified waterborne PUD, any of which may be used alone or in combination. In some embodiments, the water-based polyurethane binders comprise a BAYHYDROL® or POLANE® (e.g., POLANE® 700T and BAYHYDROL® 124), which may be used alone or in combination.

In some embodiments, the coating composition comprises waterborne polycarbonate and/or polyester modified waterborne PUD in addition to an acrylic modified waterborne PUD. In such embodiments, the ratio of the waterborne polycarbonate and/or polyester modified waterborne PUD to the acrylic modified waterborne PUD can be about 30:70, 35:65, 40:60, 45:55, 50:50, 55:45, 60:40, 65:35, or 70:30 on a weight-to-weight basis of the commercially available PUDs. In one such embodiment, the polycarbonate and/or polyester modified waterborne PUD is a BAYHYDROL® selected from BAYHYDROL® 110, 122, 124, A145, 140AQ and the acrylic modified waterborne PUD is a POLANE® such as POLANE® 700T.

In one embodiment, the coating composition for the application of superhydrophobic and/or oleophobic coatings on surfaces comprises: a polyurethane dispersion or suspension comprising one or more of a polyester urethane, a polyacrylic urethane and/or a polycarbonate urethane; from about 5 to about 30% by weight of second particles comprising one or more siloxanes, and/or one or more alkyl, haloalkyl, fluoroalkyl, or perfluoroalkyl containing moieties; and optionally comprising up to about 26% by weight of third particles; wherein said coating composition comprises less than 0.3 pounds per gallon of volatile non-exempt organic compounds; and wherein the superhydrophobic coating resulting from the application of said composition to a surface retains its superhydrophobicity after 150-1,400 Taber abrasion cycles at a 1000 g load for coating thickness range of 25-300 microns, and/or 100-2,500 Taber abrasion cycles at a 250 g load, using a CS10 wheel, as judged by the inability of more than 50% of the water droplets applied to the area of the coating subjected to said abrasion cycles to remain on the surface when the planar surface is inclined at 3 degrees. In some embodiments, the polyurethane dispersion or suspension comprises a polycarbonate, a polyurethane, and a polyacrylic urethane. The polycarbonate urethane and polyacrylic urethane may be present in any ratio including, but not limited to, 90:10, 80:20, 70:30, 60:40, and 50:50 (polycarbonate urethane:polyacrylic urethane).

In some embodiments, the above-describe water-borne polyurethane coating compositions (e.g., water based polyurethane dispersions or suspensions) comprise at least one polyester urethane, polyacrylic urethane, and/or polycarbonate urethane composition that when dried and cured produces a coating that has: (a) a modulus at 100% elongation of 1300 psi or greater, and/or (b) an elongation percent at break of 150% or greater. In other embodiments, such coating compositions comprise: a polyester urethane and a polyacrylic urethane; a polyester urethane and a polycarbonate urethane; a polyester urethane and a polycarbonate urethane; or polyester urethane, a polyacrylic urethane, and a polycarbonate urethane.

Superhydrophobic and/or oleophobic coatings compositions may be applied to form coatings having a broad range of thicknesses. In some embodiments, the coatings will have a thickness in a range selected from about 10 μm to about 225 μm or about 30 μm to 350 μm. Within this broad range are embodiments employing coatings of thicknesses that range from about 10 μm to about 25 μm, from about 25 μm to about 50 μm, from about 50 μm to about 75 μm, from about 75 μm to about 100 μm, from about 100 μm to about 125 μm, from about 125 μm to about 150 μm, from about 150 μm to about 175 μm, from about 175 μm to about 200 μm, from about 200 μm to about 225 μm, from about 15 μm to about 200 μm; from about 20 μm to about 150 μm; from about 30 μm to about 175 μm; from about 50 μm to about 200 μm; from about 20 μm to about 100 μm; from about 100 μm to about 220 μm; from about 220 μm to about 350 μm; from about 15 μm to about 150 μm; and from about 160 μm to about 350 μm.

2 First Particles

Embodiments of the coatings disclosed herein may comprise particles that are added to the binder compositions to improve the mechanical properties of the coating, e.g., the durability of the hydrophobic and/or oleophobic coatings. A wide variety of such particles, which are also known as extenders or fillers, may be added to the binders. Those particles are denoted as "first particles" because the coatings described herein may have one or more additional types of particles. Such first particles that may be employed in the hydrophobic, SH and/or OP coatings described herein include, but are not limited to, particles comprising: wood (e.g., wood dust), glass, metals (e.g., iron, titanium, nickel, zinc, tin), alloys of metals, metal oxides, metalloid oxides (e.g., silica), plastics (e.g., thermoplastics), carbides, nitrides, borides, spinels, diamond, and fibers (e.g., glass fibers).

Numerous variables may be considered in the selection of first particles. These variables include, but are not limited to, the effect the first particles have on the resulting coatings, their size, their hardness, their compatibility with the binder, the resistance of the first particles to the environment in which the coatings will be employed, and the environment the first particles must endure in the coating and/or curing process, including resistance to temperature and solvent conditions. In addition, if light is used for curing the coatings, the particle must be resistant to the required light exposure conditions (e.g., resistant to UV light).

In embodiments described herein, first particles have an average size in a range selected from about 1 micron (μm) to about 250 μm. Within such broader range, embodiments include ranges of first particles having an average size of from about 1 μm to about 5 μm, from about 5 μm to about 10 μm, from about 10 μm to about 15 μm, about 15 μm to about 20 μm, from about 20 μm to about 25 μm, from about 1 μm to about 25 μm, from about 5 μm to about 25 μm, from about 25 μm to about 50 μm, from about 50 μm to about 75 μm, from about 75 μm to about 100 μm, from about 100 μm to about 125 μm, from about 125 μm to about 150 μm, from about 150 μm to about 175 μm, from about 175 μm to about 200 μm, from about 200 μm to about 225 μm, and from about 225 μm to about 250 μm. Also included within the broader range are embodiments employing particles in ranges from about 10 μm to about 100 μm, from about 10 μm to about 200 μm, from about 20 μm to about 200 μm, from about 30 μm to about 50 μm, from about 30 μm to about 100 μm, from about 30 μm to about 200 μm, from about 30 μm to about 225 μm, from about 50 μm to about 100 μm, from about 50 μm to about 200 μm, from about 75 μm to about 150 μm, from about 75 μm to about 200 μm, from about 100 μm to about 225 μm, from about 100 μm to about 250 μm, from about 125 μm to about 225 μm, from about 125 μm to about 250 μm, from about 150 μm to about 200 μm, from about 150 μm to about 250 μm, from about 175 μm to about 250 μm, and from about 200 μm to about 250 μm.

First particles may be incorporated into binders at various ratios depending on the binder composition and the first particle's properties. In some embodiments, the first particles may have a content range selected from: about 1% to about 60% or more by weight. Included within this broad range are embodiments in which the first particles are present, by weight, in ranges from about 2% to about 5%, from about 5% to about 10%, from about 10% to about 15%, from about 15% to about 20%, from about 20% to about 25%, from about 25% to about 30%, from about 30% to about 35%, from about 35% to about 40%, from about 40% to about 45%, from about 45% to about 50%, from about 50% to about 55%, from about 55% to about 60%, and greater than 60%. Also included within this broad range are embodiments in which the first particles are present, by weight, in ranges from about 4% to about 30%, from about 5% to about 25%, from about 5% to about 35%, from about 10% to about 25%, from about 10% to about 30%, from about 10% to about 40%, from about 10% to about 45%, from about 15% to about 25%, from about 15% to about 35%, from about 15% to about 45%, from about 20% to about 30%, from about 20% to about 35%, from about 20% to about 40%, from about 20% to about 45%, from about 20% to about 55%, from about 25% to about 40%, from about 25% to about 45%, from about 25% to about 55%, from about 30% to about 40%, from about 30% to about 45%, from about 30% to about 55%, from about 30% to about 60%, from about 35% to about 45%, from about 35% to about 50%, from about 35% to about 60%, or from about 40% to about 60% on a weight basis.

In some embodiments, where the first particles comprise or consist of glass spheres, the first particles may be present in any of the foregoing ranges or in a range of from about 1% to about 40%, from about 3% to about 45%, from about 10% to about 45%, or from about 2% to about 15% on a weight basis.

In other embodiments where the first particles are a polyethylene or modified polyethylene, the particle may be present in a content range selected from any of the foregoing ranges, or in a range of: from about 3% to about 20%; about 5 to about 20%; from about 3% to about 15%; from about 12 to about 20%; or from about 3% to about 10% on a weight basis.

The incorporation of first particles can lead to a surface that is textured due to the presence of the first particles. In such embodiments, the presence of the first particles results in a surface texture that has elevations on the level of the coating formed. The height of the elevations due to the presence of the first particles can be from less than one micron (where the first particle is just below the line of the binder's surface) to a point where the first particles are almost completely above the level of the binder coating (although they may still be coated with binder). Thus, the presence of first particles can result in a textured surface wherein the first particles cause such elevations in the binder that have maximum heights in a range up to nearly 250 μm. Accordingly, such elevations can be present in ranges from about 1 μm to about 5 μm, from about 1 μm to about 10 μm, from about 1 μm to about 15 μm, about 1 μm to about 20 μm, from about 1 μm to about 25 μm, from about 1 μm to about 50 μm, from about 1 μm to about 75 μm, from about 1 μm to about 100 μm, from about 1 μm to about 125 μm, from about 1 μm to about 150 μm, from about 1 μm to about 175 μm, from about 1 μm to about 200 μm, from about 1 μm to about 225 μm, from about 1 μm to about 250 μm, from about 10 μm to about 80 μm, from about 15 to about 80 μm, from about 20 to about 100 μm, and from about 30 to about 70 μm.

The surface texture of coatings may also be assessed using the arithmetical mean roughness (Ra) or the ten point mean roughness (Rz) as a measure of the surface texture. In some embodiments, a coating described herein has an arithmetical mean roughness (Ra) in a range selected from: about 0.2 μm to about 20 μm; about 0.3 μm to about 18 μm; about 0.2 μm to about 8 μm; about 8 μm to about 20 μm; or about 0.5 μm to about 15 μm. In other embodiments, a coating as described herein has a ten-point mean roughness (Rz) in a range selected from: about 1 μm to about 90 μm; about 2 μm to about 80 μm; about 3 μm to about 70 μm; about 1 μm to about 40 μm; about 40 μm to about 80 μm; about 10 μm to about 65 μm; or about 20 μm to about 60 μm.

In some embodiments the compositions described herein, when dried and cured, produce a surface with an arithmetic mean roughness (Ra) greater than zero and less than about 30 microns, 20 microns, 16 microns or 10 microns. In other embodiments, the surface roughness of a dried and cured coating is from about 1 to about 20 microns; from about 2 to about 15 microns, from about 10 to about 20 microns: or from about 10 to about 30 microns.

First particles may optionally comprise moieties that make them hydrophobic and/or oleophobic. Where it is desirable to introduce such moieties, the particles may be reacted with reagents that covalently bind moieties that make them hydrophobic and/or oleophobic. In some embodiments, the reagents may be silanizing agents, such as those that introduce alkyl, haloalkyl, fluoroalkyl or perfluoroalkyl moieties (functionalities). In some embodiments, the silanizing agents are compounds of formula (I) (i.e., $R_{4-n}Si—X_n$), and the various embodiments of compounds of formula (I) described below for the treatment of second particles. The surface of many types of first particles can be activated to react with silanizing agents by various treatments including exposure to acids, bases, plasma, and the like, where necessary to achieve functionalization of the particles.

In embodiments described herein, the first particles are not modified by adding functional groups that impart one or more of hydrophobic and/or oleophobic properties to the particles (e.g., properties beyond the properties inherent to the composition forming the particles). In one such embodiment, first particles do not contain covalently bound alkyl, haloalkyl, fluoroalkyl or perfluoroalkyl functionalities (moieties). In another such embodiment, the first particles are not treated with a silanizing agent (e.g., a compound of formula (I)).

2.1 Exemplary Sources of First Particles

First particles may be prepared from the diverse materials described above. Alternatively, first particles may be purchased from a variety of suppliers. Some commercially available first particles that may be employed in the formation of the hydrophobic and/or oleophobic (HP/OP) coatings described herein include those in the accompanying Table 1.

TABLE 1

First Particles

| First particle No. | First Particle (Filler) ID | First Particle Type | First Particle Details | Density (g/cc) | Particle Size Range (μm) | Color | Crush Strength (psi) | Source | Location |
|---|---|---|---|---|---|---|---|---|---|
| 1 | K1 | Glass Bubbles | GPS[a] | 0.125 | 30-120 | White | 250 | 3M ™ | St. Paul, MN |
| 2 | K15 | Glass Bubbles | GPS[a] | 0.15 | 30-115 | White | 300 | 3M ™ | St. Paul, MN |
| 3 | S15 | Glass Bubbles | GPS[a] | 0.15 | 25-95 | White | 300 | 3M ™ | St. Paul, MN |
| 4 | S22 | Glass Bubbles | GPS[a] | 0.22 | 20-75 | White | 400 | 3M ™ | St. Paul, MN |
| 5 | K20 | Glass Bubbles | GPS[a] | 0.2 | 20-125 | White | 500 | 3M ™ | St. Paul, MN |
| 6 | K25 | Glass Bubbles | GPS[a] | 0.25 | 25-105 | White | 750 | 3M ™ | St. Paul, MN |
| 7 | S32 | Glass Bubbles | GPS[a] | 0.32 | 20-80 | White | 2000 | 3M ™ | St. Paul, MN |
| 8 | S35 | Glass Bubbles | GPS[a] | 0.35 | 10-85 | White | 3000 | 3M ™ | St. Paul, MN |
| 9 | K37 | Glass Bubbles | GPS[a] | 0.37 | 20-85 | White | 3000 | 3M ™ | St. Paul, MN |
| 10 | S38 | Glass Bubbles | GPS[a] | 0.38 | 15-85 | White | 4000 | 3M ™ | St. Paul, MN |
| 11 | S38HS | Glass Bubbles | GPS[a] | 0.38 | 15-85 | White | 5500 | 3M ™ | St. Paul, MN |
| 12 | K46 | Glass Bubbles | GPS[a] | 0.46 | 15-80 | White | 6000 | 3M ™ | St. Paul, MN |
| 13 | S60 | Glass Bubbles | GPS[a] | 0.6 | 15-65 | White | 10000 | 3M ™ | St. Paul, MN |
| 14 | S60/HS | Glass Bubbles | GPS[a] | 0.6 | 11-60 | White | 18000 | 3M ™ | St. Paul, MN |
| 15 | A16/500 | Glass Bubbles | Floated Series | 0.16 | 35-135 | White | 500 | 3M ™ | St. Paul, MN |
| 16 | A20/1000 | Glass Bubbles | Floated Series | 0.2 | 30-120 | White | 1000 | 3M ™ | St. Paul, MN |
| 17 | H20/1000 | Glass Bubbles | Floated Series | 0.2 | 25-110 | White | 1000 | 3M ™ | St. Paul, MN |
| 18 | D32/4500 | Glass Bubbles | Floated Series | 0.32 | 20-85 | White | 4500 | 3M ™ | St. Paul, MN |
| 19 | H50/10000 EPX | Glass Bubbles | Floated Series | 0.5 | 20-60 | White | 10000 | 3M ™ | St. Paul, MN |

TABLE 1-continued

First Particles

| First particle No. | First Particle (Filler) ID | First Particle Type | First Particle Details | Density (g/cc) | Particle Size Range (μm) | Color | Crush Strength (psi) | Source | Location |
|---|---|---|---|---|---|---|---|---|---|
| 20 | iMK | Glass Bubbles | Floated Series | 0.6 | 8.6-26.7 | White | 28000 | 3M ™ | St. Paul, MN |
| 21 | G-3125 | Z-Light Spheres ™ | CM[b] | 0.7 | 50-125 | Gray | 2000 | 3M ™ | St. Paul, MN |
| 22 | G-3150 | Z-Light Spheres ™ | CM[b] | 0.7 | 55-145 | Gray | 2000 | 3M ™ | St. Paul, MN |
| 23 | G-3500 | Z-Light Spheres ™ | CM[b] | 0.7 | 55-220 | Gray | 2000 | 3M ™ | St. Paul, MN |
| 24 | G-600 | Zeeo-spheres ™ | CM[b] | 2.3 | 1-40 | Gray | >60000 | 3M ™ | St. Paul, MN |
| 25 | G-800 | Zeeo-spheres ™ | CM[b] | 2.2 | 2-200 | Gray | >60000 | 3M ™ | St. Paul, MN |
| 26 | G-850 | Zeeo-spheres ™ | CM[b] | 2.1 | 12-200 | Gray | >60000 | 3M ™ | St. Paul, MN |
| 27 | W-610 | Zeeo-spheres ™ | CM[b] | 2.4 | 1-40 | White | >60000 | 3M ™ | St. Paul, MN |
| 28 | SG | Extendo-sphere ™ | HS[c] | 0.72 | 30-140 | Gray | 2500 | Sphere One | Chattanooga, TN |
| 29 | DSG | Extendo-sphere ™ | HS[c] | 0.72 | 30-140 | Gray | 2500 | Sphere One | Chattanooga, TN |
| 30 | SGT | Extendo-sphere ™ | HS[c] | 0.72 | 30-160 | Gray | 2500 | Sphere One | Chattanooga, TN |
| 31 | TG | Extendo-sphere ™ | HS[c] | 0.72 | 8-75 | Gray | 2500 | Sphere One | Chattanooga, TN |
| 32 | SLG | Extendo-sphere ™ | HS[c] | 0.7 | 10-149 | Off White | 3000 | Sphere One | Chattanooga, TN |
| 33 | SLT | Extendo-sphere ™ | HS[c] | 0.4 | 10-90 | Off White | 3000 | Sphere One | Chattanooga, TN |
| 34 | SL-150 | Extendo-sphere ™ | HS[c] | 0.62 | 70 | Cream | 3000 | Sphere One | Chattanooga, TN |
| 35 | SLW-150 | Extendo-sphere ™ | HS[c] | 0.68 | 8-80 | White | 3000 | Sphere One | Chattanooga, TN |
| 36 | HAT | Extendo-sphere ™ | HS[c] | 0.68 | 10-165 | Gray | 2500 | Sphere One | Chattanooga, TN |
| 37 | HT-150 | Extendo-sphere ™ | HS[c] | 0.68 | 8-85 | Gray | 3000 | Sphere One | Chattanooga, TN |
| 38 | KLS-90 | Extendo-sphere ™ | HS[c] | 0.56 | 4-05 | Light Gray | 1200 | Sphere One | Chattanooga, TN |
| 39 | KLS-125 | Extendo-sphere ™ | HS[c] | 0.56 | 4-55 | Light Gray | 1200 | Sphere One | Chattanooga, TN |
| 40 | KLS-150 | Extendo-sphere ™ | HS[c] | 0.56 | 4-55 | Light Gray | 1200 | Sphere One | Chattanooga, TN |
| 41 | KLS-300 | Extendo-sphere ™ | HS[c] | 0.56 | 4-55 | Light Gray | 1200 | Sphere One | Chattanooga, TN |
| 42 | HA-300 | Extendo-sphere ™ | HS[c] | 0.68 | 10-146 | Gray | 2500 | Sphere One | Chattanooga, TN |
| 43 | XIOM 512 | Thermo-plastic | MPR[d] | 0.96 | 10-100 | White | 508 | XIOM Corp. | West Babylon, NY |
| 44 | XIOM 512 | Thermo-plastic | MPR[d] | 0.96 | 10-100 | Black | 508 | XIOM Corp. | West Babylon, NY |
| 45 | CORVEL ™ Black 78-7001 | Thermo-plastic | Nylon Powder Coating | 1.09 | 44-74 | Black |  | ROHM & HASS | Philadelphia, PA |
| 46 | Micro-glass 3082 | Fibers | MMEGF[e] | 1.05 | 16 × 120 | White |  | Fibertec | Bridgewater, MA |
| 47 | Micro-glass 9007D | Fibers Silane-Treated | MMEGF[e] | 0.53 | 10 × 150 | White |  | Fibertec | Bridgewater, MA |
| 48 | Tiger Drylac Series 49 | Polyester crosslinked with TGIC (triglycidyl isocyanurate) |  |  |  |  |  |  |  |

[a]GPS—general purpose series
[b]ceramic microspheres
[c]hollow spheres
[d]modified polyethylene resins
[e]microglass milled E-glass filaments 3 Second Particles The coatings disclosed herein employ second particles (e.g., nanoparticles), which bear hydrophobic moieties. A variety of second particles can be used to prepare the SH and/or OP coatings described herein. Suitable second particles have a size from about 1 nano meter (nm) to about 25 μm and are capable of binding covalently to one or more chemical moieties (groups or components) that provide the second particles, and the coatings into which they are incorporated, hydrophobicity, and when selected to include fluoroalkyl groups, hydrophobicity and oleophobicity.

In some embodiments, the second particles may have an average size in a range selected from: about 1 nm up to about 25 μm or more. Included within this broad range are embodiments in which the second particles have an average size in a range selected from: about 1 nm to about 10 nm, from about 10 nm to about 25 nm, from about 25 nm to about 50 nm, from about 50 nm to about 100 nm, from about 100 nm to about 250 nm, from about 250 nm to about 500 nm, from about 500 nm to about 750 nm, from about 750 nm to about 1 μm, from about 1 μm to about 5 μm, from about 5 μm to about 10 μm, from about 10 μm to about 15 μm, from about 15 μm to about 20 μm, from about 20 μm to about 25 μm, from 1 nm to about 100 nm, from about 2 nm to about 200 nm, from about 10 nm to about 200 nm, from about 20 nm to about 400 nm, from about 10 nm to about 500 nm; from about 40 nm to about 800 nm, from about 100 nm to about 1 μm, from about 200 nm to about 1.5 μm, from about 500 nm to about 2 μm, from about 500 nm to about 2.5 μm, from about 1.0 μm to about 10 μm, from about 2.0 μm to about 20 μm, from about 2.5 μm to about 25 μm, from about 500 nm to about 25 μm, from about 400 nm to about 20 μm, and from about 100 nm to about 15 μm, from 1 nm to about 50 nm, from about 1 nm to about 400 nm, from about 1 nm to about 500 nm, from about 2 nm to about 120 nm, from about 5 nm to about 100 nm, from about 5 nm to about 200 nm; from about 5 nm to about 400 nm; about 10 nm to about 300 nm; or about 20 nm to about 400 nm.

In the above-mentioned embodiments, the lower size of second particles may be limited to particles greater than about 20 nm, about 25 nm, about 30 nm, about 35 nm, about 40 nm, about 45 nm, about 50 nm, or about 60 nm; and the upper size of second particles may be limited to particles less than about 20 µm, about 10 µm, about 5 µm, about 1 µm, about 0.8 µm, about 0.6 µm, about 0.5 µm, about 0.4 µm, about 0.3 µm or about 0.2 µm. Limitations on the upper and lower size of second particles may be used alone or in combination with any of the above-recited size limits on particle composition, percent composition in the coatings, and the like.

In some embodiments, the coatings may contain first particles in any of the above-mentioned ranges subject to either the proviso that the coatings do not contain only particles (e.g., first or second particles) with a size of 25 µm or less, or the proviso that the coatings do not contain more than an insubstantial amount of second particles with a size of 25 µm or less (recognizing that separation processes for particles greater than 25 µm may ultimately provide an unintended, insubstantial amount of particles that are 25 µm or less).

In other embodiments, first particles have an average size greater than 30 µm and less than 250 µm, and coatings comprising those particles do not contain substantial amounts of particles (e.g., first and second particles) with a size of 30 µm or less. In yet other embodiments, the coatings do not contain only particles (e.g., first and second particles) with a size of 40 µm or less, or particles with a size of 40 µm or less in substantial amounts. And in still other embodiments, the coatings do not contain only particles (e.g., first and second particles) with a size of 50 µm or less, or particles with a size of 50 µm or less in substantial amounts.

In other one embodiments, such as where the second particles are prepared by fuming (e.g., fumed silica or fumed zinc oxide), the second particles may have an average size in a range selected from about 1 nm to about 50 nm; about 1 nm to about 100 nm; about 1 nm to about 400 nm; about 1 nm to about 500 nm; about 2 nm to about 120 nm; about 5 nm to about 100 nm; about 5 nm to about 200 nm; about 5 nm to about 400 nm; about 10 nm to about 300 nm; or about 20 nm to about 400 nm.

Second particles having a wide variety of compositions may be employed in the durable SH and/or OP coatings described and employed herein. In some embodiments the second particles will be particles comprising metal oxides (e.g., aluminum oxides such as alumina, zinc oxides, nickel oxides, zirconium oxides, iron oxides, or titanium dioxides), or oxides of metalloids (e.g., oxides of B, Si, Sb, Te and Ge) such as a glass, silicates (e.g., fumed silica), aluminosilicates, or particles comprising combinations thereof. The particles are treated to introduce one or more moieties (e.g., groups or components) that impart hydrophobicity and/or oleophobicity to the particles, either prior to incorporation into the compositions that will be used to apply coatings or after incorporation into the coatings. In some embodiments, the second particles are treated with a silanizing agent, a silane, siloxane or a silazane, to introduce hydrophobic and/or oleophobic properties to the particles (in addition to any such properties already possessed by the particles).

In some embodiments, second particles are silica (silicates), alumina (e.g., $Al_2O_3$), titanium oxide, or zinc oxide that are treated with one or more silanizing agents, e.g., compounds of formula I.

In some embodiments, second particles are silica (silicates), alumina (e.g., $Al_2O_3$), titanium oxide, or zinc oxide, that are treated with a siloxane.

In some embodiments, the second particles are silica (silicates), glass, alumina (e.g., $Al_2O_3$), a titanium oxide, or zinc oxide, treated with a silanizing agent, a siloxane or a silazane. In some embodiments, the second particles may be prepared by fuming (e.g., fumed silica or fumed zinc oxide).

3.1 Some Sources of Second Particles

Second particles such as fumed silica may be purchased from a variety of suppliers, including but not limited to Cabot Corp., Billerica, Mass. (e.g., Nanogel TLD201, CAB-O-SIL® TS-720 (silica, pretreated with polydimethyl-siloxane), and M5 (untreated silica)) and Evonik Industries, Essen, Germany (e.g., ACEMATT® silica such as untreated HK400, AEROXIDE® silica, AEROXIDE® $TiO_2$ titanium dioxide, and AEROXIDE® Alu alumina).

Some commercially available second particles are set forth in Table 1 along with their surface treatment by a silanizing agent or polydimentyl siloxane in Table 2.

TABLE 2

| Produce Name | Surface Treatment | Level of Treatment | Nominal BET Surface Area of Base Product ($m^2/g$) | Particle Size (nm) | Product Source |
| --- | --- | --- | --- | --- | --- |
| M-5 | None | None | 200 | — | Cab-O-Sil |
| Aerosil ® 200 | None | None | 200 | 12 | Evonik |
| Aerosil ® 255 | None | None | 255 | — | Evonik |
| Aerosil ® 300 | None | None | 300 | 7 | Evonik |
| Aerosil ® 380 | None | None | 380 | 7 | Evonik |
| HP-60 | None | None | 200 | — | Cab-O-Sil |
| PTG | None | None | 200 | — | Cab-O-Sil |
| H-5 | None | None | 300 | — | Cab-O-Sil |
| HS-5 | None | None | 325 | — | Cab-O-Sil |
| EH-5 | None | None | 385 | — | Cab-O-Sil |
| TS-610 | Dimethyldichlorosilane | Intermediate | 130 | — | Cab-O-Sil |
| TS-530 | Hexamethyldisilazane | High | 320 | — | Cab-O-Sil |
| TS-382 | Octyltrimethoxysilane | High | 200 | — | Cab-O-Sil |
| TS-720 | Polydimethylsiloxane | High | 200 | — | Cab-O-Sil |
| Aerosil ® R202 | Polydimethylsiloxane | — | 100 | 14 | Evonik |

TABLE 2-continued

| Produce Name | Surface Treatment | Level of Treatment | Nominal BET Surface Area of Base Product (m$^2$/g) | Particle Size (nm) | Product Source |
|---|---|---|---|---|---|
| Aerosil® R504 | Hexamethyldisilaze (HMDS) and aminosilane | — | 125-175 | — | Evonik |
| Aerosil® R812S | HMDS based on Aerosil® 300 | — | 220 | — | Evonik |

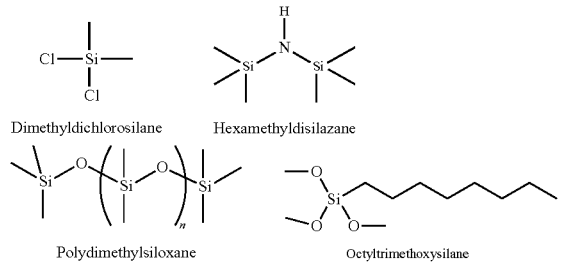

Dimethyldichlorosilane    Hexamethyldisilazane

Polydimethylsiloxane    Octyltrimethoxysilane

As purchased, the particles may be untreated (e.g., M5 silica) and may not posses any HP/OP properties. Such untreated particles can be treated to covalently attach one or more groups or moieties to the particles that give them HP/OP properties, for example, by treatment with the silanizing agents discussed above.

4 Third Particles

In some embodiments, the coatings disclosed herein employ third particles, which unlike second particles, do not bear hydrophobic moieties. A variety of third particles, which typically have a size from about 1 nm to 5 μm, can be employed in the superhydrophobic and/or oleophobic coatings described herein.

In some embodiments the third particles may have an average size in a range selected from about 1 nm to about 5 μm or more. Included within this broad range are embodiments in which the third particles have an average size in a range selected from about 1 nm to about 10 nm, from about 10 nm to about 25 nm, from about 25 nm to about 50 nm, from about 50 nm to about 100 nm, from about 100 nm to about 250 nm, from about 250 nm to about 500 nm, from about 500 nm to about 750 nm, from about 750 nm to about 1 μm, from about 0.5 μm to about 4 μm, from about 2 μm to about 4 μm, from 1 nm to about 100 nm, from about 1 nm to about 400 nm, from about 2 nm to about 120 nm, from about 2 nm to about 200 nm, from about 10 nm to about 200 nm, from about 20 nm to about 400 nm, from about 10 nm to about 500 nm; from about 40 nm to about 800 nm, from about 100 nm to about 1 μm, from about 200 nm to about 1 μm, from about 200 nm to about 900 nm, from about 300 nm to about 800 nm; or from about 400 nm to about 700 nm μm, from about 500 nm to about 1 μm, or from about 500 nm to about 1 μm.

In the above-mentioned embodiments, the lower size of third particles may be limited to particles greater than about 20 nm, about 25 nm, about 30 nm, about 35 nm, about 40 nm, about 45 nm, about 50 nm, or about 60 nm; and the upper size of third particles may be limited to particles less than about 5 μm, about 4 μm, about 3 μm, about 1 μm, about 0.8 μm, about 0.6 μm, about 0.5 μm, about 0.4 μm, about 0.3 μm or about 0.2 μm. Third particles having limitations on either or both of their upper and lower sizes may be used alone or in combination with any of the above-recited first or second particles in the coating compositions.

Third particles having a wide variety of compositions may be employed in the durable coatings described and employed herein. In some embodiments the third particles are particles comprising oxides of metalloids or metal oxides including, but not limited to, titanium dioxide, iron oxide(s) (e.g., $2Fe_2O_3H_2O$ or $Fe_2O_3$), chromium oxide(s). In other embodiments, the third particles may comprise materials other than metal oxides including, but not limited to, carbon black, zinc chromate (e.g., $3ZnCrO_4Zn(OH)_2$), azurite ($Na_7Al6Si_4O_{24}S2$), cadmium sulphide(s), lithopone (ZnS mixed with $BaSO_4$), $CaCO_3$, kaolin (hydrated aluminium silicate), talc (hydrated magnesium silicate), zinc phosphate, zinc chromate, zinc molybdate, barium metaborate, or $BaSO_4$. (See, e.g., Paints and Pigments, by Michael D. T. Clark revised and editing by Heather Wansbrough following correspondence with Steve Lipsham, available on the World Wide Web at nzic.org.nz/ChemProcesses/polymers/10D.pdf.)

Third particles may be particulate pigments, e.g., carbon black, titanium dioxide, iron oxide(s), zinc chromates, azurite, chromium oxide(s) cadmium sulphide(s), lithopone, talc (hydrated magnesium silicate), $BaSO_4$ calcium copper silicate, and $Cu_2CO_3(OH)_2$. Pigments serve not only to provide color, but may also enhance coating resistance to weather, heat, light, or corrosion. Third particles may also be mineral compounds that do not provide staining power or opacity, known as extenders. Extenders may be used to improve coating application characteristics, as "flatting agents" to provide flat or semi-gloss finishes, or to prevent settlement of pigments. Some common extenders include $CaCO_3$, talc, barites, kaolin, silica, and mica. See, e.g., Paints and Pigments, by Michael D. T. Clark.

In one embodiment, third particles comprise titanium dioxide.

Third particles may be present or absent in the coating compositions, and the resulting coatings described herein. When present, they may be present in an amount from about 0.01% to about 25%, from about 0.01% to about 5%, from about 0.1% to about 5%, from about 1% to about 5%, from about 0.01% to about 10%, from about 0.1% to about 10%, from about 2% to about 10%, from about 0.5% to about 25%, from about 5% to about 25%, from about 5% to about 20%, from about 10% to about 20%, from about 0.01% to about 8%, from about 8% to about 16%, from about 16% to about 24%, or from about 5% to about 15% by weight based on the weight of the composition.

5.0 Hydrophobic and Oleophobic Moieties of First and/or Second Particles

As discussed above, both the first and second particles may comprise one or more independently selected moieties that impart hydrophobic and/or oleophobic properties to the particles and the coatings into which they are incorporated. As also noted above, such chemical entities may be associated with the commercially available particles and/or added by way of treating the particles.

In some embodiments, the second particles will bear one or more alkyl, haloalkyl, fluoroalkyl, and perfluoroalkyl moieties. Such moieties can be covalently bound directly or indirectly bound to the second particle, such as through one or more intervening silicon or oxygen atoms. In other embodiments, the second particles will be treated with a siloxane.

In other embodiments, the second particles will bear one or more alkyl, haloalkyl, fluoroalkyl, and perfluoroalkyl moieties of the formula $R_{3-n}Si$—, where n is from 1-3, that are directly or indirectly (e.g., covalently bound) to the second particle, such as through one or more intervening atoms.

5.1 Silanizing Agents and their Use

A variety of silanizing agents (e.g., compounds of the formula $R_{4-n}Si$—$X_n$) can be employed to introduce moieties, e.g., $R_{3-n}Si$— groups (where n is an integer from 0 to 2), to the first or second particles prior to their introduction into the coatings described herein. Silanizing agents may also be used to introduce such moieties onto coating surfaces and onto/into particles subsequent to their introduction into the coatings, provided the particles are at or close enough to the surface of the coating for a silanizing agent to reach and react with those particles. Suitable silanizing agents typically have both leaving groups and terminal functionalities. Terminal functionalities are groups that are not displaced by reaction of a silanizing agent with, for example, particles such as silica second particles (e.g., R groups of compounds of the formula (I)). Leaving groups are those groups that are displaced from silanizing agents upon reaction to form bonds with the second particles.

Prior to reacting first or second particles with silanizing agents, the particles may be treated with an agent that will increase the number of sites available for reaction with the silanizing agent (e.g., $SiCl_4$, $Si(OMe)_4$, $Si(OEt)_4$, $SiCl_3CH_3$, $SiCl_3CH_2SiCl_3$, $SiCl_3CH_2CH_2SiCl_3$, $Si(OMe)_3CH_2Si(OMe)_3$, $Si(OMe)_3CH_2CH_2Si(OMe)_3$, $Si(OEt)_3CH_2Si(OEt)_3$, or $Si(OEt)_3CH_2CH_2Si(OEt)_3$ and the like). Treatment with such agents is conducted, e.g., with a 1% to 5% solution of the agent in a suitable solvent (e.g., hexane), although higher concentrations may be employed (e.g., about 5% to about 10%). Where agents such as $SiCl_4$ or $Si(OMe)_4$ are employed to increase the number of sites available for reaction with silanizing agents, the surface may first be treated with $SiCl_4$ followed by reaction with water to replace the chlorines with OH groups that react effectively with silanizing agents such as those of formula (I). Reaction with silanizing agents is typically conducted using a silanizing agent at in the range of about 1% to about 2% w/v, although concentrations in the range of about 2% to about 5% w/v may also be used. Depending on the reagents employed, the reaction, which often can be conducted at room temperature, is typically conducted for 1 hour to 6 hours, although reaction for as long as 24 hours may be desirable in some instances. Skilled artisans will appreciate that concentrations and reaction times and conditions other than those described above (e.g., elevated reaction temperatures) also might be able to be used. In one embodiment, elevated reaction temperatures from about 30, 40, 50, 60, 90, 100, or 120 degrees up to the boiling or decomposition point of the silinizing agent may be employed.

Second particles can be treated with reactive silanes, siloxanes and silazanes to produce hydrophobic effects in a solvent free reaction. In one embodiment the silica and silane are combined in a reaction vessel equipped with a high speed mixing blade. The liquid silane is added to the agitating particles at a ratio of 2 to 1 by weight. In another embodiment, the silica is agitated with a dry air (or inert gas) in a cyclone reactor while liquid silane is introduced as a fine spray. The mixtures resulting from either process are heated to 200° F. for 4 to 8 hours to complete the reaction and drive off residual volatiles.

In some embodiments, silanizing agents are compounds of the formula (I):

$$R_{4-n}Si\text{—}X_n \qquad (I)$$

where n is an integer from 1-3;
each R is independently selected from:
  (i) alkyl or cycloalkyl group optionally substituted with one or more fluorine atoms,
  (ii) $C_{1\ to\ 20}$ alkyl optionally substituted with one or more independently selected substituents selected from fluorine atoms and $C_{6\text{-}14}$ aryl groups, which aryl groups are optionally substituted with one or more independently selected halo, $C_{1\ to\ 10}$ alkyl, $C_{1\ to\ 10}$ haloalkyl, $C_{1\ to\ 10}$ alkoxy, or $C_{1\ to\ 10}$ haloalkoxy substituents,
  (iii) $C_{6\ to\ 20}$ alkyl ether optionally substituted with one or more substituents independently selected from fluorine and $C_{6\ to\ 14}$ aryl groups, which aryl groups are optionally substituted with one or more independently selected halo, $C_{1\ to\ 10}$ alkyl, $C_{1\ to\ 10}$ haloalkyl, $C_{1\ to\ 10}$ alkoxy, or $C_{1\ to\ 10}$ haloalkoxy substituents,
  (iv) $C_{6\ to\ 14}$ aryl, optionally substituted with one or more substituents independently selected from halo or alkoxy, and haloalkoxy substituents;
  (v) $C_{4\ to\ 20}$ alkenyl or $C_{4\ to\ 20}$ alkynyl, optionally substituted with one or more substituents independently selected from halo, alkoxy, or haloalkoxy; and
  (vi) —Z—$((CF_2)_q(CF_3))_r$, wherein Z is a $C_{1\ to\ 12}$ divalent alkane radical or a $C_{2\text{-}12}$ divalent alkene or alkyne radical, q is an integer from 1 to 12, and r is an integer from 1-4;
each X is an independently selected —H, —Cl, —I, —Br, —OH, —OR², —NHR³, or —N(R³)₂ group;
each $R^2$ is an independently selected $C_{1\ to\ 4}$ alkyl or haloalkyl group; and
each $R^3$ is an independently selected H, $C_{1\ to\ 4}$ alkyl, or haloalkyl group.

In some embodiments, R is an alkyl or fluoroalkyl group having from 6 to 20 carbon atoms.

In other embodiments, R is an alkyl or fluoroalkyl group having from 8 to 20 carbon atoms.

In other embodiments, R is an alkyl or fluoroalkyl group having from 10 to 20 carbon atoms.

In other embodiments, R is an alkyl or fluoroalkyl group having from 6 to 20 carbon atoms and n is 3.

In other embodiments, R is an alkyl or fluoroalkyl group having from 8 to 20 carbon atoms and n is 3.

In other embodiments, R is an alkyl or fluoroalkyl group having from 10 to 20 carbon atoms and n is 3.

In other embodiments, R has the form —Z—$((CF_2)_q(CF_3))_r$, wherein Z is a $C_{1\ to\ 12}$ divalent alkane radical or a $C_{2 \text{ to } 12}$ divalent alkene or alkyne radical, q is an integer from 1 to 12, and r is an integer from 1 to 4.

In any of the previously mentioned embodiments of compounds of formula (I), the value of n may be varied such that 1, 2 or 3 independently selected terminal functionalities are present in compounds of formula (I). Thus, in some embodiments, n is 3. In other embodiments, n is 2, and in still other embodiments, n is 1.

In any of the previously mentioned embodiments of compounds of formula (I), all halogen atoms present in any one or more R groups may be fluorine.

In any of the previously mentioned embodiments of compounds of formula (I), X may be independently selected from H, Cl, —$OR^2$, —$NHR^3$, —$N(R^3)_2$, or combinations thereof. In other embodiments, X may be selected from Cl, —$OR^2$, —$NHR^3$, —$N(R^3)_2$, or combinations thereof. In still other embodiments, X may be selected from, —Cl, —$NHR^3$, —$N(R^3)_2$ or combinations thereof.

Any coating described herein may be prepared with one, two, three, four or more compounds of formula (I) employed alone or in combination to modify the first or second particles, and/or other components of the coating. For example, the same or different compounds of formula (I) may be employed to modify both the first particles and the binder.

The use of silanizing agents of formula (I) to modify first or second particles, or any of the other components of the coatings, will introduce one or more $R_{3-n}X_n$Si— groups (e.g., $R_3$Si—, $R_2X_1$Si—, or $RX_2$Si— groups) where R and X are as defined for a compound of formula (I). The value of n is 0, 1, or 2, due to the displacement of at least one "X" substituent and formation of at least one bond between a particle and the Si atom (the bond between the particle and the silicon atom is indicated by a dash "—" (e.g., $R_3$Si—, $R_2X_1$Si—, or $RX_2$Si— groups).

Exemplary reagents that can be employed to prepare first or second particles with hydrophobic and/or oleophobic properties include silanizing agents such as those that are commercially available from Gelest, Inc., Morrisville, Pa. Such silanizing agents include, but are not limited to, the following compounds, which are identified by their chemical name followed by the commercial supplier reference number (e.g., their Gelest reference in parentheses): (tridecafluoro-1,1,2,2-tetrahydrooctyl)silane (SIT8173.0); (tridecafluoro-1,1,2,2-tetrahydrooctyl)trichlorosilane (SIT8174.0); (tridecafluoro-1,1,2,2-tetrahydrooctyl)triethoxysilane (SIT8175.0); (tridecafluoro-1,1,2,2-tetrahydrooctyl)trimethoxysilane (SIT8176.0); (heptadecafluoro-1,1,2,2-tetrahydrodecyl)dimethyl(dimethylamino)silane (SIH5840.5); (heptadecafluoro-1,1,2,2-tetrahydrodecyl)tris(dimethylamino)silane (SIH5841.7); n-octadecyltrimethoxysilane (SIO6645.0); n-octyltriethoxysilane (SIO6715.0); and 3,3,4,4,5,5,6,6,6-nonafluorohexyldimethyl(dimethylamino)silane (SIN6597.4).

Another group of reagents that can be employed to prepare first or second particles with hydrophobic and/or oleophobic properties include tridecafluoro-1,1,2,2-tetrahydrooctyl)trichlorosilane (tridecafluoro-1,1,2,2-tetrahydrooctyl)triethoxysilane: nonafluorohexyldimethylchlorosilane; (tridecafluoro-1,1,2,2-tetrahydrooctyl)trimethoxysilane; 3,3,4,4,5,5,6,6,6-nonafluorohexyldimethyl(dimethylamino)-silane nonafluorohexylmethyldichlorosilane; nonafluorohexyltrichlorosilane; nonafluorohexyltriethoxysilane; and nonafluorohexyltrimethoxysilane. In one embodiment, the coating compositions set forth herein comprise silica second particles treated with nonafluorohexyltrichlorosilane.

Two attributes of silanizing agents that may be considered for the purposes of their reaction with first or second particles and the introduction of hydrophobic or oleophobic moieties are the leaving group (e.g., X groups of compounds of the formula (I)) and the terminal functionality (e.g., R groups of compounds of the formula (I)). A silanizing agent's leaving group(s) can determine the reactivity of the agent with the first or second particle(s) or other components of the coating if applied after a coating has been applied. Where the first or second particles are a silicate (e.g., fumed silica) the leaving group can be displaced to form Si—O—Si bonds. Leaving group effectiveness is ranked in the decreasing order as chloro>methoxy>hydro (H)>ethoxy (measured as trichloro>trimethoxy>trihydro>triethoxy). This ranking of the leaving groups is consistent with their bond dissociation energy. The terminal functionality determines the level of hydrophobicity that results from application of the silane to the surface.

In addition to the silanizing agents recited above, a variety of other silanizing agents can be used to alter the properties of first or second particles and to provide hydrophobic and/or oleophobic properties. In some embodiments, second particles may be treated with an agent selected from dimethyldichlorosilane, hexamethyldisilazane, octyltrimethoxysilane, polydimethylsiloxane, or tridecafluoro-1,1,2,2-tetrahydrooctyl trichlorosilane. In such embodiments, the second particles may be silica. Silica second particles treated with such agents may have an average size in a range selected from about 1 nm to about 50 nm, from about 1 nm to about 100 nm, from about 1 nm to about 400 nm, from about 1 nm to about 500 nm, from about 2 nm to about 120 nm, from about 5 nm to about 150 nm, from about 5 nm to about 400 nm, from about 10 nm to about 300 nm, from about 20 nm to about 400 nm, or from about 50 nm to about 250 nm.

In addition to the silanizing agents recited above, which can be used to modify any one or more components of coatings (e.g., first and/or second particles), other agents can be employed including, but not limited to, one or more of: gamma-aminopropyltriethoxysilane, Dynasylan® A (tetraethylorthosilicate), hexamethyldisilazane, and Dynasylan® F 8263 (fluoroalkylsilane), any one or more of which may be used alone or in combination with the silanizing agent recited herein.

5.2 Use of Compounds Other than Silanizing Agents

Other agents also can be used to introduce hydrophobic and/or oleophobic moieties into second particles. The choice of such agents will depend on the functionalities available for forming chemical (covalent) linkages between hydrophobic/oleophobic moieties and the functional groups present on the second particles surface. For example, where second particle surfaces have, or can be modified to have, hydroxyl or amino groups, then acid anhydrides and acid chlorides of alkyl, fluoroalkyl, and perfluoroalkyl compounds may be employed (e.g., the acid chlorides: Cl—C(O)$(CH_2)_{4 \text{ to } 18}CH_3$; Cl—C(O)$(CH_2)_{4-10}(CF_2)_{2 \text{ to } 14}CF_3$; Cl—C(O)$(CF_2)_{4 \text{ to } 18}CF_3$ or the anhydrides of those acids).

6.0 Solvents 6.1 Low VOC and VOC-Exempt Organic Solvents

Volatile organic compounds (VOC) means any compound of carbon, excluding carbon monoxide, carbon dioxide, carbonic acid, metallic carbides or carbonates, and ammonium carbonate, which participates in atmospheric photochemical reactions. This includes any such organic compound other than the following, "exempt organic solvents" or "VOC-exempt solvents," which have been determined to have negligible photochemical reactivity: methane; ethane;

methylene chloride (dichloromethane); 1,1,1-trichloroethane (methyl chloroform); 1,1,2-trichloro-1,2,2-trifluoroethane (CFC-113); trichlorofluoromethane (CFC-11); dichlorodifluoromethane (CFC-12); chlorodifluoromethane (HCFC-22); trifluoromethane (HFC-23); 1,2-dichloro 1,1,2,2-tetrafluoroethane (CFC-114); chloropentafluoroethane (CFC-115); 1,1,1-trifluoro 2,2-dichloroethane (HCFC-123); 1,1,1,2-tetrafluoroethane (HFC-134a); 1,1-dichloro 1-fluoroethane (HCFC-141b); 1-chloro 1,1-difluoroethane (HCFC-142b); 2-chloro-1,1,1,2-tetrafluoroethane (HCFC-124); pentafluoroethane (HFC-125); 1,1,2,2-tetrafluoroethane (HFC-134); 1,1,1-trifluoroethane (HFC-143a); 1,1-difluoroethane (HFC-152a); parachlorobenzotrifluoride (PCBTF); cyclic, branched, or linear completely methylated siloxanes; acetone; perchloroethylene (tetrachloroethylene); 3,3-dichloro-1,1,1,2,2-pentafluoropropane (HCFC-225ca); 1,3-dichloro-1,1,2,2,3-pentafluoropropane (HCFC-225cb); 1,1,1,2,3,4,4,5,5,5-decafluoropentane (HFC 43-10mee); difluoromethane (HFC-32); ethylfluoride (HFC-161); 1,1,1,3,3,3-hexafluoropropane (HFC-236fa); 1,1,2,2,3-pentafluoropropane (HFC-245ca); 1,1,2,3,3-pentafluoropropane (HFC-245ea); 1,1,1,2,3-pentafluoropropane (HFC-245eb); 1,1,1,3,3-pentafluoropropane (HFC-245fa); 1,1,1,2,3,3-hexafluoropropane (HFC-236ea); 1,1,1,3,3-pentafluorobutane (HFC-365mfc); chlorofluoromethane (HCFC-31); 1 chloro-1-fluoroethane (HCFC-151a); 1,2-dichloro-1,1,2-trifluoroethane (HCFC-123a); 1,1,1,2,2,3,3,4,4-nonafluoro-4-methoxy-butane (C4F9OCH3 or HFE-7100); 2-(difluoromethoxymethyl)-1,1,1,2,3,3,3-heptafluoropropane ((CF3)2CFCF2OCH3); 1-ethoxy-1,1,2,2,3,3,4,4,4-nonafluorobutane (C4F9OC2H5 or HFE-7200); 2-(ethoxydifluoromethyl)-1,1,1,2,3,3,3-heptafluoropropane ((CF3)2CFCF2OC2H5); methyl acetate, 1,1,1,2,2,3,3-heptafluoro-3-methoxy-propane (n-C3F7OCH3, HFE-7000), 3-ethoxy-1,1,1,2,3,4,4,5,5,6,6,6-dodecafluoro-2-(trifluoromethyl) hexane (HFE-7500), 1,1,1,2,3,3,3-heptafluoropropane (HFC 227ea), methyl formate (HCOOCH3), (1) 1,1,1,2,2,3,4,5,5,5-decafluoro-3-methoxy-4-trifluoromethyl-pentane (HFE-7300); propylene carbonate; dimethyl carbonate; and perfluorocarbon compounds which fall into these classes:
  (i) Cyclic, branched, or linear, completely fluorinated alkanes;
  (ii) Cyclic, branched, or linear, completely fluorinated ethers with no unsaturations;
  (iii) Cyclic, branched, or linear, completely fluorinated tertiary amines with no unsaturations; and
  (iv) Sulfur containing perfluorocarbons with no unsaturations and with sulfur bonds only to carbon and fluorine.

6.2 The Use of Solvents in Coating Compositions

Where compositions comprise significant amounts of solid components, it may be desirable to dilute the compositions for ease of application, such as with VOC-exempt solvents including, but not limited to, water and/or acetone or other water miscible VOC-exempt solvents in addition to water and any other liquids that are already present in the composition. In some embodiments it may be desirable to add non-VOC exempt solvents. Thus, in some embodiments solvents such as ethanol, isopropanol or n-propanol, alone or in any combination, may be added as diluents. In one group of embodiments, the coating compositions described in this disclosure may be diluted with, and/or comprise: water; water and acetone; water and isopropanol and/or n-propanol; or water, acetone, and isopropanol and/or n-propanol.

Typically water up to 50% or 60% may be used to dilute the coating composition, but other amounts (e.g., 0.1-10, 10-20, 20-30, 30-40, 40-50, or 50-60 percent by weight of the final composition) of water or one or more compatible solvents (e.g., acetone, isopropanol, n-propanol and/or ethanol), alone or in combination may be employed. If possible or desired, the solvents added in addition to water will be VOC-exempt solvents or contain less than 1, 2, 5, 10, 15, 20%, 25%, 30%, 35% or 40% of solvents that are not VOC exempt. Where application of the coatings is to be conducted by rolling or brushing, the composition will typically contain an addition amount of water from about 15% to about 50% by weight of the composition (e.g., the compositions will be diluted with about 15 grams (g) to about 50 g of water per 100 g of the base composition). Similarly, where the compositions are to be applied by spraying, the composition can be diluted by addition of about 40 g to about 60 g of water, or other solvents such as acetone, per 100 g of the compositions as described herein. Mixtures of water and one or more VOC-exempt solvents, such as water miscible VOC-exempt solvents, may be employed for diluting composition to be applied by rolling, brushing and/or spraying.

In addition to reducing the thickness or viscosity of the compositions, solvents other than water provide a number potential benefits including, but not limited to, more rapid drying where the solvents are more volatile than water. The addition of solvents other than water also increases the ease in mixing components to form a uniform dispersion/suspension, and increases the stability of the suspension as measured by the length of time before the components once mixed will separate. Compositions comprising one or more solvents other than water (e.g., acetone, isopropanol, or n-propanol) such as in the range of 1-25% or 5-25% 10-25% or 10-20% (e.g., about 1%, 2%, 5%, 10%, 15%, 20%, or 25%) by weight of the final composition including the solvents, have a greater tendency to stay as suspensions, emulsions or dispersions for a longer period of time than compositions that are otherwise equivalent but contain water in place of the solvent. In some embodiments the compositions will continue to stay as suspensions, emulsions or dispersions for two, three, four, five, six, or ten times longer than compositions that are otherwise equivalent but contain water in place of the solvent.

7. Application of Coatings

Coatings may be applied to substrates, or base coatings previously applied to substrates, by any method known in the art, including but not limited to: brushing, painting, dipping, spin coating, spraying, or electrostatic spraying.

The composition may contain any necessary solvents/liquids, particularly water or a VOC-exempt solvent, to assist in the application process, for example by reducing the viscosity of the composition.

In some embodiments, the one-step SH and/or OP coatings described above may be treated to further modify their properties by the subsequent application of compositions comprising second particles and/or silanizing agents. Such a composition, which may be termed a "top coats," is applied before the SH and/or OP coating has substantially cured, typically 30-45 minutes after the application of the SH and/or OP coating. When such top coatings are applied, other components of the coating (e.g., the binder or first particles) may also become modified by the agent. Top coat compositions typically comprise a solvent (e.g., a VOC-exempt solvent) and second particles from about 1 to about 20% weight/volume. Alternatively, the top coat may comprise a compound of formula I alone or in combination with silica particles having the size of a second particle. In one embodiment, the top coat comprises acetone as a VOC-exempt solvent, and 1-5% fumed silica (w/v), about 0.25 to about 2% tetrachlorosilane (SiCl$_4$ v/v), and from about 0.25 to about 1.0% (v/v) of a silanizing agent, such as a compound of formula I.

Second particles, applied as part of a top coat composition in a two-step method may be applied either as a suspension in a suitable solvent that is compatible with the binder system (e.g., a low VOC composition, hexane, xylene, and ethanol) or without a solvent using a spray gun (air spray gun) supplied with a suitable supply of compressed air, nitrogen, or other compressed gas (e.g., a Binks Model 2001 or 2001V spray gun air spray gun; Binks, Inc., Glendale Heights, Ill., supplied with air at about 50 psi may be employed). Thus, in some embodiment the top coating composition is applied by spraying or atomizing a liquid second composition onto the SH and/or OP coating. Alternatively, the second particles are applied absent any liquid by spraying the SH and/or OP coating with second particles using a stream of gas.

8. Surface Preparation

To provide good adhesion of coatings to a surface, the surfaces may be cleaned and may also be abraded to create some degree of surface roughness. Surface roughness can be created by methods including: (1) scuffing with an abrasive pad (e.g., Scotch-Brite™ pads), (2) fine sandblasting, (3) tumble blasting with small steel balls, and (4) coarse sandblasting.

Figure 33:
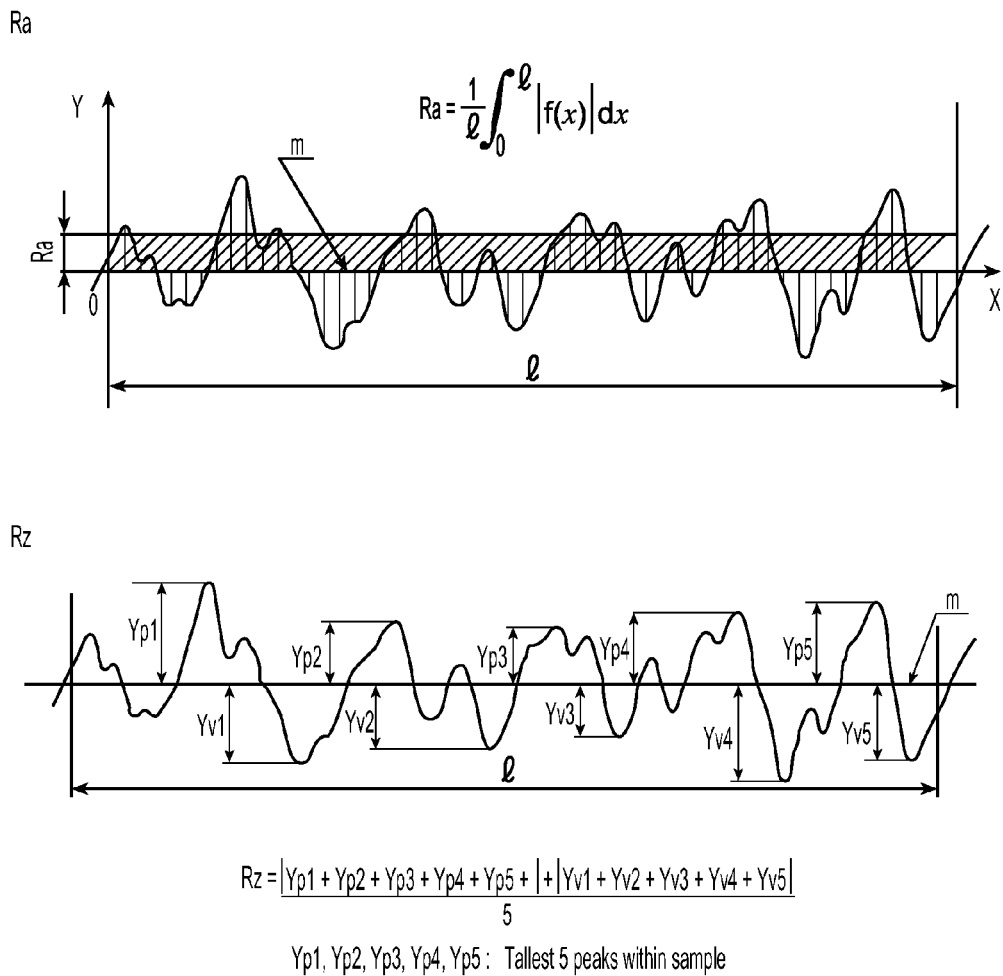
FIG. 33 shows the calculation of Ra (arithmetic mean roughness) and Rz (ten point mean roughness). For Ra analysis a section of standard length is sampled from the mean line on the roughness chart. The mean line is laid on a Cartesian coordinate system wherein the mean line runs in the direction of the x-axis and magnification is the y-axis. The value obtained with the formula given in the figure is expressed in micrometers unless stated otherwise. For ten-point mean roughness (Rz) a section of standard length is sampled from the mean line on the roughness chart. The distance between the peaks and valleys of the sampled line is measured in they direction. Then, the average peak is obtained among 5 tallest peaks (Yp), as is the average valley between the 5 lowest valleys (Yv). The sum of these two values is expressed in micrometers, unless stated otherwise.

The surface roughness of coatings, or the roughness of substrates produced by different methods, can be measured using a Mahr Pocket Surf PS1 (Mahr Federal Inc., Providence, R.I.) and can be expressed using a variety of mathematical expressions including, but not limited to, the arithmetical mean roughness (Ra) and ten-point mean roughness (Rz), which are described in FIG. 33.

Scuffing surfaces, such as plastic, with abrasive materials such as Scotch-Brite™ pads increases the roughness values of plastics to an Ra of about 0.2-0.3 µm to about 0.7-0.9 µm and the Rz from about 1.4 to about 7 µm. Sandblasting plastics with coarse sand produces a very rough surface where the Ra increases substantially into the range of about 5 to about 6 µm and the Rz increases to the range of about 30 to about 37 µm.

The surface of flexible materials, can also be abraded to improve the adherence of the SH and/or OP coatings. Scuffing with abrasive materials (e.g., Scotch-Brite™ pads) can increase the Ra of flexible materials such as rubber from the range of about 0.2 to about 0.35 µm to the range of about 0.4 to about 0.5 µm and the Rz from about 2 µm to the range of about 3 to about 4 µm. Fine sandblasting of flexible materials, such as rubber, increases the Ra into the range from about 0.60 to about 0.75 µm and the Rz from about 2 µm to the range from about 6 to about 7 µm. Tumbling plastics with small steel balls can increase the Ra from about 0.28 to the range of about 0.3 to about 0.4 µm and the Rz from about 2.043 to about 3.28 µm. Coarse sandblasting increases the Ra from 0.3 to the range of about 5 to about 6 µm and the Rz to the range of about 30 to about 35 µm.

9. Use of Hydrophobic and/or Oleophobic Coating

The compositions described herein may be used to apply superhydrophobic and/or oleophobic coatings to on many, if not most surfaces including, but not limited to metals, glasses, ceramics, stone, rubbers, fabrics, and plastics to achieve a variety of desirable results. The coatings may be employed for a variety of uses including preventing or resisting the attachment of water, dirt and/or ice to the surfaces. Due to their properties, the surfaces may be employed in applications including, but not limited to, anti-corrosion, anti-icing, self-cleaning, and liquid/spill containment.

In one embodiment, may be applied to electrical equipment to prevent moisture, water, or ice from forming and causing damage through corrosion or arching. In one particular embodiment, the electrical equipment is high voltage insulators and/or wires exposed to rain, snow or ice. In another embodiment the electrical equipment are transformers, electrical power boxes, electric motor windings, and/or electrical switches.

In another embodiment, the coatings are applied to aircraft (e.g., wings and/or control surfaces) to prevent ice formation.

In another embodiment, the coatings are applied to surfaces of marine equipment exposed to temperatures that will freeze fresh and/or sea water (e.g., rails, ladders, booms, hatches, dock components, and the like) to prevent ice formation.

Coating compositions described herein can be employed in other embodiments, to form spill resistant borders on shelves, counters, work areas or floors.

Another use of the coating compositions described herein is the preparation of self-cleaning sidings, window frames, gutters, satellite dishes, lawn furniture, and other outdoor products.

The coatings described herein can be used for corrosion protection in the automotive industry. In one embodiment, the coatings can be used for corrosion protection on underside of cars, trucks, and other heavy-duty equipment/vehicles.

10. Coating Compositions

Some exemplary ranges for the SH and/or OP coating components are described in the table below. Each component (Binder, First Particles, Second Particles, and Third Particles) may be combined with the other components in any of the ranges set forth in the table below, provided the components do not total to more than 100%.

| | Component | | | |
| --- | --- | --- | --- | --- |
| Ranges | Polyurethane Binder Min-Max % | First Particles Min-Max % | Second Particles Min-Max % | Third Particles Min-Max % |
| 1 | 30-50 | | | |
| 2 | 35-47 | | | |
| 4 | 30-35 | | | |
| 5 | 35-40 | | | |
| 6 | 40-45 | | | |
| 7 | 45-50 | | | |
| 8 | 50-60 | | | |
| 1 | | 1-35 | | |
| 2 | | 0-7 | | |
| 3 | | 0-4 | | |
| 4 | | 4-8 | | |
| 5 | | 10-15 | | |
| 6 | | 15-20 | | |
| 7 | | 20-25 | | |
| 8 | | 25-30 | | |
| 9 | | 30-35 | | |
| 1 | | | 7.5-25 | |
| 2 | | | 8-22 | |
| 3 | | | 9-20 | |
| 4 | | | 10-21 | |
| 5 | | | 8-16 | |
| 6 | | | 9-18 | |
| 7 | | | 7.5-10 | |
| 8 | | | 10-15 | |
| 9 | | | 15-20 | |

-continued

| Ranges | Polyurethane Binder Min-Max % | First Particles Min-Max % | Second Particles Min-Max % | Third Particles Min-Max % |
|---|---|---|---|---|
| 10 | | | 20-25 | |
| 1 | | | | 0 |
| 2 | | | | 0-26 |
| 3 | | | | 0>-3 |
| 4 | | | | 0.1-3 |
| 5 | | | | 3-6 |
| 6 | | | | 3-9 |
| 7 | | | | 6-9 |
| 8 | | | | 6-12 |
| 9 | | | | 12-15 |
| 10 | | | | 15-20 |
| 11 | | | | 20-26 |

Percentages as recited in the preceding table and in the specification are based on the total weight of the compositions. Unless stated otherwise, the composition percentages given for the polyurethane binders represent the weight of the polyurethane binder as provided by their commercial suppliers, which contain from about 34% to 46% polyurethane binder components on a dry weight basis. Dry weight composition ranges for the binder components may determined based upon those ranges. Where, component do not total to 100%, the balance is typical comprised of water and/or other solvents (e.g., VOC-exempt solvents such as acetone or acetone water combinations). In other embodiments, it may be desirable to add non-VOC exempt solvents. In some embodiments solvents that are not VOC-exempt, such a isopropanol or n-propanol, may be added. Thus, in one group of embodiments, the coating compositions described in this disclosure may be diluted with, and/or comprise a solvent that is containing: water; water and acetone; water and isopropanol and/or n-propanol; or water, acetone, and isopropanol and/or n-propanol.

Thirty four SH/OP coating compositions comprising the above-mentioned components are set forth in the following table. As with the table above, all recited percentages are based on the total weight of the composition, with the balance typically being comprised of one or more compatible VOC-exempt solvents such as water. Once prepared, the compositions may be diluted with one or more compatible solvents (e.g., water) to control properties (e.g., viscosity) for application. Typically up to 50% water may be used to dilute the coating composition, but other amounts (e.g., 0.1-10, 10-20, 20-30, 30-40, 40-50, or 50-60 percent by weight of the final composition) of one or more compatible solvents (e.g., acetone, isopropanol, n-propanol and/or ethanol), alone or in combination may be employed. If possible or desired, the solvents added in addition to water will be VOC-exempt or contain less than 1, 2, 5, 10, 15, or 20% of solvents that are not VOC exempt. Where application of the coatings is to be conducted by rolling or brushing, the composition will typically contain an addition amount of water from about 15% to about 50% by weight of the composition (e.g., the compositions will be diluted with about 15 g to about 50 grams of water per 100 g of the base composition). Similarly, where the compositions are to be applied by spraying, the composition can be diluted by addition of about 40 g to about 60 g of water or other solvents or combinations of solvents (such as acetone) per 100 g of the composition as described herein. Mixtures of water and one or more VOC-exempt solvents may be employed for diluting composition to be applied by rolling, brushing and/or spraying.

| Composition | Polyurethane Binder Polymer Min-Max % | First Particles Min-Max % | Second Particles Min-Max % | Third Particles Min-Max % |
|---|---|---|---|---|
| 1 | 32-47 | 0 | 5-15 | 0 |
| 2 | 32-47 | 0 | 10-21 | 0 |
| 3 | 32-47 | 1-7 | 5-15 | 0 |
| 4 | 32-47 | 1-7 | 10-21 | 0 |
| 5 | 32-47 | 1-7 | 5-15 | 0 |
| 6 | 32-47 | 1-7 | 10-21 | 0 |
| 7 | 32-47 | 0 | 5-15 | 0 |
| 8 | 32-41 | 0 | 10-21 | 0>-10 |
| 9 | 32-41 | 1-7 | 5-15 | 0>-10 |
| 10 | 32-41 | 1-7 | 10-21 | 0>-10 |
| 11 | 32-41 | 1-7 | 5-15 | 0>-10 |
| 12 | 32-41 | 1-7 | 10-21 | 0>-10 |
| 13 | 32-41 | 0 | 5-15 | 10-26 |
| 14 | 32-41 | 0 | 10-21 | 10-26 |
| 15 | 32-41 | 1-7 | 5-15 | 10-26 |
| 16 | 32-41 | 1-7 | 10-21 | 10-26 |
| 17 | 32-41 | 1-7 | 5-15 | 10-26 |
| 18 | 32-41 | 1-7 | 10-21 | 10-26 |
| 19 | 30-39 | 0 | 5-15 | 0 |
| 20 | 30-39 | 0 | 10-21 | 0 |
| 21 | 30-39 | 1-7 | 5-15 | 0 |
| 22 | 30-39 | 1-7 | 10-21 | 0 |
| 23 | 30-39 | 1-7 | 5-15 | 0 |
| 24 | 30-39 | 1-7 | 10-21 | 0 |
| 25 | 30-39 | 0 | 5-15 | 0 |
| 26 | 30-39 | 0 | 10-21 | 0>-10 |
| 27 | 30-39 | 1-7 | 5-15 | 0>-10 |
| 28 | 30-39 | 1-7 | 10-21 | 0>-10 |
| 29 | 30-39 | 1-7 | 5-15 | 0>-10 |
| 30 | 30-39 | 1-7 | 10-21 | 0>-10 |
| 31 | 30-39 | 0 | 5-15 | 10-26 |
| 32 | 30-39 | 0 | 10-21 | 10-26 |
| 33 | 30-39 | 1-7 | 5-15 | 10-26 |
| 34 | 30-39 | 1-7 | 10-21 | 10-26 |

A skilled artisan will understand that composition ranges of individual components may be selected so that they do not exceed 100%.

In addition to their hydrophobicity and oleophobicity (e.g., superhydrophobicity and/or superoleophobic) the coatings described in the present disclosure have a variety of other properties such as flexibility without loosing their hydrophobicity or oleophobicity. In some embodiments, the coatings compositions when applied to flexible rubber sheet approximately one eighth of an inch thick, then dried and cured, can be brought to a ninety degree angle around a cylindrical rod greater than 2, 4, 8, 10, 20, 40, 50, 75, 100, or 200 times at room temperature (18 to about 23° C.) without loss of the coating's hydrophobic or oleophobic properties (e.g., remaining hydrophobic or oleophobic or even superhydrophobic and/or superoleophobic).

A skilled artisan will understand that composition ranges of individual components may be selected so that they do not exceed 100%. Where compositions comprise significant amounts of solid components, it may be desirable to dilute the compositions for ease of application, such as with VOC-exempt solvents in addition to any other liquids that are already present in the composition.

Certain embodiments are described below.
1. A coating composition for the application/preparation of hydrophobic (e.g., superhydrophobic) and/or oleophobic (e.g., superoleophobic) coatings on surfaces comprising:

a polyurethane dispersion or suspension comprising one or more of a polyester urethane, a polyacrylic urethane and/or a polycarbonate urethane;

about 5 to about 30% by weight of second particles comprising one or more siloxanes, and/or one or more alkyl, haloalkyl, fluoroalkyl, or perfluoroalkyl containing moieties;

said composition optionally comprising up to about 26% by weight of third particles;

wherein said coating composition optionally comprises less than about 0.6, 0.5, 0.4, or 0.3 pounds per gallon of volatile non-exempt organic compounds; and wherein the superhydrophobic coating resulting from the application of said composition to a surface retains its superhydrophobicity after 150-1,400 Taber abrasion cycles at a 1000 g load for coating thickness range of 25-300 microns, and/or 100-2,500 Taber abrasion cycles at a 250 g load, using a CS10 wheel, as judged by the inability of more than 50% of the water droplets applied to the area of the coating subjected to said abrasion cycles to remain on the surface when the planar surface is inclined at 3 degrees.

2. The composition of any of embodiment 1, wherein said polyurethane suspension or dispersion does not comprise third particles.

3. The composition of embodiment 2, wherein said composition does not comprise first particles and the superhydrophobic coating resulting from the application of said composition to a planar surface retains its superhydrophobicity after 150-800 Taber abrasion cycles at a 1,000 g load, for a thickness range of 25-75 microns, and/or 200-1,400 Taber abrasion cycles at a 250 g load for a thickness range of 25-75 microns, on a planar surface using a CS10 wheel, as judged by the inability of more than 50% of the water droplets applied to the area of the coating subjected to said abrasion cycles to remain on the surface when the planar surface is inclined at an angle of 3 degrees.

4. The composition of embodiment 1, wherein said composition further comprises first particles.

5. The composition of embodiment 4, wherein the composition comprises 5-20% by weight of first particles.

6. The composition of embodiment 5, wherein the first particles, are selected from oxides of metalloids, metal oxides, one or more thermoplastics, one or more thermoset plastics, one or more metals, one or more glasses, and/or one or more hollow spheres.

7. The composition of any of embodiments 4 to 6, wherein the superhydrophobic coating resulting from the application of said composition to a planar surface retains its superhydrophobicity after 100-600 Taber abrasion cycles at a 250 g load for a thickness range of 40-85 micron using a CS10 wheel, as judged by the inability of more than 50% of the water droplets applied to the area of the coating subjected to said abrasion cycles to remain on the surface when the planar surface is inclined at an angle of 3 degrees.

8. The composition of any of embodiment 1, wherein said polyurethane suspension or dispersion comprises third particles.

9. The composition of embodiment 8, wherein the composition comprises 5-20% by weight of third particles.

10. The composition of any of embodiments 8 to 9, wherein the third particles, are selected from particles comprising one or more inorganic compounds, one or more oxides of metalloids or metal oxides.

11. The composition of any of embodiments 8 to 10, wherein said composition does not comprise first particles and the superhydrophobic coating resulting from the application of said composition to a planar surface retains its superhydrophobicity after about 300-350 Taber abrasion cycles at a 1000 g load, for a thickness range of 25-75 microns and/or 400-800 Taber abrasion cycles at a 250 g load, for a thickness range of 25-80 microns on a planar surface using a CS10 wheel, as judged by the inability of more than 50% of the water droplets applied to the area of the coating subjected to said abrasion cycles to remain on the surface when the planar surface is inclined at an angle of 3 degrees.

12. The composition of any of embodiments 8-10, further comprising first particles.

13. The composition of embodiment 12, wherein the composition comprises 5-20% by weight of first particles.

14. The composition of any of embodiments 12 to 13, wherein the first particles, are selected from oxides of metalloids, metal oxides, one or more thermoplastics, one or more thermoset plastics, one or more metals, one or more glasses, and/or one or more hollow spheres.

15. The composition of any of embodiments 12 to 14, wherein the superhydrophobic coating resulting from the application of said composition to a planar surface retains its superhydrophobicity after 200-1,400 Taber abrasion cycles at a 1000 g load, for a thickness range of 75-300 microns and/or 400-2,500 Taber abrasion cycles at a 250 load, for a thickness range of 35-90 microns on a planar surface using a CS10 wheel, as judged by the inability of more than 50% of the water droplets applied to the area of the coating subjected to said abrasion cycles to remain on the surface when the planar surface is inclined at an angle of 3 degrees.

16. The composition of any of embodiments 1 to 16, wherein said one or more of a polyester urethane, a polyacrylic urethane and/or a polycarbonate urethane are a BAYHYDROL® and/or a POLANE®.

17. The composition of any of embodiments 1 to 15, wherein the composition comprises a mixture of polyacrylic urethanes and polycarbonate urethanes.

18. The composition of embodiment 17, wherein said aqueous polyurethane dispersion or suspension comprises a mixture of at least two of: a polyester urethane, an aliphatic polyester urethane, a polycarbonate urethane a polyacrylic urethane, and an aliphatic polycarbonate urethane 19. The composition of embodiment 18, wherein said mixture comprises a BAYHYDROL® and a POLANE®.

20. The composition of embodiment 19, wherein said mixture comprises a ratio of BAYHYDROL® to POLANE® from 90:10 to 50:50.

21. The composition of embodiments 18 to 20, wherein said BAYHYDROL® is BAYHYDROL® 124, 122, 110 or 140AQ.

22. The composition of any of embodiments 18-22 wherein said POLANE® is POLANE® 700T.

23. The composition of any of embodiments 1 to 22, wherein said composition further comprises second particle have a size of about 2 nm to about 120 nm.

24. The composition of any of embodiments 1 to 22, wherein said second particle have a size of about 1 nm to up to about 25 microns 25. The composition of embodiment 24, wherein said particles are silica particles.

26. The composition of any of embodiments 1 to 24, wherein said siloxane is polydimethylsiloxane.

27. The composition of any of embodiments 1 to 25, wherein said one or more alkyl, haloalkyl, fluoroalkyl, or perfluoroalkyl containing moieties are one or more alkylsilane, haloalkylsilane, fluoroalkylsilane or perfluoroalkylsilane groups.

28. The composition of embodiment 27, wherein said alkyl, haloalkyl, fluoroalkyl, fluoroalkylsilane and/or perfluoroalkylsilane groups result from the reaction of silica or metal oxide particles with one or more silanes selected from the group consisting of: a compound of formula I, (tridecafluoro-1,1,2,2-tetrahydrooctyl)silane (SIT8173.0); (tridecafluoro-1,1,2,2-tetrahydrooctyl)trichlorosilane (SIT8174.0); (tridecafluoro-1,1,2,2-tetrahydrooctyl)triethoxysilane (SIT8175.0); (tridecafluoro-1,1,2,2-tetrahydrooctyl)trimethoxysilane (SIT8176.0); (heptadecafluoro-1,1,2,2-tetrahydrodecyl)dimethyl(dimethylamino)silane (SIH5840.5): (heptadecafluoro-1,1,2,2-tetrahydrodecyl)tris(dimethylamino)silane (SIH5841.7); n-octadecyltrimethoxysilane (SIO6645.0); n-octyltriethoxysilane (SIO6715.0): and 3,3,4,4,5,5,6,6,6-nonafluorohexyldimethyl(dimethylamino)silane (SIN6597.4).

29. The composition of embodiment 27, wherein said alkylsilane and/or fluoroalkylsilane result from the reaction of silica or metal oxide particles with one or more silanes selected from the group consisting of; tridecafluoro-1,1,2,2-tetrahydrooctyl)trichlorosilane; (tridecafluoro-1,1,2,2-tetrahydrooctyl)triethoxysilane; nonafluorohexyldimethylchlorosilane; (tridecafluoro-1,1,2,2-tetrahydrooctyl)trimethoxysilane; 3,3,4,4,5,5,6,6,6-nonalluorohexyldimethyl(dimethylamino)-silane; nonafluorohexylmethyldichlorosilane; nonafluorohexyltrichlorosilane; nonafluorohexyltriethoxysilane; and nonafluorohexyltrimethoxysilane.

30. The composition of any of the preceding embodiments wherein said second particles are present from about 20 to about 30% by weight.

31. The composition of any of embodiments 1-30, wherein said second particles are present an amount from about 5 to about 20% by weight.

32. The composition of embodiment 31, wherein said second particles are present in an amount from about 10 to about 12% by weight.

33. The composition of any of embodiments 1 to 32, wherein said coating is both superhydrophobic and oleophobic.

34. The composition of any of embodiments 4 to 7, 14 to 33, comprising two or more, or three or more, types of first particles having different compositions.

35. The composition of any of embodiments 4 to 7, 14 to 34, comprising a thermoplastic or thermoset plastic first particle.

36. The composition of embodiment 35, wherein said thermoplastic or thermoset plastic first particle comprise about 5 to about 10% of the composition by weight.

37. The composition any of embodiments 4 to 7, 14 to 34, comprising glass bead or hollow glass sphere first particles.

38. The composition of embodiment 37, wherein said glass bead or hollow glass sphere first particles comprise about 5 to about 15% of the composition by weight.

39. The composition of embodiment 38, wherein said glass bead or hollow glass sphere first particles comprise about 6 to about 8% of the composition by weight.

40. The composition of any of the preceding embodiments, that when dried and cured produces a surface with an arithmetic mean roughness (Ra) of less than about 30 microns 41. The composition of any of the preceding embodiments, that when dried and cured produces a surface with an arithmetic mean roughness (Ra) of less than about 20 microns 42. The composition of any of the preceding embodiments, that when dried and cured produces a surface with an arithmetic mean roughness (Ra) of less than about 16 microns 43. The composition of embodiment 40, wherein said arithmetic mean roughness (Ra) is from about 1 to about 20 microns.

44. The composition of any of embodiments 1-43, comprising from about 30% to about 50% polyurethanes by weight.

45. The composition of any of embodiments 1-44, wherein said polyurethane dispersion or suspension comprise at least one polyester urethane, polyacrylic urethane, and/or polycarbonate urethane composition that when dried and cured produces a coating that has: (a) a modulus at 100% elongation of 1300 psi or greater, and/or (b) an elongation percent at break of 150% or greater.

46. The composition of any of embodiments 1-45, further comprising 0.1-10, 10-20, 20-30, 30-40, 40-50 or 50-60 g of one or more compatible solvents per 100 g of coating composition.

47. The composition of embodiment 46, wherein said one or more compatible solvents are VOC-exempt solvents such as a water, acetone or a combination of water and acetone, and wherein said coating composition comprises less than about 0.5, 0.4, 0.3, or 0.2 pounds per gallon of volatile non-exempt organic compounds.

48. The composition according to embodiment 47, wherein said one or more solvents that are not VOC-exempt solvents (non-VOC-exempt solvents), or solvents compositions that comprise solvents that are not VOC-exempt solvents such as: ethanol; isopropanol or n-propanol; water and isopropanol and/or n-propanol; acetone and isopropanol and/or n-propanol; or water, acetone, and isopropanol and/or n-propanol.

49. A hydrophobic (superhydrophobic) and/or oleophobic (superoleophobic) coating formed by the application of the composition of any embodiments 1-48.

50. A method of coating at least part of a surface comprising the application of a composition of any of embodiments 1-48.

51. The method of embodiment 50, wherein said method comprises dipping, spraying, rolling, or spin coating said composition onto said surface.

52. The method of any of embodiments 50 or 51, further comprising drying the coating composition at an elevated temperature (e.g., at about 120, 140, 160, 180, 200, 220, or 240 degrees Fahrenheit)

53. The method of any of embodiments 50-52, further comprising applying a top-coat to said coating.

54. The method of embodiment 53, wherein said top-coat comprises second particles (e.g., fumed silica) treated to be hydrophobic (e.g., particles treated with a silanizing agent such as those described in section 5.0 including, but not limited to, silanizing agents of formula I) or wherein said top-coat comprises a silanizing agent (e.g., a silanizing agent such as those described in section 5.0 including, but not limited to, silanizing agents of formula I).

55. A coating prepared by the method of any of embodiments 50-54.

56 The coating of embodiments 49 or 55, wherein in said coating further comprises a top-coat of second particles treated to be hydrophobic (e.g., treated with a silanizing agent such as those described in section 5.0 including, but not limited to, silanizing agents of formula I) or the coating further comprising a top-coat of a hydrophobic silane group (e.g., a surface treated with silanizing agent such as those described in section 5.0 including, but not limited to, silanizing agents of formula I).

57. The coating of any of embodiments 49 and 55-56, that when dried and cured produces a surface with an arithmetic mean roughness (Ra) in a range selected from: about 0.2 µm to about 20 µm; about 0.3 µm to about 18 µm; about 0.2 µm to about 8 µm; about 8 µm to about 20 µm; or about 0.5 µm to about 15 µm; or a roughness that is less than about 30 microns, 20 microns, 16 microns or 10 microns.

58. The coating of any of embodiments 49 and 55-57, wherein said polyurethane dispersion or suspension comprise at least one polyester urethane, polyacrylic urethane, and/or polycarbonate urethane composition that when dried and cured produces a coating that has: (a) a modulus at 100% elongation of 1300 psi or greater, and/or (b) an elongation percent at break of 150% or greater.

59. The coating of any of embodiments 49 and 55-58, that retains its hydrophobicity (superhydrophobicity) and/or its oleophobicity (superoleophobicity) after a flexible substrate (about ⅛ inch in thickness) coated with said coating is bent greater than 100 times a right angle around a cylinder with a diameter of ¼ inch.

60. The coating composition of any of embodiments 49 and 55-59, wherein said second particles are dispersed throughout the coating thickness, and wherein said coating retains its hydrophobicity (superhydrophobicity) and/or its oleophobicity (superoleophobicity) after abrasion.

61. The coating of any of embodiments 49 and 55-60, that retains its hydrophobicity (superhydrophobicity) and/or its oleophobicity (superoleophobicity) after being exposed to rain or a shower for more than 1 hour.

EXAMPLES

For the purposes of this disclosure a hydrophobic coating is one that results in a water droplet forming a surface contact angle exceeding about 90° and less than about 180° at room temperature (about 18 to about 23° C.). Similarly, for the purposes of this disclosure a superhydrophobic (SH) coating is one that results in a water droplet forming a surface contact angle exceeding about 150° but less than the theoretical maximum contact angle of about 180° at room temperature. The term hydrophobic includes superhydrophobic, and may be limited to superhydrophobic, unless stated otherwise.

Superhydrophobicity may be assessed by measurement of the contact angle of water droplets with the surface. Where contact angles are not provided or determined directly, the superhydrophobicity of a coating, and particularly the loss of superhydrophobicity after abrasion testing, may be determined by placing water droplets on a coated surface inclined at 3°. Where more than half of the water droplets remain on the surface when it is inclined to 3°, the coating is deemed to have lost its superhydrophobicity.

For the purposes of this disclosure an oleophobic (OP) coating is one that results in a light mineral oil droplet forming a surface contact angle exceeding about 90° and less than about 180° at room temperature (about 18 to about 23° C.). Similarly, for the purposes of this disclosure a superoleophobic coating is one that results in a water droplet forming a surface contact angle exceeding about 150° but less than the theoretical maximum contact angle of about 180° at room temperature. The term oleophobic includes superoleophobic, and may be limited to superoleophobic, unless stated otherwise.

Example 1

Effect of Bayhydrol® Type Binders in One-Step Coating and its Performance in Two Systems Binder Compositions Coating compositions comprising two water-based (waterborne) polyurethanes as binders; a clear BAYHYDROL® (e.g., BAYHYDROL® 110, 122, 124, A145, or 140AQ) and a POLANE® (e.g., POLANE® 700T) were prepared. For each composition in System 1 a BAYHYDROL® and a POLANE® were combined in various ratios having from 40% to 70% BAYHYDROL® and from 60% to 30% POLANE® 700T on a weight to weight basis (w/w), based on the composition as provided by the commercial suppliers (e.g., 4::6 to 7::3 ratios of those components). The binder compositions contained third particles (pigment) where it is indicated that they were "white", and may also contain third particle functioning as extenders. The combined system can be further diluted with up to 50% water (by weight). The combined BAYHYDROL®-POLANE® binder system was used in two different modes discussed below.

Example 1A

One-Step Compositions

Fumed silica, or other second particles, pretreated with siloxane, were added to the above—described binder composition. Second particles were added in amounts ranging from about 5% to about 20% of the composition by weight. Particle size, surface area, and treatments of various fumed silica particles used are given in Table 1.

The composition of this mode may have water additions of up to 50% by weight based upon the weight of the binder composition as described above. Once all components were added to the binder (e.g., second added), the complete compositions were mixed well using steel balls or a low shear mixer. The mixed composition was applied to various substrates using an air spray gun or other means as indicated (e.g., roller) effective to apply a coating to at least a portion of a surface. Once a coating was applied, the surfaces were cured at ambient conditions (65-85° F.) in 12-16 h. The cured coatings were superhydrophobic with water contact angles over 150°. The compositions containing all components were essentially VOC-free as no solvents that were not VOC-exempt were used (see Details in the Description). In a variation of the above-described one-step method, a top coating, as described herein below Example 1B, can be applied over the one-step coating to enhance or alter its properties.

Example 1B

One-Step Compositions with Top Coat Treatment

To the compositions of Example 1A one or more of the first particles (filler particles) from the list in Table 2 are added. First particles can comprise from up to 20% (e.g., 5-20%) of the composition by weight.

In some embodiments, a top coat can be applied to the SH or OP coating described herein, such as the compositions of Example 1A or 1B, to further modify the properties of the coatings. In one embodiment, the top coat comprises acetone, as a VOC-exempt solvent and 1-5% fumed silica (w/v), optionally about 0.25 to about 2% tetrachlorosilane (SiCl$_4$ v/v), and from about 0.25 to about 1.0% (v/v) of a silane such as a compound of formula I or one of the specific silanizing agent s recited in Section 5.1. In addition to the foregoing components, about 0.1 to about 1% v/v water can be added. In another embodiment, the top coat may comprises acetone, as a VOC-exempt solvent and 1-5% of second particles (e.g.) w/v in g/ml) and may optionally contain about 0.25 to about 2% tetrachlorosilane (SiCl$_4$ v/v), and from about 0.25 to about 1.0% (v/v) of a silane such as a compound of formula I or one of the specific silanizing agents recited in Section 5.1.

When a top coat is applied it is typically applied by with air spray gun to base coats are close to completely (100%) dry. The typical drying time for SH and/or OP coats can vary from 45-90 min, at which time they are ready for top coating. In another embodiment, surfaces may be coated a composition described in Example 1A and 1B that has been modified to omit second particles, and then given a top coat. In such a case the coating composition serves as a base coat (similar to a primer) to which a top coat can be applied to obtain the SH and OP performance.

Examples for Systems 1 and 2

Coating compositions comprising a BAYHYDROL® (124, 122, 110, A145, or 140AQ, Bayer Material Science) were mixed with POLANE® 700T (product F63W522, white and applied to metal plates. The durability of the SH and/or OP coatings (resistance of the loss of SH and/or OP properties to abrasion) formed from the compositions were measured. In each case, the BAYHYDROL® and 700T, as prepared by the manufacturer, were mixed in a ratio of 60:40 by volume. To each 100-g mixture was added 7 g of Corvel black as a first particle, 11-g TS720 fumed silica, and 50-g water. The mixtures were agitated using low shear mixer to distribute the TS720 uniformly in the composition. In each case, the solution was sprayed on aluminum plates to approximately the same thickness. After spraying, the plates were air-dried for 30 min followed by curing for 30 min in an oven at 200° F. On testing, the cured plates all displayed superhydrophobicity and were tested for loss of that property using a Taber tester with a 250-g load (CS10 wheel) by assessing the ability of water droplets applied to the abraded surface to roll off when it was inclined at 3 degrees. The failure of more than half of the droplets to roll off the surface was taken as an indication of a loss of superhydrophobicity. The Taber data from the coatings formed from the various BAYHYDROL® containing compositions are summarized in Table 3. That table also includes the key physical, chemical, and mechanical properties of various BAYHYDROL®s. Taber data for various BAYHYDROL® containing compositions is also compared in FIG. 1.

Figure 2:
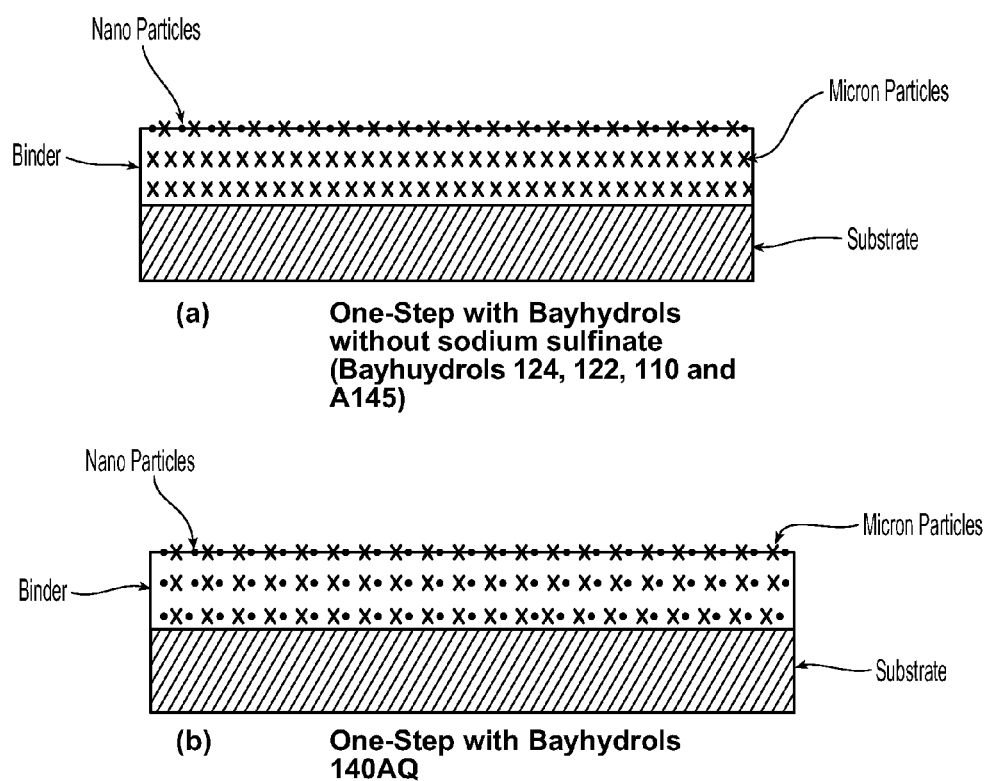
FIG. 2 is a schematic showing the proposed distribution of second particles, ("nano particles" e.g., CAB-O-SIL® TS720) across the thickness of coatings prepared with different BAYHYDROL® based binders. First particles are indicated by "X" and second particles are indicated by small filled circles or dots. The upper portion of the diagram indicates the accumulation of a substantially amount of submicron (e.g., second particles treated to be hydrophobic) at the surface, likely due to the absence of co-solvents. In contrast, coating compositions of the present disclosure (e.g., those which incorporate co-solvents) permit the dispersion of submicron particles (e.g., second particles treated to be hydrophobic) throughout the coating.

Compositions comprising POLANE 700T and BAYHYDROL® 140AQ gave the most abrasion resistant SH and/or OP coatings with a 250 g load (two coatings were also assessed with a 1,000 g load). BAYHYDROL® 140AQ while similar to other BAYHYDROLs listed in Table 3 has several distinguishing characteristics including its cosolvent (Toluene which is present in small amounts, 1%), its high tensile elongation, low modulus of 800 psi, and low hardness (F vs. H and 2H for others). BAYHYDROL® 140AQ is polyester-based, and comprises sodium sulfinate functionality. While not wishing to be bound by any theory, it is believed that the sodium sulfinate can serve as a surfactant and aid in distributing fumed silica particles (TS720) more uniformly throughout the entire coating thickness. Based on that hypothesis, one-step coating based on BAYHYDROL®s 124, 122, 110, and A145, which have second particles localized near the surface are shown diagrammatically in FIG. 2(a). In contrast, one-step coatings formed with BAYHYDROL® 140AQ, which are believed to have the second particles distributed throughout the coating, are diagramed in FIG. 2(b). The schematic in FIG. 2 shows one interpretation for the loss of some or all of the superhydrophobicity in coatings such as those depicted in FIG. 2(a). Those coatings would loose superhydrophobicity once the top of the coating bearing second particles is worn away. The schematic in FIG. 2(b) shows one interpretation for the continued superhydrophobicity of coatings with second particles dispersed throughout the coating thickness even as the coating is abraded, until it reaches bare metal. Coatings shown in FIG. 2(b) show thickness dependence wear and their ability to withstand increasing numbers of Taber abrasion cycles increases with increasing coating thickness as is shown, for example, in Example 2.

TABLE 3

Properties of Various BAYHYDROL ®s used in Developing One-Step Superhydrophobic Coatings

| Bayhydrol Type | No. of Taber Cycles | ph | Viscosity (mPa/s) | Solids (%) | Cosolvent Type | Cosolvent (%) | Water Cosolvent (wt %) | Tensile Strength (psi) |
|---|---|---|---|---|---|---|---|---|
| 124 | 50 | 7.0-9.0 | 50-400 | 35+_2 | NM2P | 12 | 53 | 5000 |
| 122 | 75 | 7.0-9.0 | 50-400 | 35+_2 | NM2P | 15 | 50 | 5000 |
| 110 | 100 | 7.5-9.5 | 50-400 | 35+_2 | NM2P | 15 | 50 | 5900 |
| A145 | 125 | 7.5-8.5 | 400-1500 | 43-47 | Naphtha 100 | 4 | 45.6 | |
| | | | | | 2-butoxyethanol | 4 | | |
| 140AQ | 375 | 6.0-8.0 | 100-700 | 40+_2 | Toluene | 1 | 59 | 5300 |

| Bayhydrol Type | Elongation at Break (%) | Modulus at 100% Elongation (psi) | Tabers 1000 Cycles @ 1000 g (mg loss) | Hardness | Swell after 24 h (%) Water | IPA | MEK | Xylene | Urethane Type |
|---|---|---|---|---|---|---|---|---|---|
| 124 | 275 | 1300 | | H | 5 | 15 | 50 | 50 | Polycabonate |
| 122 | 150 | 4100 | 28 | 2H | 5 | 20 | 45 | 30 | Polycabonate |

TABLE 3-continued

Properties of Various BAYHYDROL ®s used in Developing One-Step Superhydrophobic Coatings

| 110 A145 | 180 | 4200 | 12 | 2H | 10 | 25 | 35 | 20 | Polyester Polyacrylic |
|---|---|---|---|---|---|---|---|---|---|
| 140AQ | 450 | 800 | | F | 10 | 20 | 105 | 50 | Polyester |

Abbreviations and notations:
NM2P—N-methyl-2-pyrolidone
Hardness on Pencil Lead scale as reported by manufacturer (pencil lead hardness) F—Firm; H hard, 2H

Example 2

Coating Thickness Effect Using Bayhydrol® 140AQ

Figure 3:
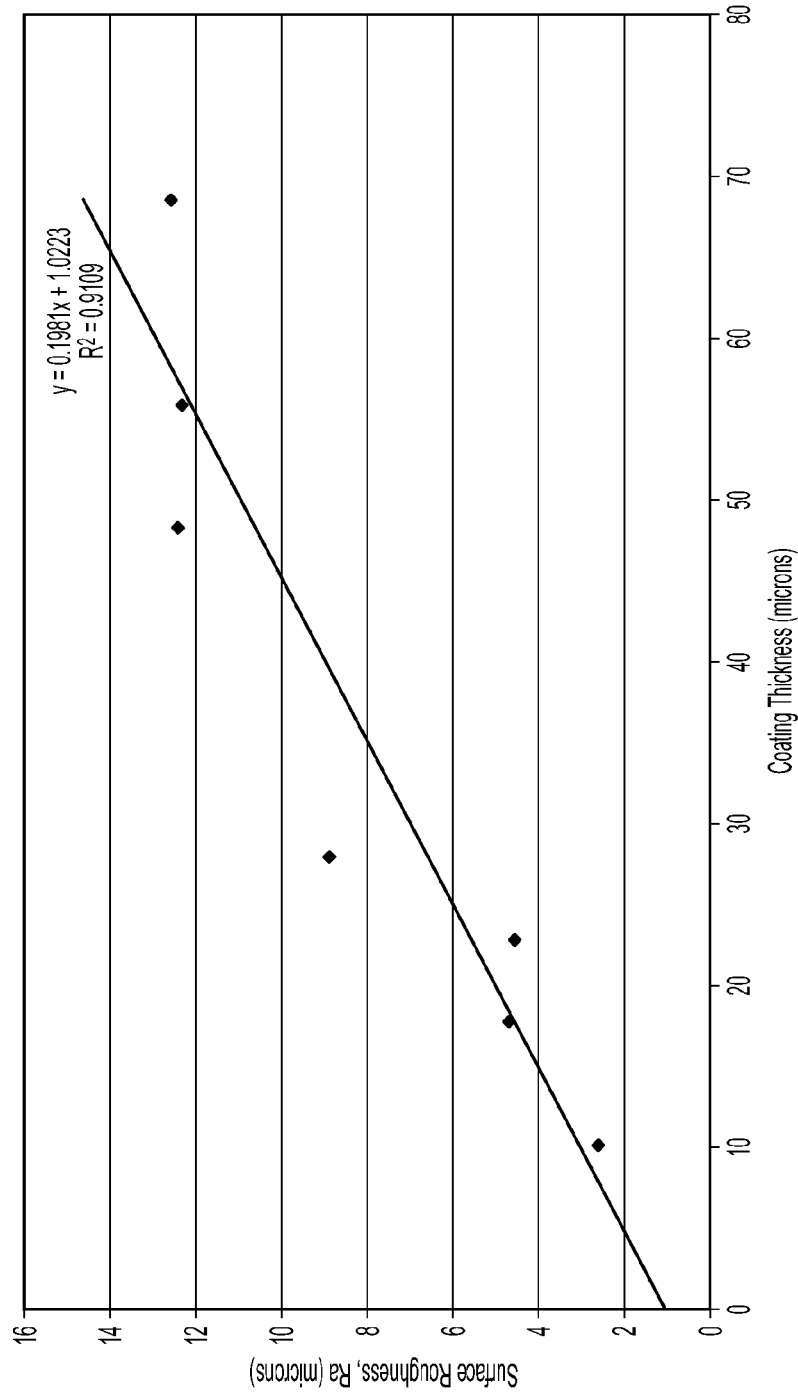
FIG. 3 shows a plot of surface roughness (Ra) as a function of coating thickness for one-step coating made with BAYHYDROL® 140AQ.
Figure 4:
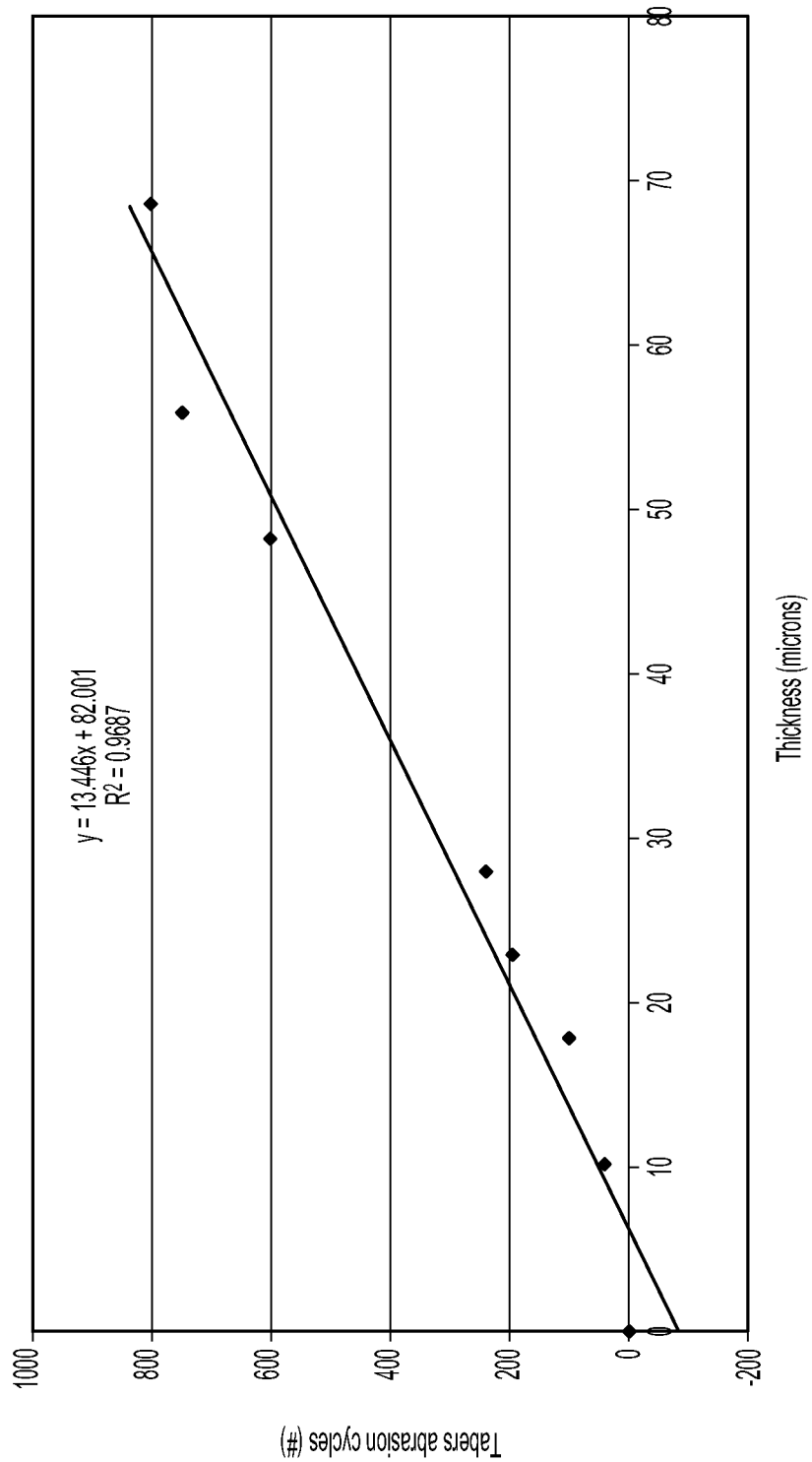
FIG. 4 shows a plot of the amount of abrasion (measured in Taber cycles) required to cause a loss in superhydrophobicity against coating thickness (i.e., Taber cycle variation with coating thickness) for a one-step coating prepared using BAYHYDROL® 140AQ
Figure 5:
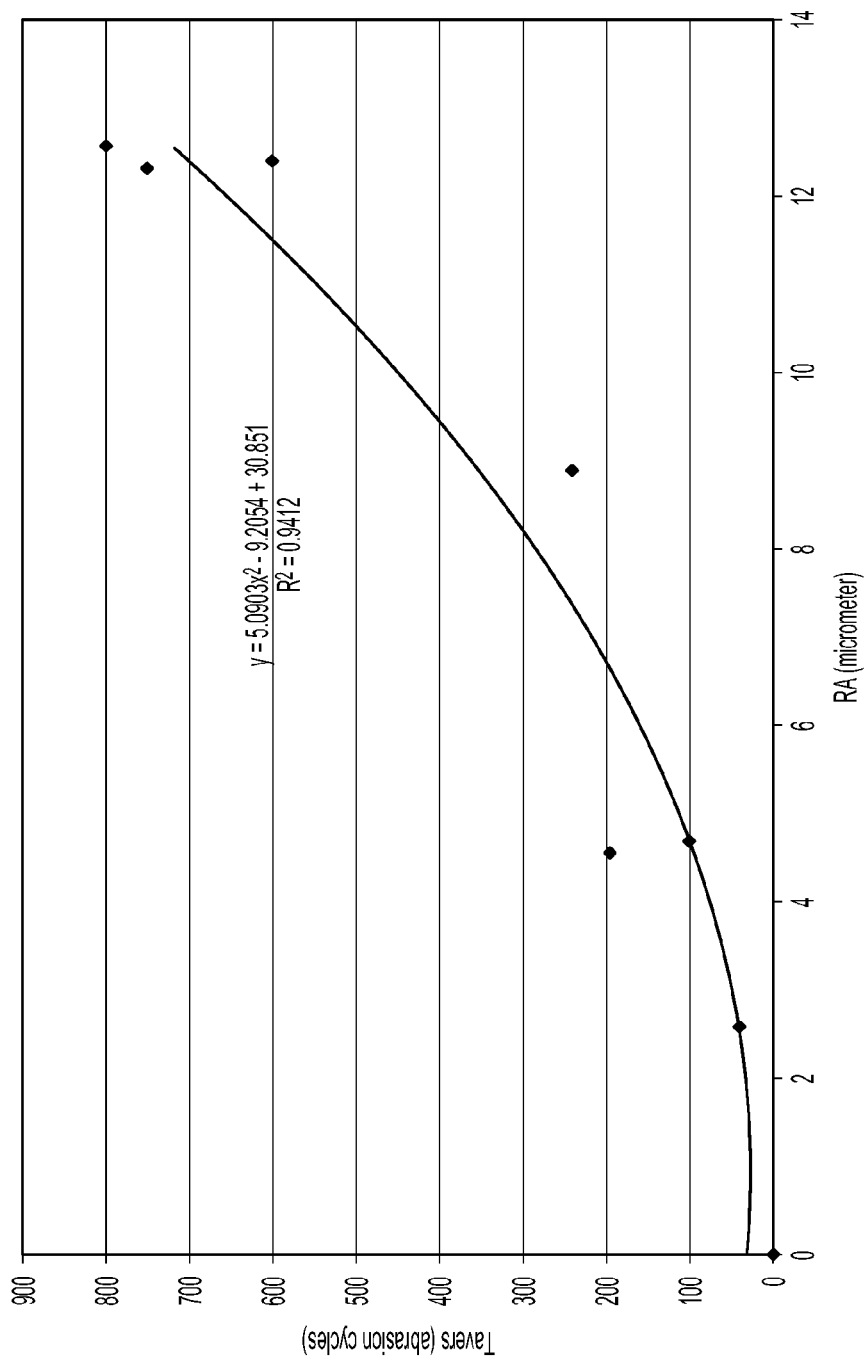
FIG. 5 shows a plot of the amount of abrasion (measured in Taber cycles) required to cause a loss in superhydrophobicity against coating roughness measured as Ra (i.e., Taber cycle variation with increasing surface roughness) for coatings prepared using BAYHYDROL® 140AQ.

A 60:40 mixture of BAYHYDROL® 140AQ and Plane 700T was made on a volume basis using compositions as distributed by the manufacturer. To 100 g of the mixture was added 7-g Tiger Drylac clear matte powder (Series 49), 11-g of CAB-O-SIL® TS720, and 50-g water. The mixture was prepared by low shear mixing and applied by spraying with an air gun with (~40 psi pressure) on to steel (4 by 4 inch (in.) plates of 0.062-in. thickness). Steel plates were used for ease of measuring the coating thickness using a magnetic-based sensor (Model 95520 Digital Gauge, Cen-Tech, Taiwan). A total of seven plates were sprayed and tested for coating thickness, surface roughness, and resistance to wear (i.e., Taber cycles 250-g load). Data on the plates are summarized in Table 4, which shows the coating thickness varied from 10-68 μm (0.4-2.7 mils) and the surface roughness increased with increasing thickness (FIG. 3) from $R_a$=2.59 μm to $R_a$=12.56 μm. The Taber cycles increased approximately linearly with thickness (see FIG. 4) from 40 to 800, an increase of 20× from the thinnest to the thickest coating. The line in FIG. 4 can be used as a guide to selecting the coating thickness for a defined Taber durability. The Taber durability also appears to increase with increasing surface roughness as indicated in FIG. 5.

TABLE 4

Taber and Surface Roughness Data on Steel Plates Coated with One-Step System using BAYHYDROL ® 140AQ

| Coating Thickness (mils) | Tabers (Cycles) | Surface Roughness, $R_a$ (μm) | Coating Thickness (μm) |
|---|---|---|---|
| 0.4 | 40 | 2.59 | 10.16 |
| 0.7 | 100 | 4.69 | 17.78 |
| 0.9 | 195 | 4.55 | 22.86 |
| 1.1 | 240 | 8.89 | 27.94 |
| 1.9 | 600 | 12.40 | 48.26 |
| 2.2 | 750 | 12.32 | 55.88 |
| 2.7 | 800 | 12.56 | 68.58 |

Example 3

Variation on Second Particle Content in a One-Step Coatings Prepared with Bayhydrol® 140AQ/Clear 700T Binder and CAB-O-SIL® TS720 Ranging from 11-20%

A 60:40 mixture of BAYHYDROL® 140AQ and clear POLANE® 700T (F63V521) by volume was prepared using those products as distributed by their manufacturers. To 40 g amounts of each mixture was added 4.4, 6.0, and 8.0 g (i.e., 11%, 15%, and 20%) of CAB-O-SIL® TS720. Also added to each mixture was 20-g (50%) water. All percentages are calculated and based on 100 g of 60:40 mixture. The compositions were each mixed using steel balls or a low impact mixer.

Figure 6:
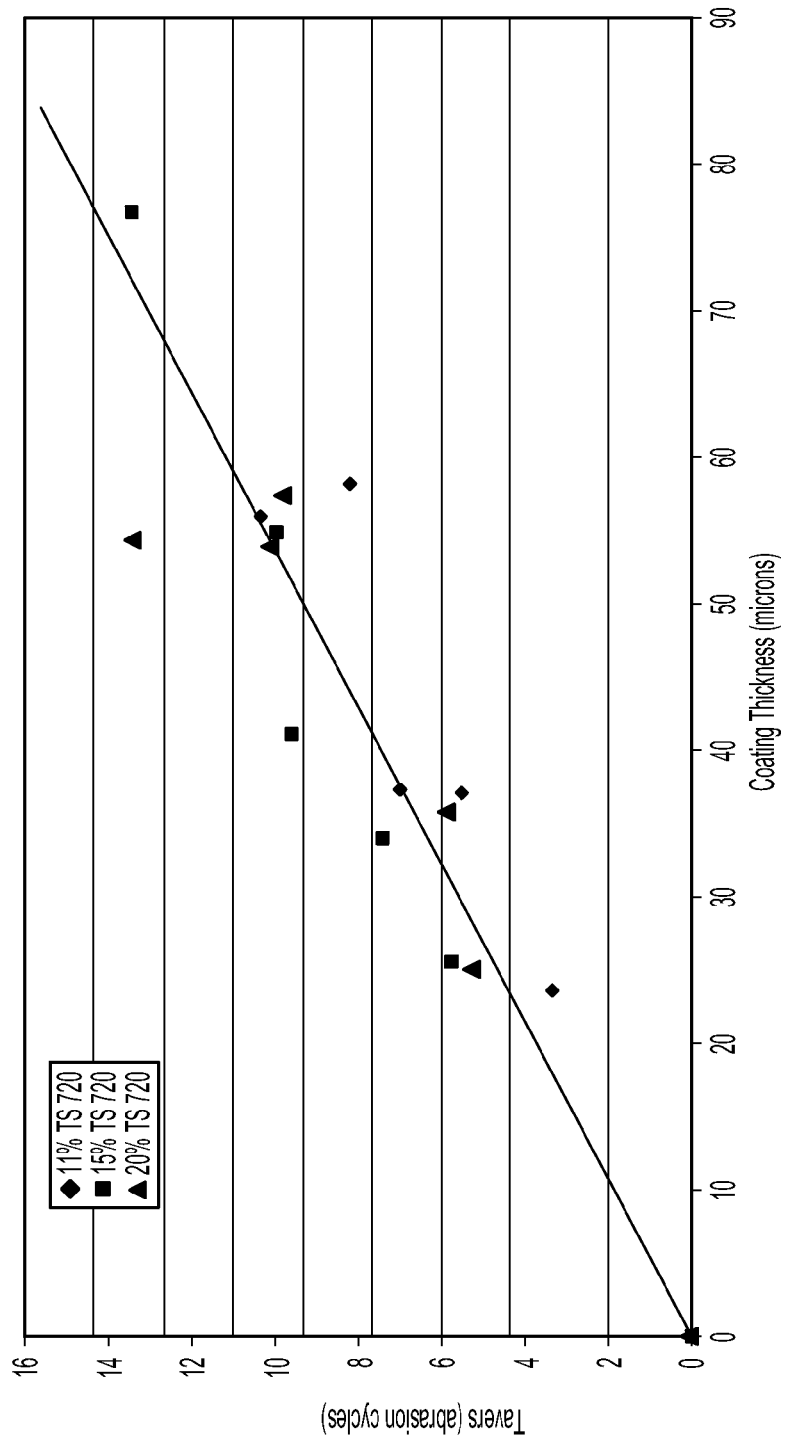
FIG. 6 shows a plot of surface roughness, Ra, as a function of thickness for one-step superhydrophobic coating on steel plates treated with a one-step coatings of BAYHYDROL® 140AQ and clear 700T with CAB-O-SIL® TS720 ranging from 11-20%. Within the first approximation, all of the data with three levels of TS720 (11-20%) fit linearly. Ra values for one-step coating using BAYHYDROL® 140AQ with clear 700T varied from 4-15 μm for coating having a thickness ranging from 20-80 μm.
Figure 7:
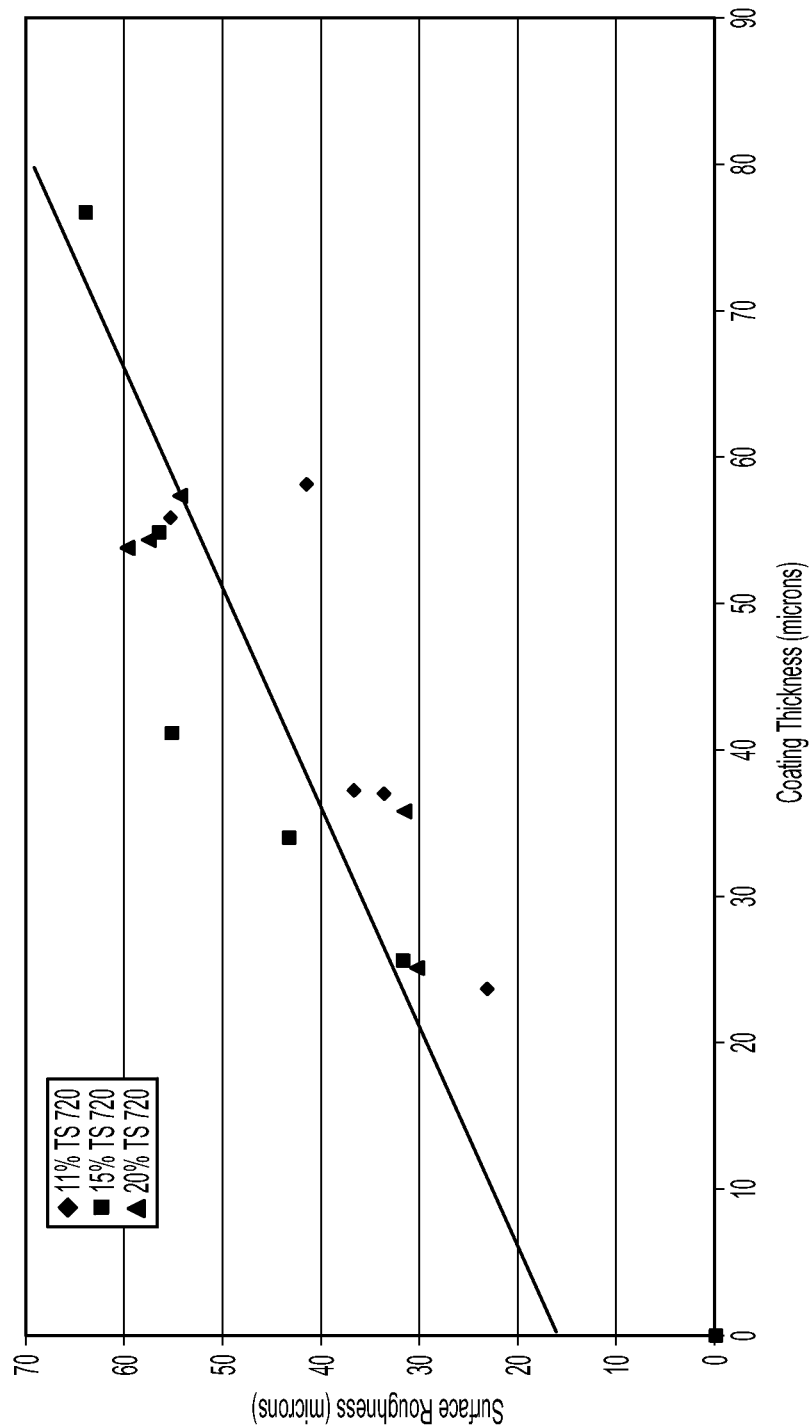
FIG. 7 shows a plot of surface roughness, Rz, as a function of the thickness of one-step superhydrophobic coatings on steel plates described in Example 3 and FIG. 6. $R_z$ values vary from 25-65 μm for coating thickness from 20-80 μm.
Figure 8:
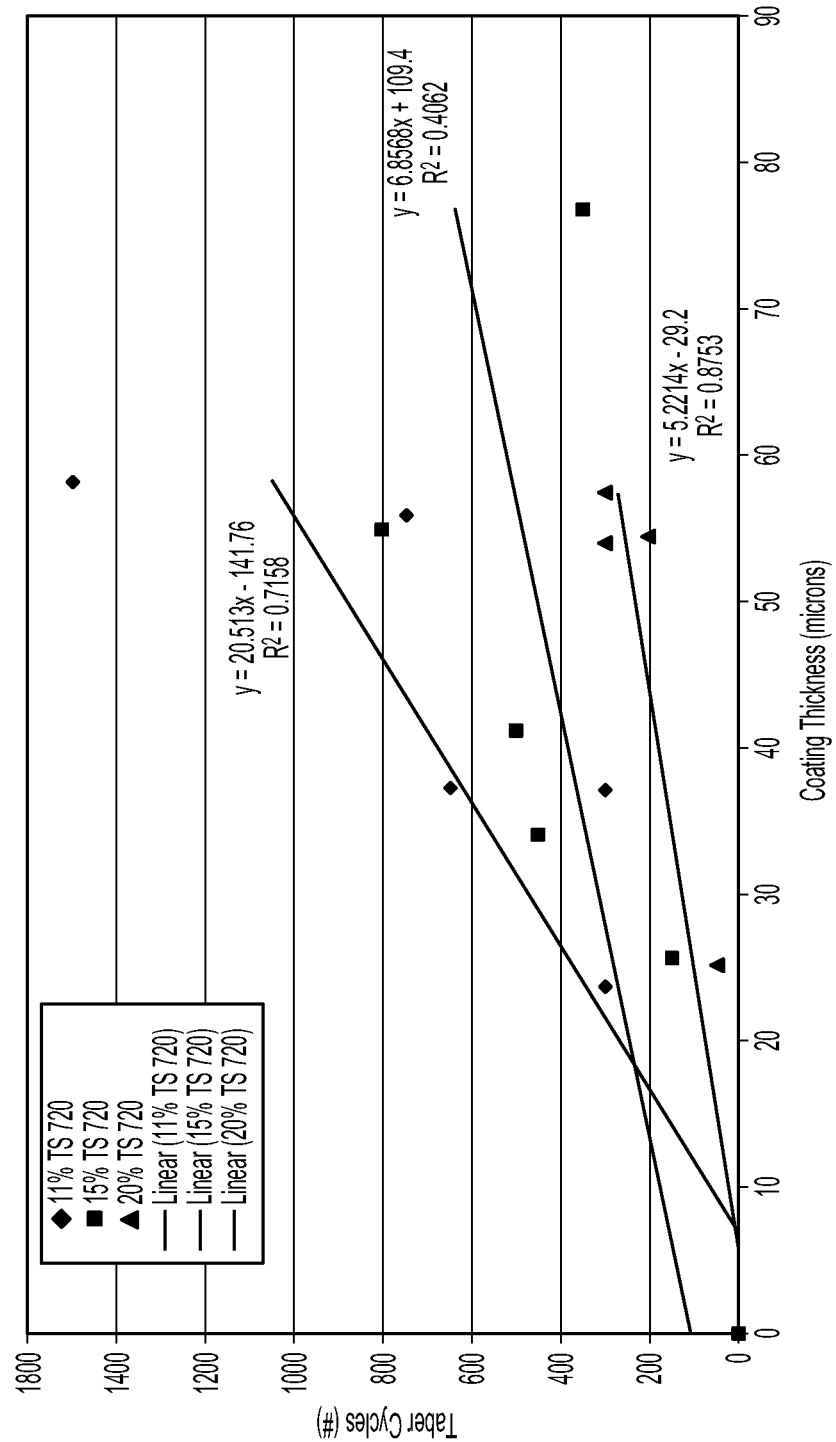
FIG. 8 shows a plot of the amount of abrasion (measured in Taber cycles) required to cause a loss in superhydrophobicity against coating thickness (Taber abrasion data represents abrasion durability). The number of abrasion cycles is plotted as a function of thickness for one-step superhydrophobic coating on the steel plates as described in Example 3 and FIG. 6.

Each mixture was sprayed (using an air gun) on 4×4-in square steel plates at five different thicknesses. All of the plates were air-dried for 30 min prior to drying in an oven at 200° F. for 30-40 min. Each plate was subjected to thickness measurement, surface roughness measurement ($R_a$ and $R_z$ values), and wear resistance using a Taber abrader (Taber abrasion). All Taber abrasion measurements were obtained using 250-g load and CS10 wheels. Data are summarized in Table 5 and plotted in FIGS. 6-8. FIG. 6 and shows the plot of surface roughness, $R_a$ and $R_z$ values respectively. FIG. 8 shows Taber data as a function of coating thickness.

TABLE 5

Summary of Data for One-Step Coating on Steel Plates made with BAYHYDROL ® 140AQ and clear 700T: Fumed Silica TS720 Varied from 11-20%

| Coating | Plate # | Thickness (mils) | Number of Tabers 250-g Load | $R_a$ (μm) | $R_z$ (μm) | Coating Thickness (μm) |
|---|---|---|---|---|---|---|
| 40.0 g Bay 140/700T Clear (60/40), 4.4 g TS720, 20.0 g Water | 1.1 | 0.93 | 300 | 3.36 | 23 | 23.62 |
| | 1.2 | 1.47 | 650 | 7.02 | 36.8 | 37.34 |
| | 1.3 | 1.46 | 300 | 5.52 | 33.7 | 37.08 |
| | 1.4 | 2.29 | 1500 | 8.21 | 41.4 | 58.17 |
| | 1.5 | 2.2 | 750 | 10.35 | 55.3 | 55.88 |
| 40.0 g Bay 140/700T Clear (60/40), 6.0 g TS720, 20.0 g Water | 2.1 | 1.01 | 150 | 5.79 | 31.7 | 25.65 |
| | 2.2 | 1.34 | 450 | 7.44 | 43.2 | 34.04 |
| | 2.3 | 1.62 | 500 | 9.61 | 55.2 | 41.15 |
| | 2.4 | 2.16 | 800 | 9.99 | 56.4 | 54.86 |
| | 2.5 | 3.02 | 350 | 13.46 | 63.8 | 76.71 |
| 40.0 g Bay 140/700T Clear (60/40), 8.0 g TS720, 20.0 g Water | 3.1 | 0.99 | 50 | 5.28 | 30.1 | 25.15 |
| | 3.2 | 1.41 | | 5.88 | 31.6 | 35.81 |
| | 3.3 | 2.26 | 300 | 9.82 | 54.4 | 57.40 |
| | 3.4 | 2.12 | 300 | 10.11 | 59.8 | 53.85 |
| | 3.5 | 2.14 | 200 | 13.43 | 57.5 | 54.36 |

Example 4

One-Step Coating with Bayhydrol®/Polane® Binder with Varying Amounts of Second Particles and Thermoplastic First Particles (Tiger Drylac)

Figure 9:
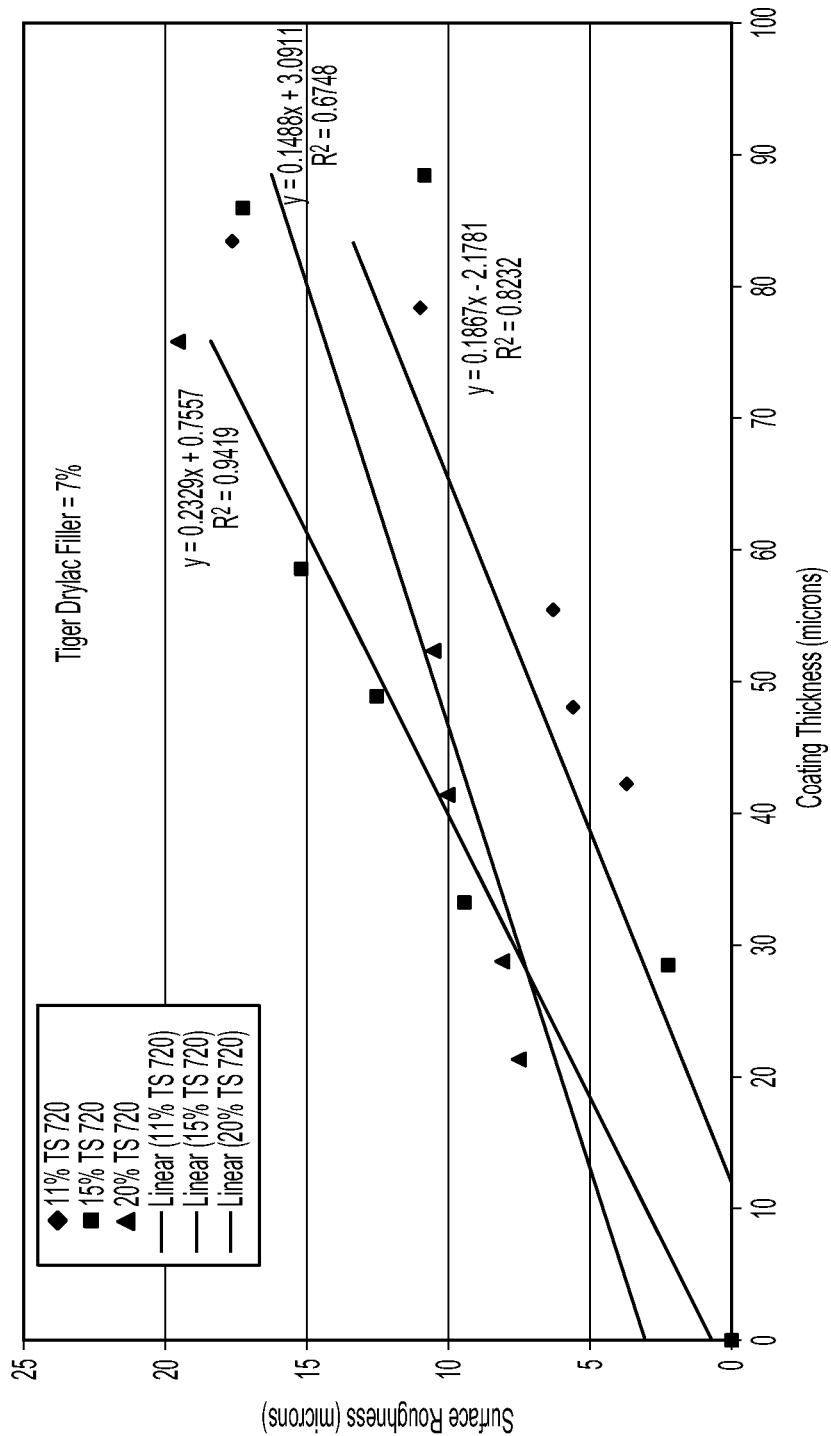
FIG. 9 shows a plot of surface roughness, Ra, as a function of thickness for coatings prepared with one-step superhydrophobic coatings on steel plates. The coatings were prepared with a combination of BAYHYDROL® 140AQ and clear POLANE 700T as a binder, TS720 ranging from 11-20% second particles, and 7% of Tiger Drylac first particle. The $R_a$ data shows differing levels of surface roughness variations with increasing coating thickness, the lowest amount of TS720 (11%) having the least roughness, whereas higher $R_a$ values are noted for 15% and 20% TS720.
Figure 10:
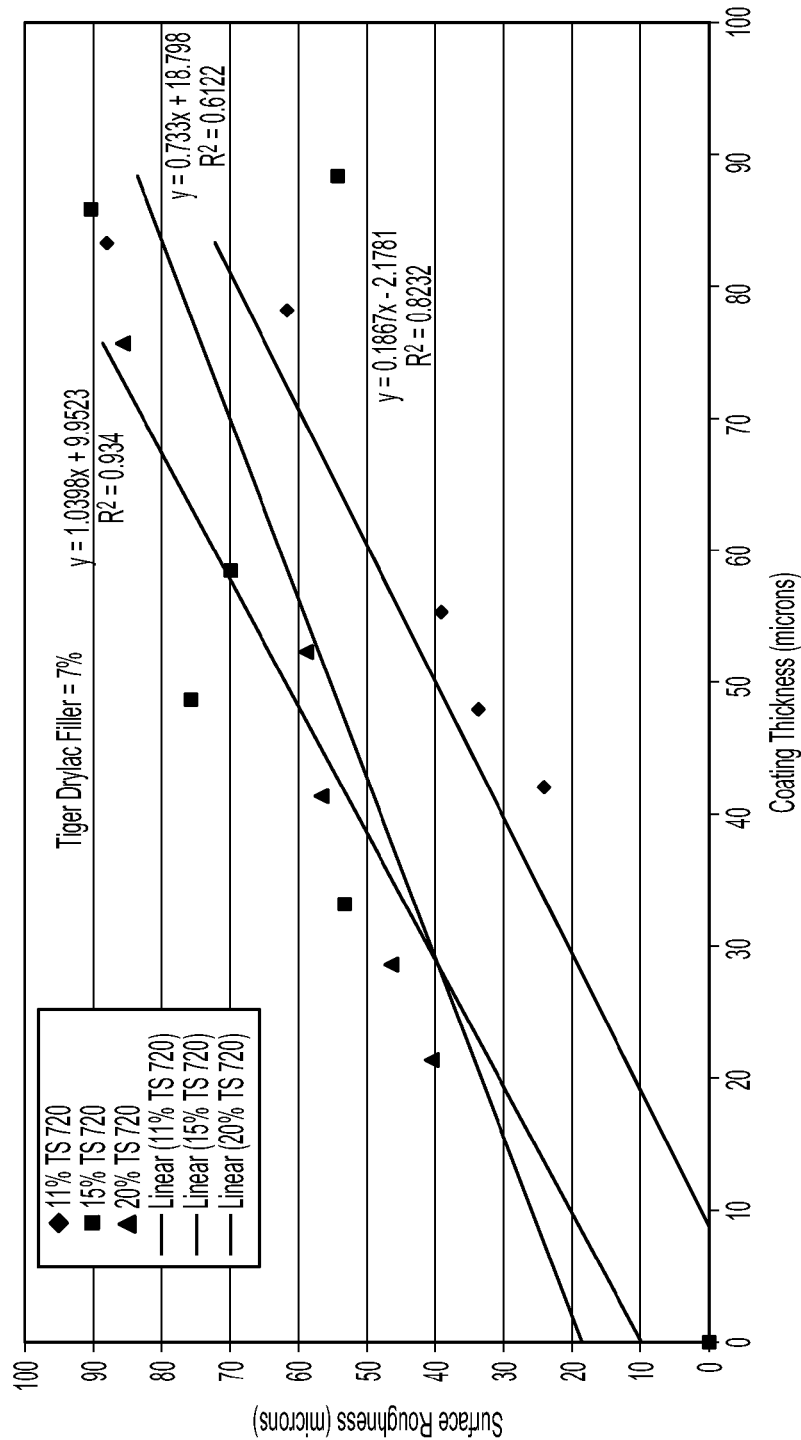
FIG. 10 shows the surface roughness, Rz, as a function of coating thickness for one-step superhydrophobic coating on steel plates described in Example 4 and FIG. 9. Values of Rz, as a function of thickness follows a trend similar to that noted for $R_a$.
Figure 11:
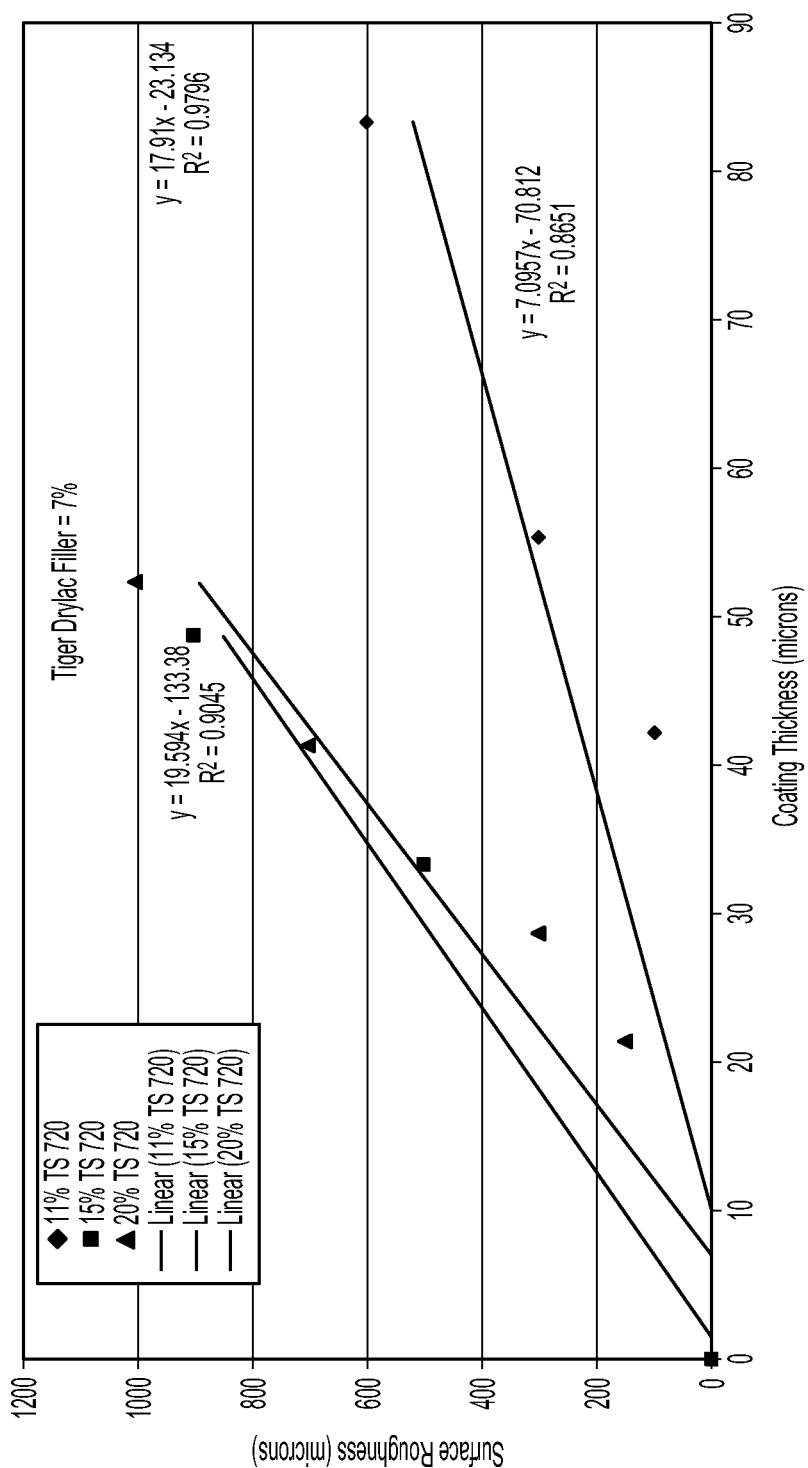
FIG. 11 shows a plot of the amount of abrasion (measured in Taber cycles) required to cause a loss in superhydrophobicity against coating thickness for one-step superhydrophobic coatings on steel plates described in Example 4 and FIG. 9. The data show approximately a linear increase in Taber cycles increasing with increasing coating thickness. The lowest TS720 content (11%) yields the lowest number of Taber abrasion cycles for loss of superhydrophobicity. For TS720 contents of 15 and 20%, the number of Taber cycles to loss of superhydrophobicity is similar. For a given coating thickness, perhaps 50 μm, 11% TS720 gives a Taber value of about 300-400 as opposed to 800 abrasion cycles for TS720 at a content of 15 or 20%.

The mixtures in Example 3 were duplicated with the exception that in all cases a 7% addition of a thermoplastic first particle powder (Tiger Drylac) was added. Mixtures with each level of CAB-O-SIL® TS720 and 7% of first particle were sprayed, using an air spray gun, on five 4×4-in. square plates to achieve five different thicknesses on different plates. Each plate was subjected to thickness, surface roughness, and Taber abrasion testing, which is summarized in Table 6, and plotted in FIGS. 9-11.

TABLE 6

Summary of Data for One-Step Coating on Steel Plates made with BAYHYDROL ® 140AQ and Clear 700T Fumed Silica TS720 was Varied from 11-20% and 7% of Tiger Drylac was added as a First particle

| Coating | Plate # | Thickness (mils) | Number of Tabers 250-g Load | $R_a$ (μm) | $R_z$ (μm) | Coating Thickness (μm) |
|---|---|---|---|---|---|---|
| 40.0 g Bay | 4.1 | 1.66 | 100 | 3.71 | 24.1 | 42.16 |
| 140/700T Clear | 4.2 | 1.89 | | 5.61 | 33.7 | 48.01 |
| (60/40), 4.4 g | 4.3 | 2.18 | 300 | 6.35 | 39.2 | 55.37 |
| TS720, 2.8 Tiger | 4.4 | 3.08 | | 10.97 | 61.7 | 78.23 |
| Drylac, 20.0 g | 4.5 | 3.28 | 600 | 17.64 | 88 | 83.31 |
| 40.0 g Bay | 5.1 | 1.31 | 500 | 9.47 | 53.2 | 33.27 |
| 140/700T Clear | 5.2 | 1.92 | 900 | 12.54 | 75.8 | 48.77 |
| (60/40), 6.0 g | 5.3 | 2.3 | | 15.26 | 69.9 | 58.42 |
| TS720, 2.8 Tiger | 5.4 | 3.38 | | 17.26 | 90.3 | 85.85 |
| Drylac, 20.0 g | 5.5 | 3.48 | | 10.85 | 54.4 | 88.39 |
| 40.0 g Bay | 6.1 | 0.84 | 150 | 7.49 | 40.3 | 21.34 |
| 140/700T Clear | 6.2 | 1.13 | 300 | 8.09 | 46.4 | 28.70 |
| (60/40), 8.0 g | 6.3 | 1.63 | 700 | 10.04 | 56.7 | 41.40 |
| TS720, 2.8 Tiger | 6.4 | 2.06 | 1000 | 10.50 | 58.9 | 52.32 |
| Drylac, 20.0 g | 6.5 | 2.98 | | 19.52 | 85.6 | 75.69 |

"Bay" = BAYHYDROL ®
20.0 g is 20 grams of water

Example 5

One-Step Coating with Binders Prepared with Bayhydrol® 140AQ and Polane® 700T White, and Three Levels of TS720 Ranging from 1.1-20%

Figure 12:
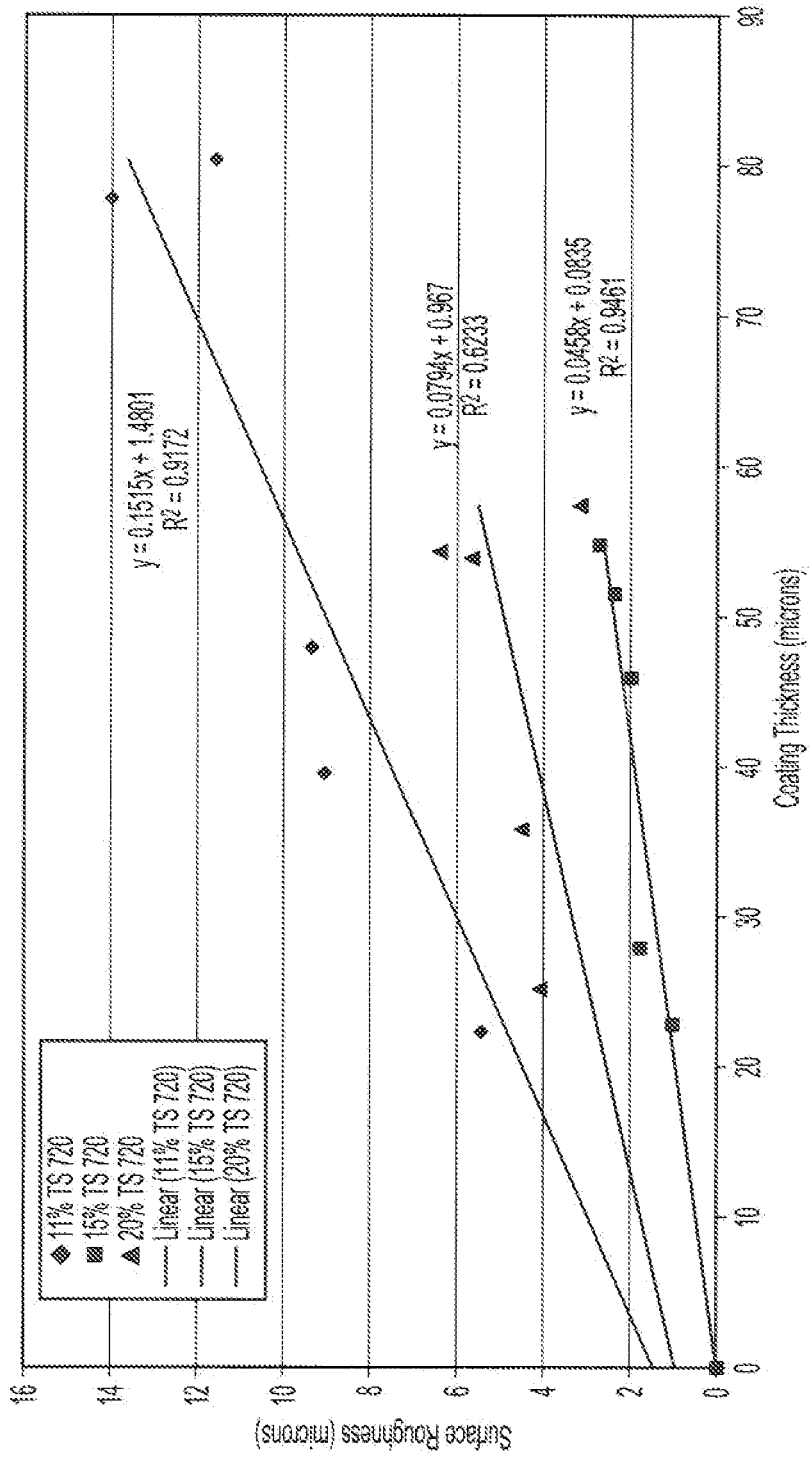
FIG. 12 shows a plot of surface roughness, Ra, as a function of coating thickness for one-step superhydrophobic coating on steel plates. The coatings were prepared using BAYHYDROL® 140AQ and white POLANE 700T, and TS720 second particles in amounts ranging from 11-20%. Ra values show an approximately linear increase with increasing thickness for each level of TS720. The lowest values of Ra were noted for TS720 of 15%, and the Ra values for TS720 at 20% showed roughness values that were in between those of 11% and 20% TS720.

The mixtures in Example 3 were duplicated with the exception that in all cases the clear POLANE® 700T was replaced with white POLANE® 700T (product F63W522). White 700T has about 15% TiO₂ pigment first particles. Data for this study on 4×4-in. steel plates are summarized in Table 7 and plotted in FIGS. 12-14.

Figure 13:
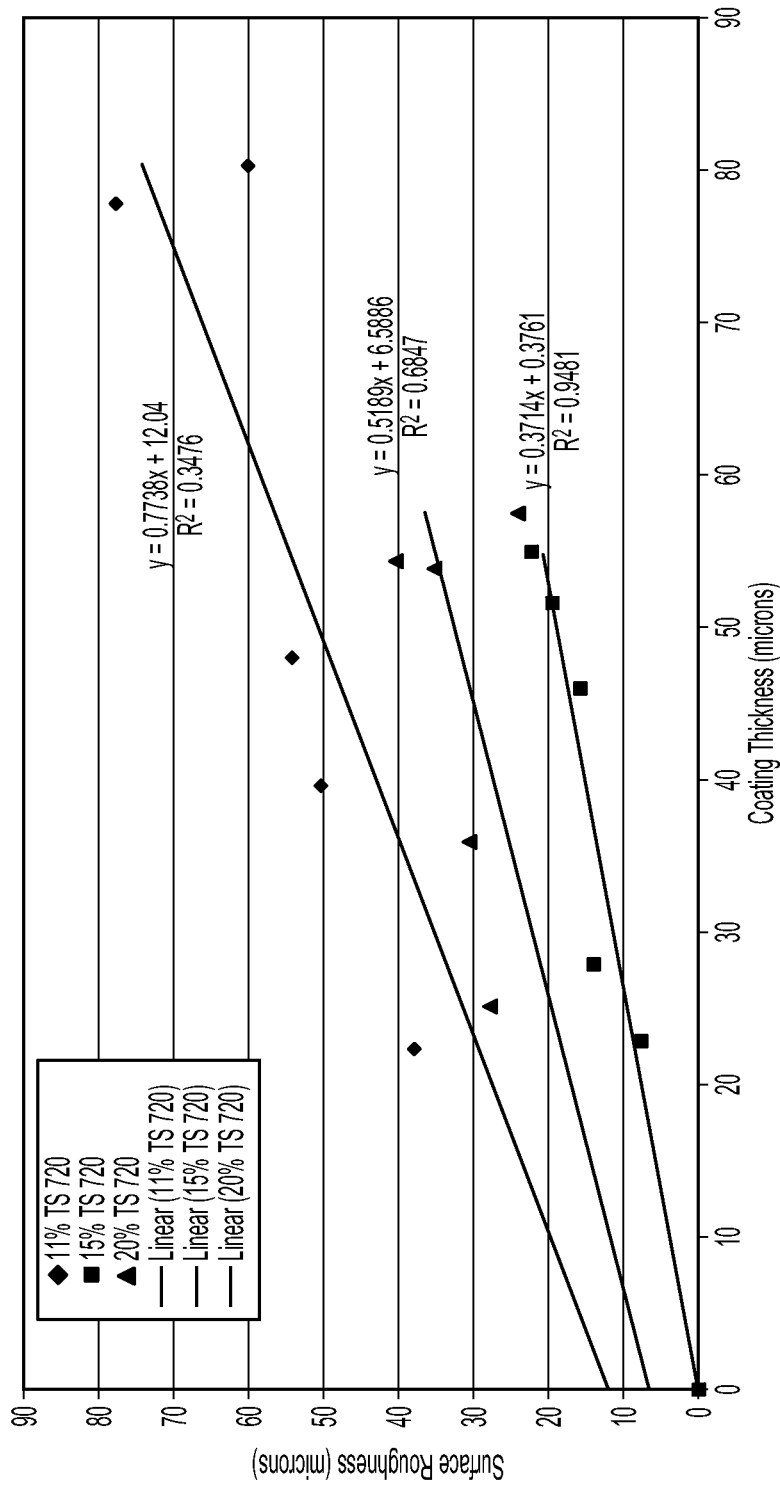
FIG. 13 shows a plot of surface roughness, Rz, as a function of thickness for one-step superhydrophobic coating on steel plates. The coatings were prepared using BAYHYDROL® 140AQ and white POLANE 700T and with TS720 in amounts ranging from 11-20%. Rz values show an approximately linear increase with increasing coating thickness for each level of TS720. The lowest values of Rz were noted for TS720 of 15%, and the Rz values for TS720 at 20% showed roughness values that were in between the values for compositions with 11% and 20% TS720.
Figure 14:
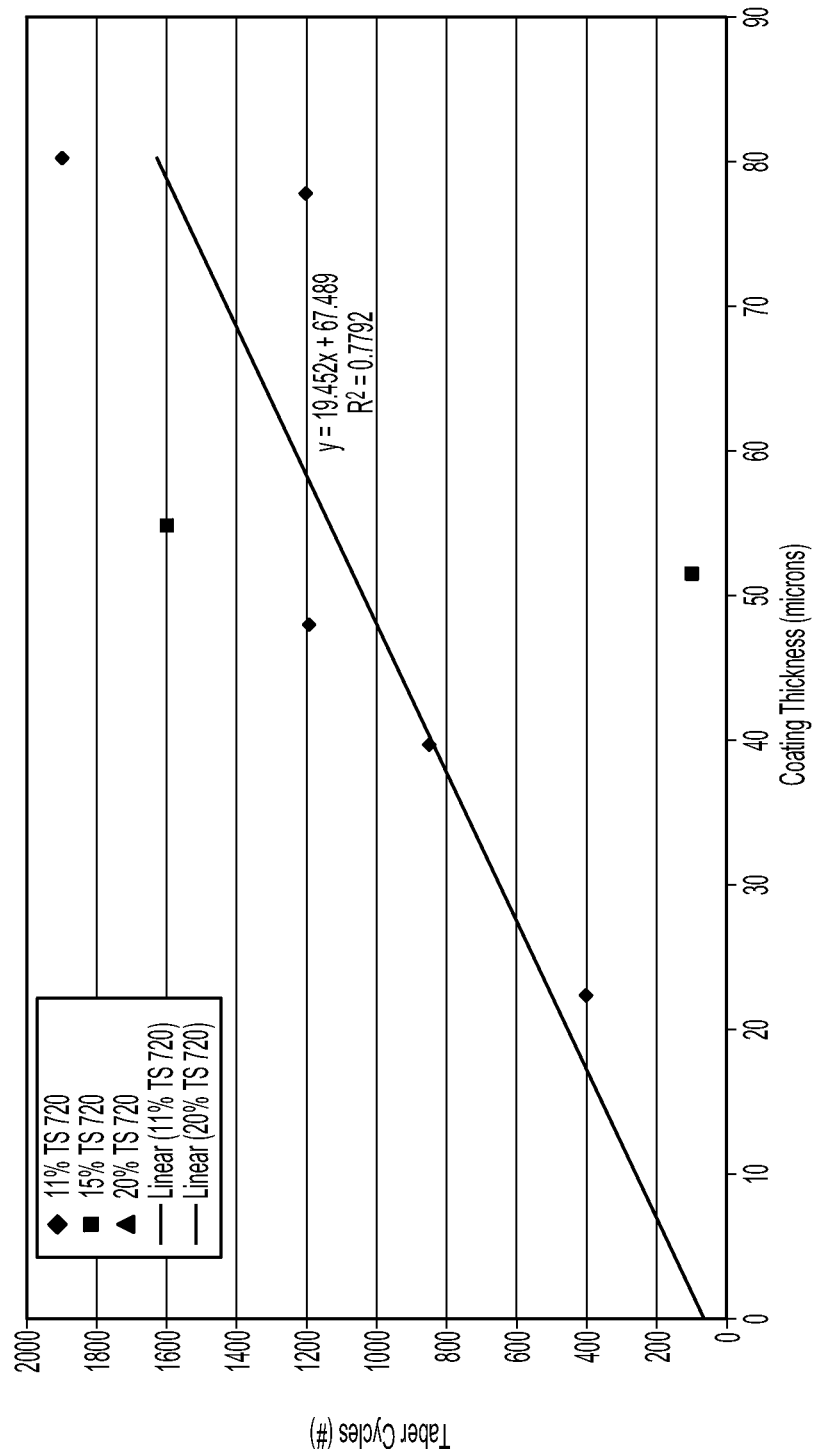
FIG. 14 shows a plot of the amount of abrasion (measured in Taber cycles) required to cause a loss in superhydrophobicity against coating thickness for one-step superhydrophobic coatings on steel plates. The coatings were prepared using BAYHYDROL® 140AQ and white POLANE 700T, and TS720 second particles in amounts ranging from 11-20%.

A separation of surface roughness values is noted for compositions with white TS720 as opposed to clear TS720, which is used in Example 3 (see e.g., the Taber Abrader data, FIG. 13). As noted in Table 7, the coating for 20% TS720 and 8 gm of PUD mixture cracked for all thicknesses; therefore, no Taber data were obtained. Data for TS720 of 11% show a very, nice linear increase with increasing coating thickness. There were only two Taber data points for TS720 of 15%. One was higher and the other was much lower than TS720 of 11%.

TABLE 7

Summary of Data for One-Step Coating on Steel Plates made with BAYHYDROL ® 140AQ and White 700T. Fumed Silica TS720 Varied from 11-

| Coating | Plate # | Thickness (mils) | Number of Tabers 250-g Load | $R_a$ (μm) | $R_z$ (μm) | Coating Thickness (μm) |
|---|---|---|---|---|---|---|
| 40.0 g Bay | 7.1 | 0.88 | 400 | 5.43 | 37.9 | 22.35 |
| 140/700T White | 7.2 | 1.56 | 850 | 9.06 | 50.2 | 39.62 |
| (60/40), 4.4 g | 7.3 | 1.89 | 1200 | 9.37 | 53.9 | 48.01 |
| TS720, 20.0 g | 7.4 | 3.06 | 1200 | 14.02 | 77.6 | 77.72 |
| Water | 7.5 | 3.16 | 1900 | 11.60 | 60 | 80.26 |
| 40.0 g Bay | 8.1 | 0.9 | | 1.00 | 7.42 | 22.86 |
| 140/700T White | 8.2 | 1.1 | | 1.77 | 13.9 | 27.94 |
| (60/40), 6.0 g | 8.3 | 1.81 | | 1.96 | 15.6 | 45.97 |
| TS720, 20.0 g | 8.4 | 2.03 | 100 | 2.36 | 19.1 | 51.56 |
| Water | 8.5 | 2.16 | 1600 | 2.71 | 21.7 | 54.86 |
| 40.0 g Bay | 9.1 | 0.74 | Coating cracked | 4.08 | 27.4 | 18.80 |
| 140/700T White | | | | | | |
| (60/40), 8.0 g | 9.2 | 1.32 | Coating cracked | 4.50 | 30.2 | 33.53 |
| TS720, 20.0 g | | | | | | |
| Water | 9.3 | 1.68 | Coating cracked | 3.18 | 24 | 42.67 |
| | 9.4 | 2.04 | Coating cracked | 5.65 | 35.4 | 51.82 |
| | 9.5 | 2.4 | Coating cracked | 6.40 | 40.1 | 60.96 |

Example 6

Figure 15:
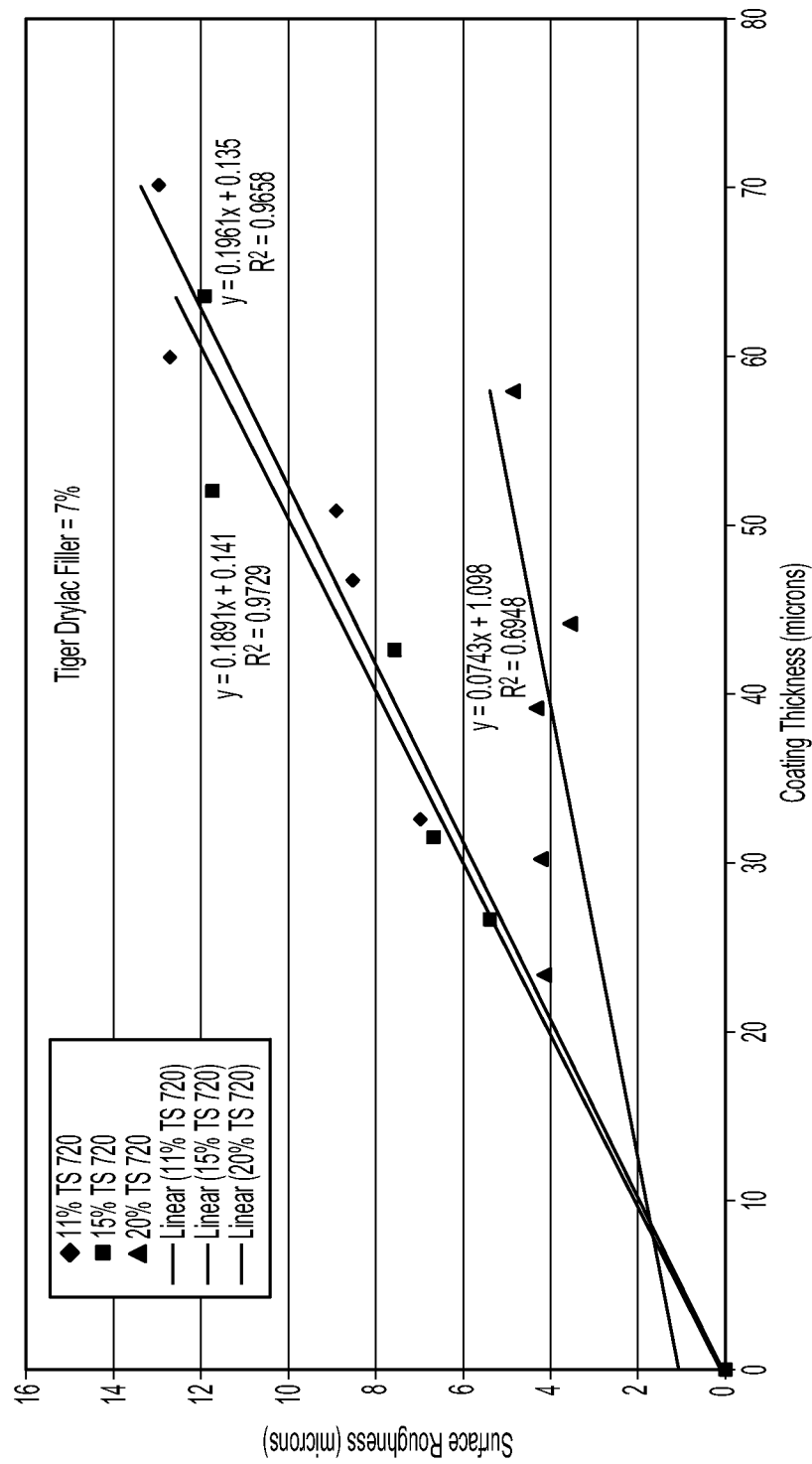
FIG. 15 shows a plot of surface roughness, Ra, as a function of thickness for one-step superhydrophobic coating on steel plates. The coatings were prepared using BAYHYDROL® 140AQ and white POLANE 700T, TS720 second particles in amounts ranging from 11-20%, and 7% of Tiger Drylac first particles.
Figure 16:
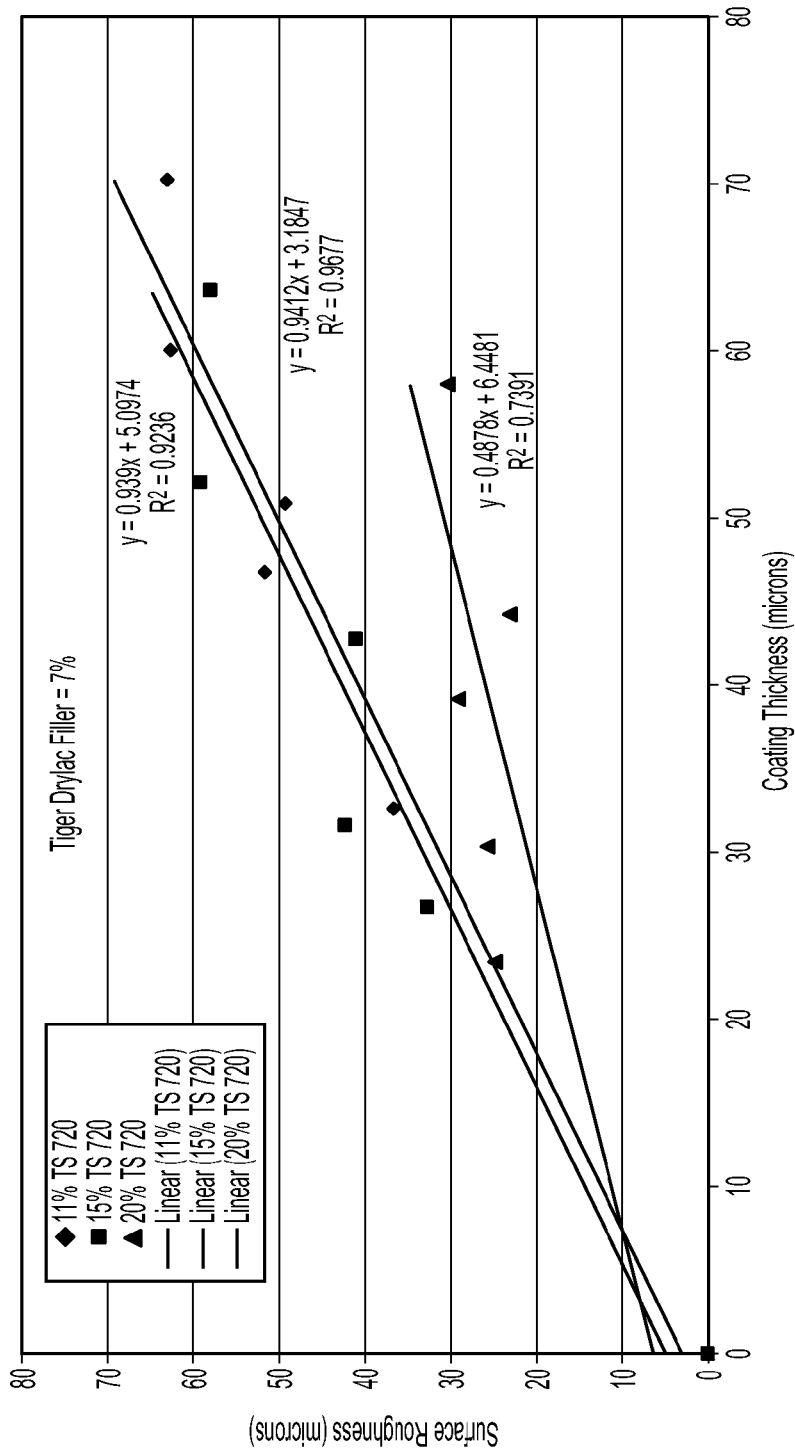
FIG. 16 shows a plot of surface roughness, Rz, as a function of thickness for one-step superhydrophobic coatings on steel plates. The coatings were prepared using BAYHYDROL® 140AQ and clear 700T, TS720 second particles in amounts ranging from 11-20%, and 7% of Tiger Drylac first particles.
Figure 17:
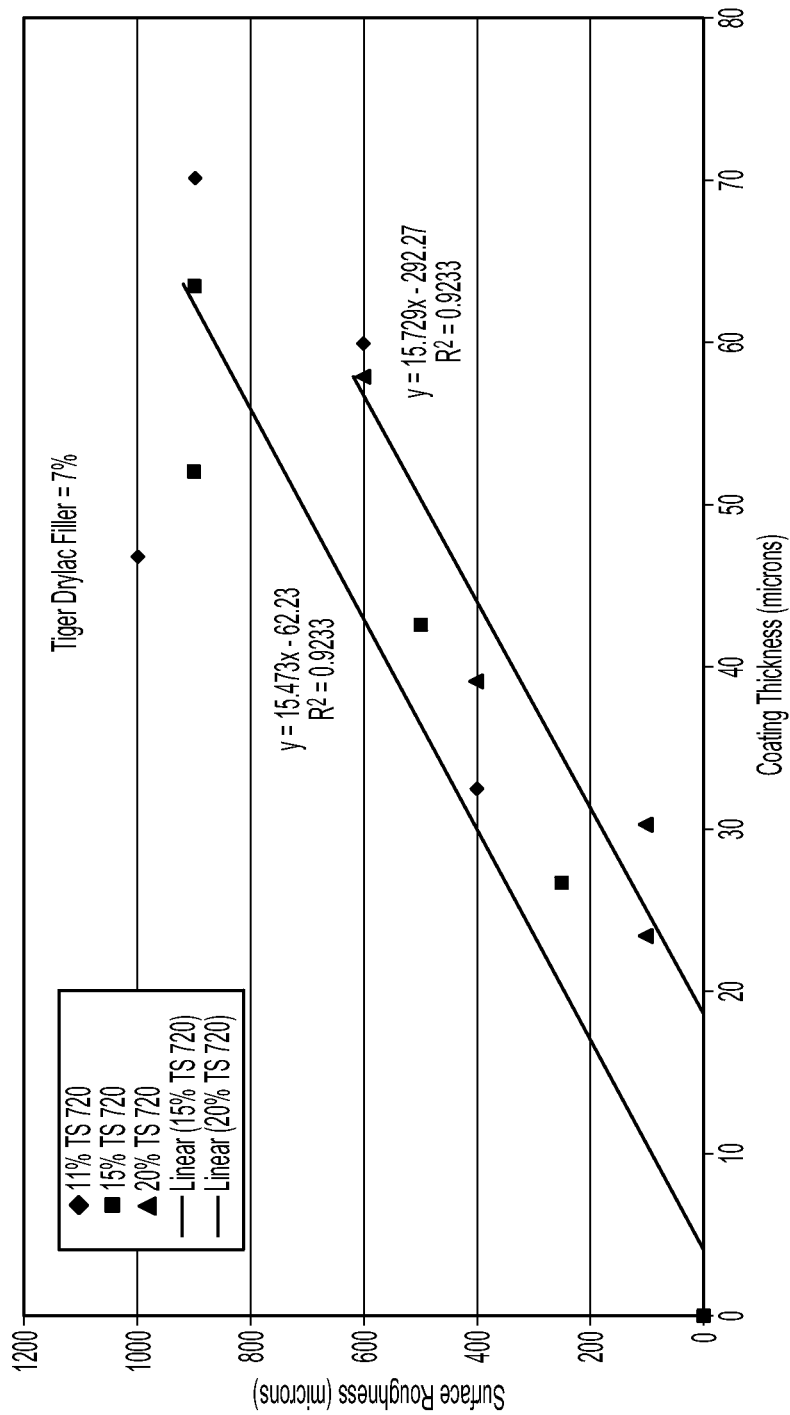
FIG. 17 shows a plot of the amount of abrasion (measured in Taber cycles) required to cause a loss in superhydrophobicity as a function of thickness for one-step superhydrophobic coatings on steel plates. The coatings were prepared using BAYHYDROL® 140AQ and white 700T as a binder, TS720 second particles in amounts ranging from 11-20%, and 7% of Tiger Drylac first particle.

One-Step Coating with Binders of Bayhydrol® 140AQ and Polane® 700T and Three Levels of Cab-O-Sil® TS720 Ranging from 11-20%, and a 7% with Drylac First Particle Additions The mixtures in Example 5 were duplicated with the exception that in all cases a 7% addition of a thermoplastic first particle powder (Tiger Drylac) was added. Data for steel plates coated with these mixtures is given in Table 8 and plotted in FIGS. 15-17. Surface roughness values $R_a$ and $R_z$ show very similar trends (see FIGS. 15 and 16). The $R_a$ and $R_z$ values increase linearly with increasing coating thickness for all CAB-O-SIL® TS720 levels, Higher roughness values were noted for CAB-O-SIL® TS720 of 11 and 15%. The lowest values were noted for 20%. Abrasion resistance, measured as Taber abrasion cycles, shows an essentially linear increase with increasing thickness (see FIG. 17). Higher values were noted for CAB-O-SIL® TS720 of 11 and 15% as compared to TS720 of 20%.

TABLE 8

Summary of Data for One-Step Coating on Steel Plates made with BAYHYDROL ® 140AQ and White 700. Fumed Silica TS720 Varied from 11-20%, and 7% of Tiger Drylac was added as First particle.

| Coating | Plate # | Thickness (mils) | Number of Tabers 250-g Load | $R_a$ (μm) | $R_z$ (μm) | Coating Thickness (μm) |
|---|---|---|---|---|---|---|
| 40.0 g Bay | 10.1 | 1.28 | 400 | 6.94 | 36.8 | 32.51 |
| 140/700T White | 10.2 | 1.84 | 1000 | 8.53 | 51.8 | 46.74 |
| (60/40), 4.4 g | 10.3 | 2 | | 8.90 | 49.4 | 50.80 |
| TS720, 2.8 Tiger | 10.4 | 2.36 | 600 | 12.70 | 62.8 | 59.94 |
| Drylac, 20.0 g | 10.5 | 2.76 | 900 | 12.97 | 63.1 | 70.10 |
| 40.0 g Bay | 11.1 | 1.05 | 250 | 5.37 | 32.9 | 26.67 |
| 140/700T White | 11.2 | 1.24 | | 6.69 | 42.3 | 31.50 |
| (60/40), 6.0 g | 11.3 | 1.68 | 500 | 7.58 | 41.2 | 42.67 |
| TS720, 2.8 Tiger | 11.4 | 2.05 | 900 | 11.71 | 59.3 | 52.07 |
| Drylac, 20.0 g | 11.5 | 2.5 | 900 | 11.90 | 58.1 | 63.50 |
| 40.0 g Bay | 12.1 | 0.92 | 100 | 4.16 | 24.9 | 23.37 |
| 140/700T White | 12.2 | 1.19 | 100 | 4.20 | 25.7 | 30.23 |
| (60/40), 8.0 g | 12.3 | 1.54 | 400 | 4.32 | 29.3 | 39.12 |
| TS720, 2.8 Tiger | 12.4 | 1.738 | | 3.54 | 23.2 | 44.15 |
| Drylac, 20.0 g | 12.5 | 2.28 | 600 | 4.85 | 30.6 | 57.91 |

Example 7

Coatings with Varying Ts720 Second Particle Content (from 5-9%) without First Particle Additions Taber abrasion durability and surface roughness data were obtained for two sets of steel plates, coated with two compositions differing only in the binder component of the coating. One composition was prepared with a binder of 60:40 BAYHYDROL® 140AQ and clear POLANE® 700T (product F63V521) (v/v) and the other coated with a binder of 60:40 BAYHYDROL®140AQ and white POLANE® 700T (product F63W522) (v/v). With both binders, CAB-O-SIL® TS720 content was varied from 5 to 9% (w/w based on the weight of the binder composition). Three different thicknesses of each TS720-containing composition were spray-coated on steel plates and processed identically as in the preceding examples. After curing, all plates were subjected to measurement of coating thickness, surface roughness, and testing of resistance of the coatings' resistance to the loss of their hydroph bicioleophobic properties using a Taber abrader (250 g load and CS10 wheels). Data for clear 700T plates is summarized in Table 9 and for white 700T in Table 10.

TABLE 9

Summary of Data for One-Step Coating on Steel Plates made with BAYHYDROL ® 140AQ and Clear 700T. Fumed Silica TS720 Varied from 5-9% (Without First Particle Additions)

| Coating | Plate # | Thickness (mils) | Number of Tabers 250-g Load | $R_a$ (μm) | $R_z$ (μm) | Coating Thickness (μm) |
|---|---|---|---|---|---|---|
| 40.0 g Bay | 1.1 | 0.82 | 10 | 1.66 | 10.73 | 20.83 |
| 140/700T Clear | 1.2 | 1.16 | 10 | 3.88 | 22.13 | 29.46 |
| (60/40), 2.0 g TS720, 3 g Water | 1.3 | 1.5 | 10 | 3.16 | 16.47 | 38.10 |
| 40.0 g Bay | 2.1 | 0.62 | 10 | 1.67 | 12.93 | 15.75 |
| 140/700T Clear | 2.2 | 1.4 | 30 | 1.78 | 12.73 | 35.56 |
| (60/40), 2.8 g TS720, 4 g Water | 2.3 | 1.63 | 30 | 1.61 | 14.07 | 41.40 |
| 40.0 g Bay | 3.1 | 0.72 | 120 | 2.37 | 16.53 | 18.29 |
| 140/700T Clear | 3.2 | 1.34 | 130 | 2.50 | 17.03 | 34.04 |
| (60/40), 3.6 g TS720, 6 g Water | 3.3 | 1.69 | 160 | 2.93 | 19.68 | 42.93 |

TABLE 10

Data for One-Step Coatings on Steel Plates Made with BAYHYDROL ® 140AQ and White 700T Binder and Cab-O-Sil TS720 from 5%-9%

| Coating | Plate # | Thickness (mils) | Number of Tabers 250-g Load | $R_a$ (μm) | $R_z$ (μm) | Coating Thickness (μm) |
|---|---|---|---|---|---|---|
| 40.0 g Bay | 4.1 | 0.55 | 10 | 3.16 | 18.37 | 13.97 |
| 140/700T White | 4.2 | 0.88 | 15 | 6.76 | 38.60 | 22.35 |
| (60/40), 2.0 g TS720, 3 g Water | 4.3 | 1.04 | 75 | 6.42 | 37.03 | 26.42 |
| 40.0 g Bay | 5.1 | 0.41 | 40 | 3.35 | 19.80 | 10.41 |
| 140/700T White | 5.2 | 1.09 | 80 | 3.30 | 22.73 | 27.69 |
| (60/40), 2.8 g TS720, 8.8 g Water | 5.3 | 1.48 | 100 | 3.24 | 22.07 | 37.59 |
| 40.0 g Bay | 6.1 | 0.44 | 80 | 4.33 | 23.73 | 11.18 |
| 140/700T White | 6.2 | 0.79 | 300 | 6.67 | 35.77 | 20.07 |
| (60/40), 3.6 g TS720, 15 g Water | 6.3 | 1.59 | 400 | 12.68 | 55.30 | 40.39 |

Figure 18:
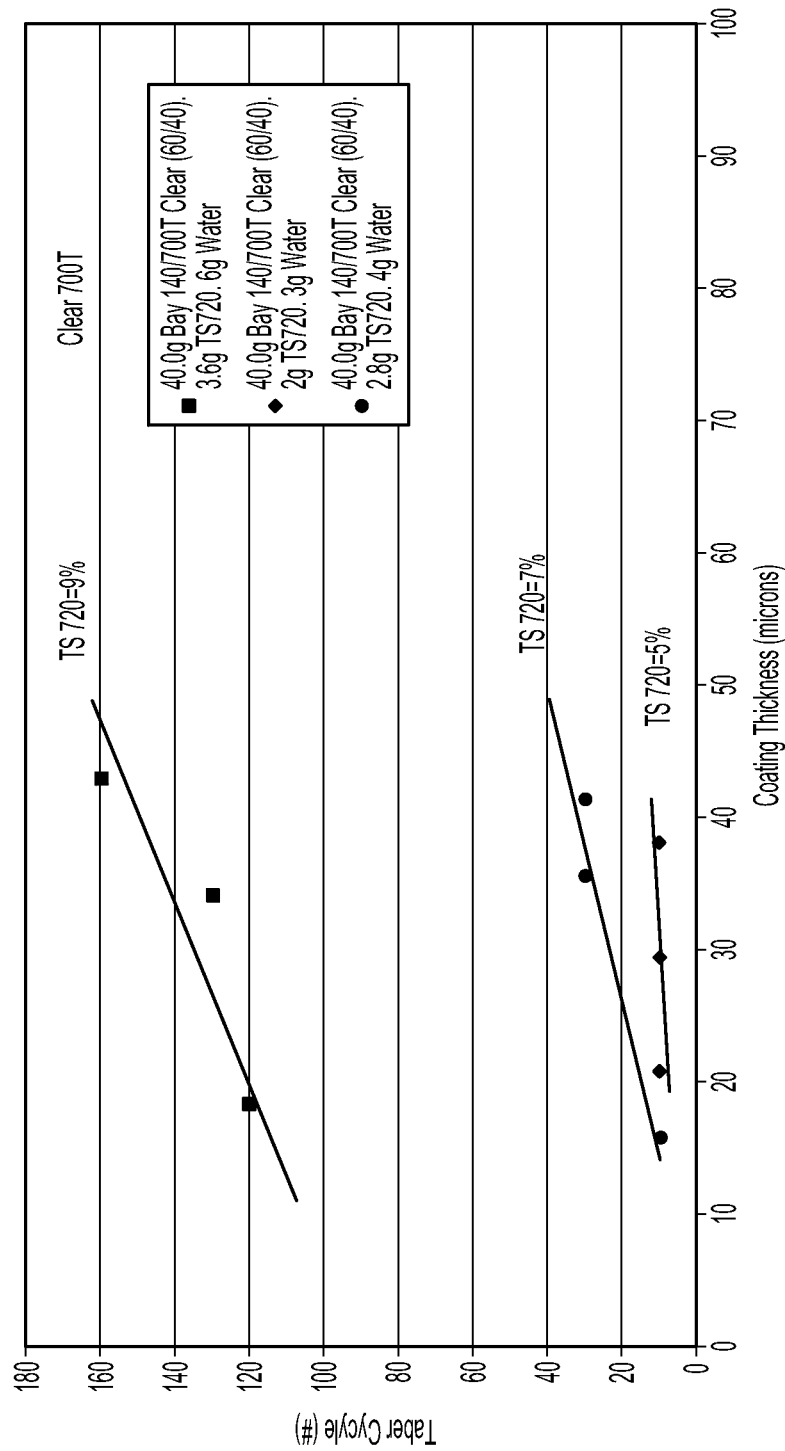
FIG. 18 shows a plot of the amount of abrasion (measured in Taber cycles) required to cause a loss in superhydrophobicity as a function of coating thickness for one-step superhydrophobic coatings on steel plates using BAYHYDROL® 140AQ and clear POLANE® 700T as a binder, and TS720 second particles. Data for 5, 7, and 9% TS720 are included for comparison.
Figure 19:
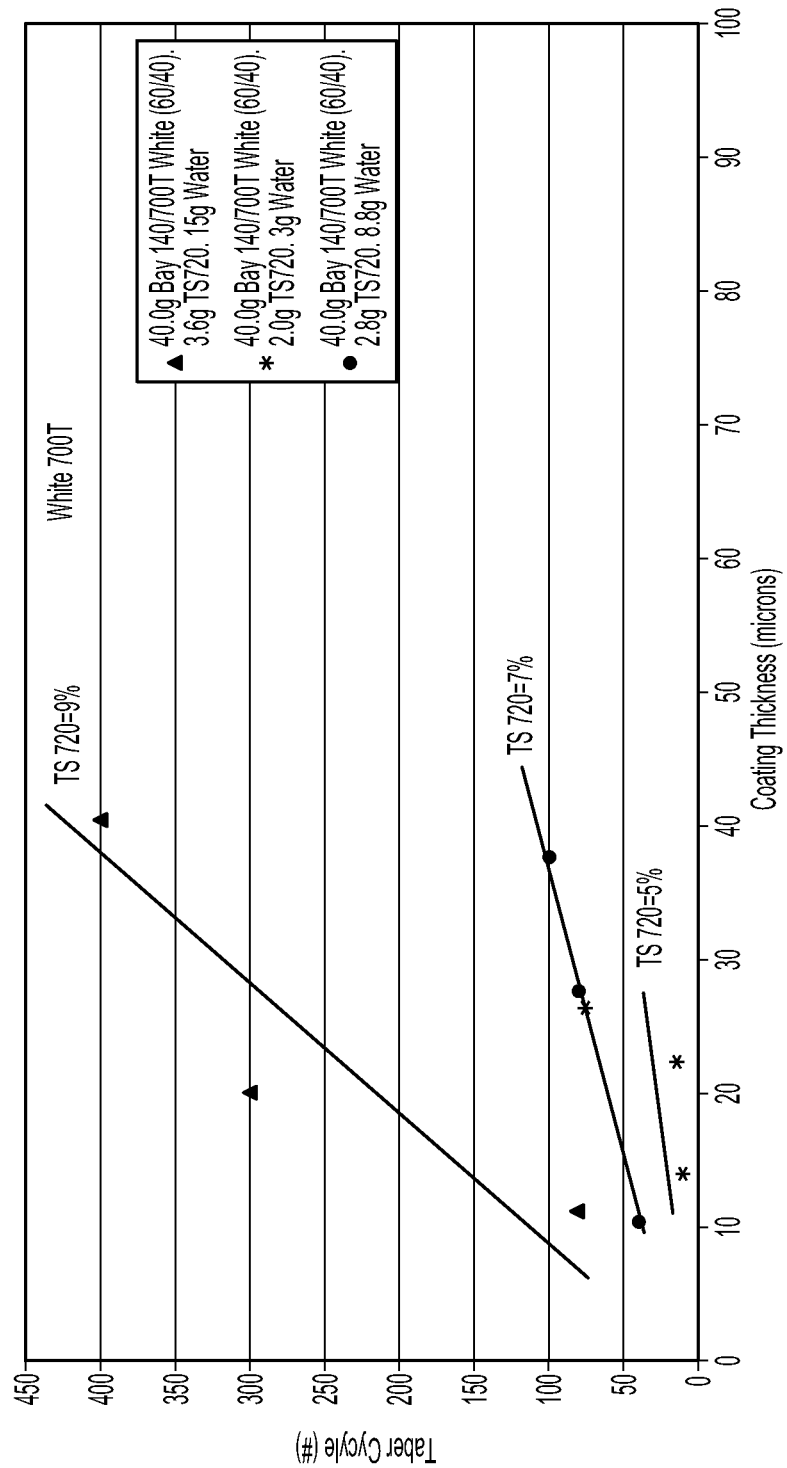
FIG. 19 shows a plot of the amount of abrasion (measured in Taber cycles) required to cause a loss in superhydrophobicity as a function of coating thickness for one-step superhydrophobic coatings on steel plates. The coatings were prepared using BAYHYDROL® 140AQ and with white POLANE® 700T as a binder and TS&@) second particles. Data for 5, 7, and 9% TS720 are included for comparison.
Figure 20:
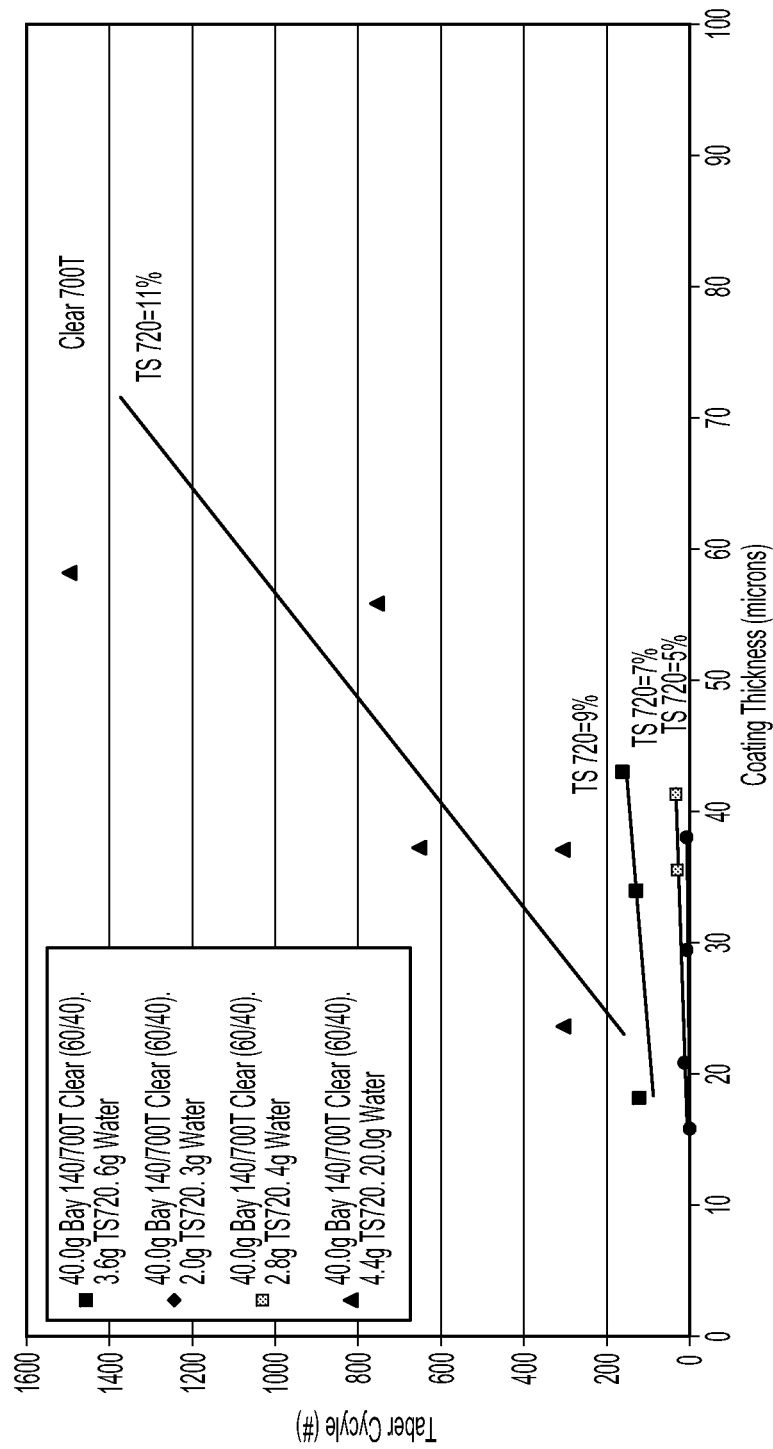
FIG. 20 shows a plot of the amount of abrasion (measured in Taber cycles) required to cause a loss in superhydrophobicity as a function of coating thickness for one-step superhydrophobic coatings on steel plates for one-step superhydrophobic coatings on steel plates. The coatings were prepared using BAYHYDROL® 140AQ and clear POLANE700T as a binder and TS720 second particles. Data for 11% TS 720 are included for comparison.
Figure 21:
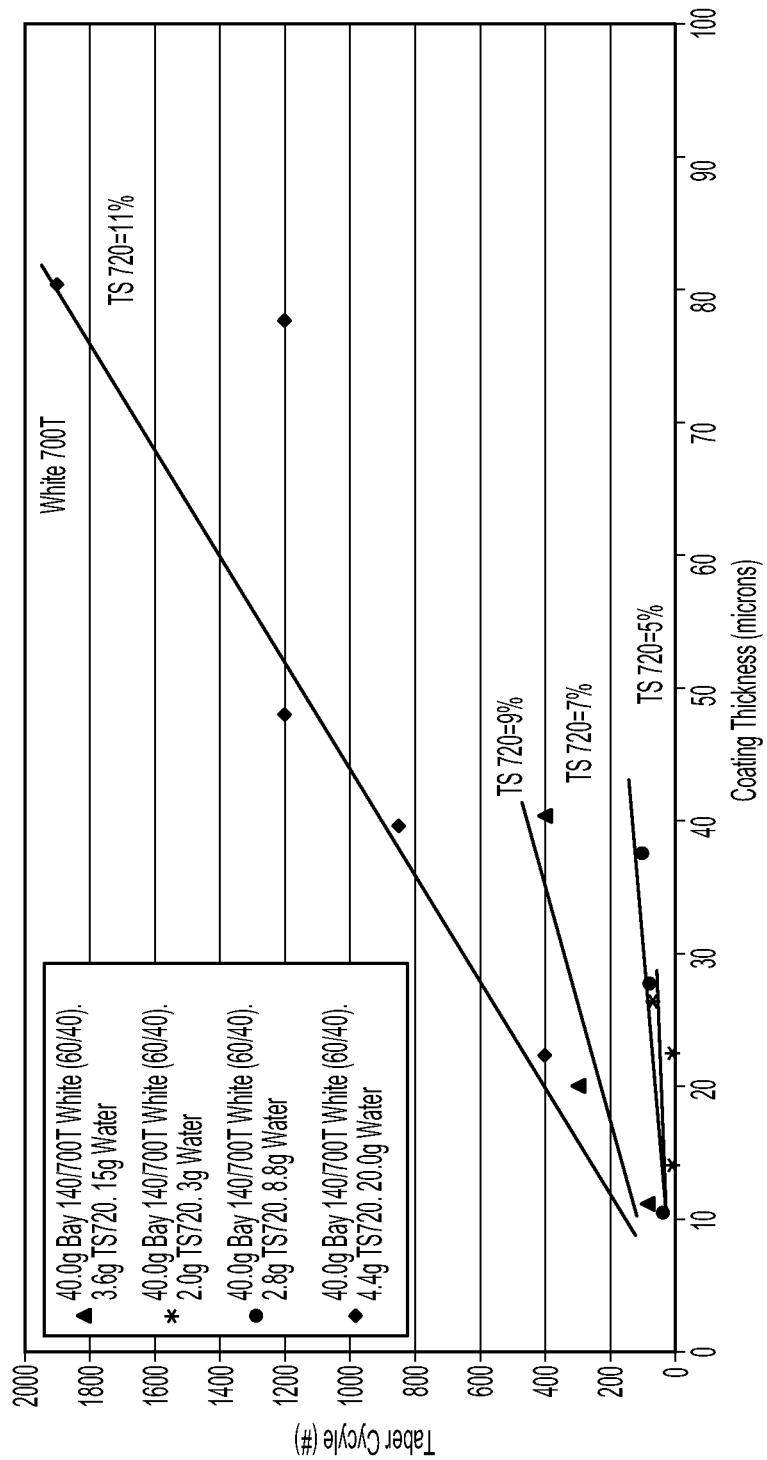
FIG. 21 shows a plot of the amount of abrasion (measured in Taber cycles) required to cause a loss in superhydrophobicity as a function of coating thickness for one-step superhydrophobic coatings on steel plates The coatings were prepared using BAYHYDROL® 140AQ and with white POLANE 700'T as a binder and TS720 second particles. Data for 11% TS720 are included for comparison.
Figure 22:
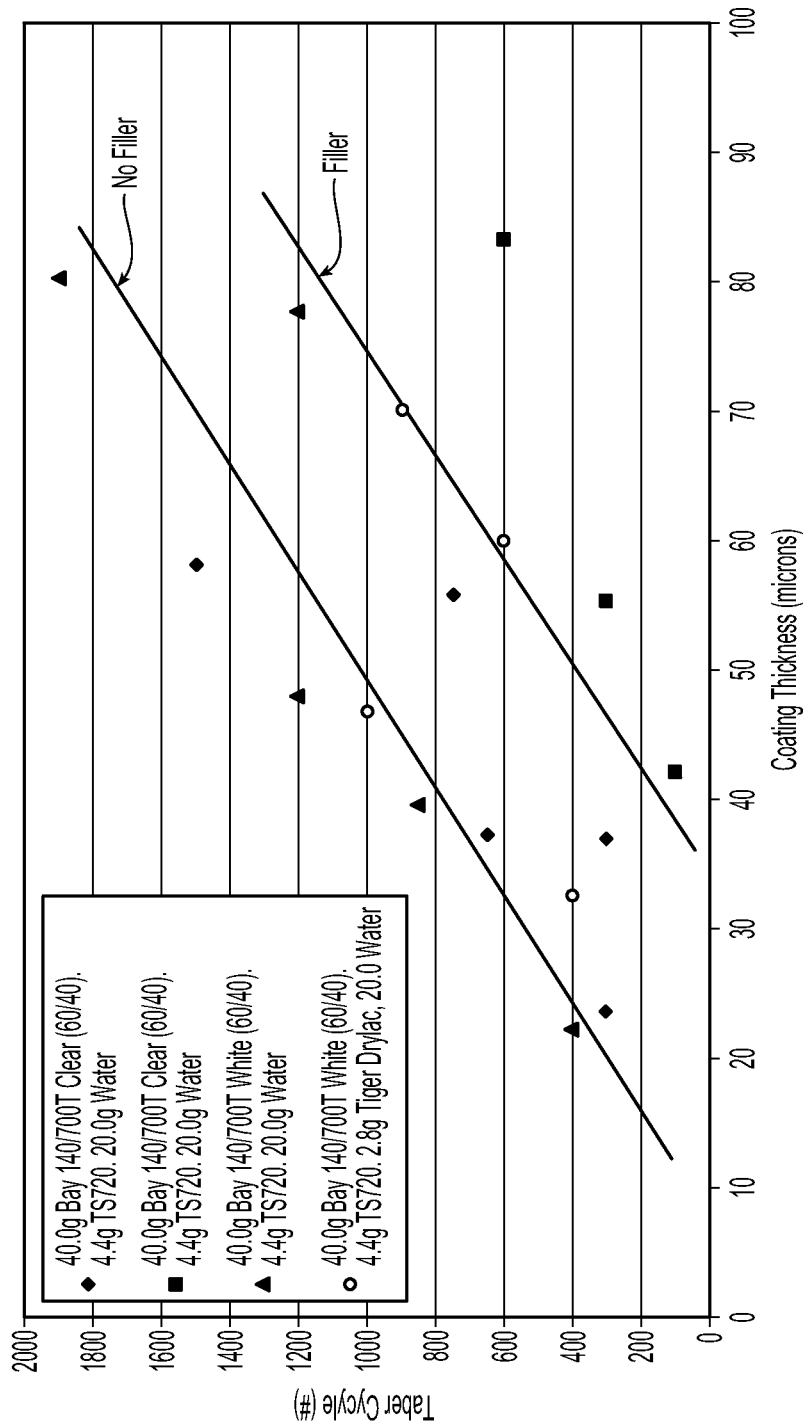
FIG. 22 shows a plot of the amount of abrasion (measured in Taber cycles) required to cause a loss in superhydrophobicity as a function of coating thickness for one-step superhydrophobic coatings on steel plates. The coatings were prepared using BAYHYDROL® 140AQ in combination with either clear or white POLANE® 700T (60:40 v/v) as a binder, with 11% (w/w) of CAB-O-SIL TS720 second particles. A portion of each binder system received Tiger Drylac first particle at 7% w/w to give four samples. Results of Taber abrasion testing with a 250 g load and CS10 wheels are provided in the plot. Although there is scatter in the data, there are two clear trends. First, the plates coated with compositions without first particle have higher abrasion resistance based on the Taber wear data than plates coated with compositions comprising Tiger Drylac first particles. Second, for a fixed coating thickness of about 50 microns, coatings without first particles are about 2.5× more abrasion resistant.
Figure 23:
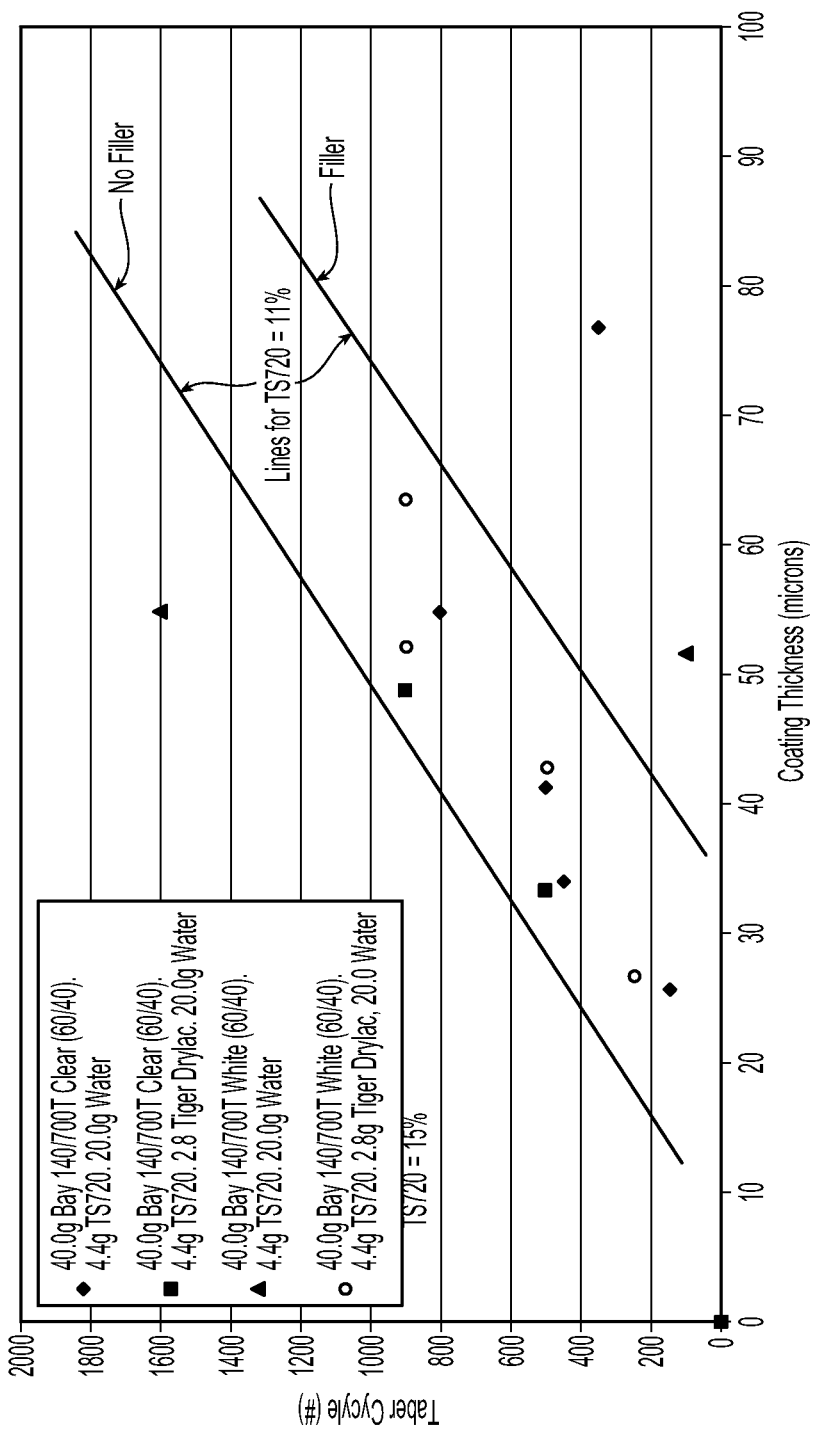
FIG. 23 shows a plot of Taber abrasion resistance (cycles) plotted as a function of coating thickness for one-step superhydrophobic coatings on steel plates prepared as described in Example 22, except that each coating composition contained 15% TS720. Data from the four sample types are plotted, and the trend lines from the data in FIG. 22 are included for references.
Figure 24:
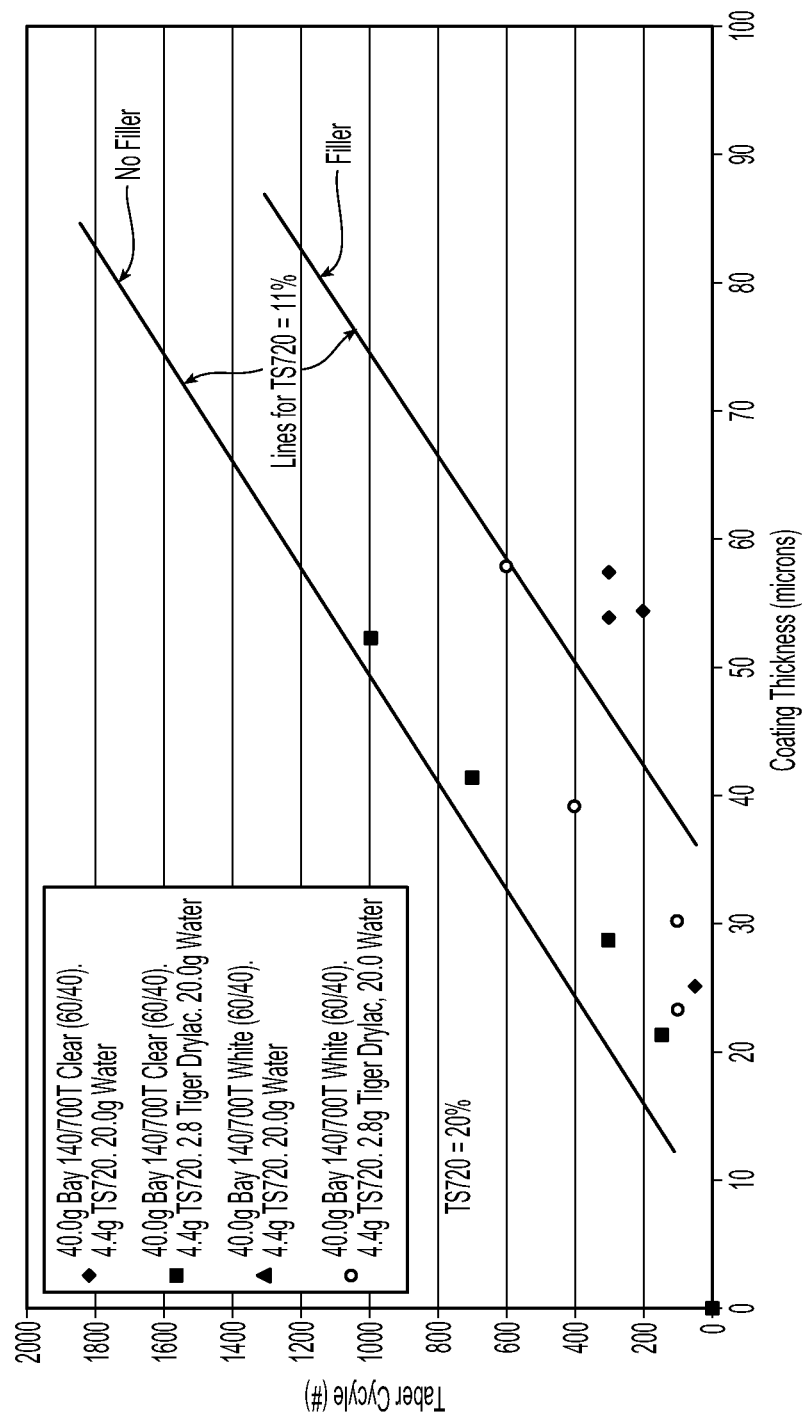
FIG. 24 shows a plot of Taber abrasion resistance (cycles to loss of superhydrophobicity) plotted a function of coating thickness for one-step superhydrophobic coating on steel plates using BAYHYDROL® 140AQ and clear and White 700T with TS720 of 20% (i.e., the coating described in FIGS. 22 and 23 with 20% TS720). Data from all four compositions are compared, and trend lines for the data in Example 22 are included for reference.
Figure 25:
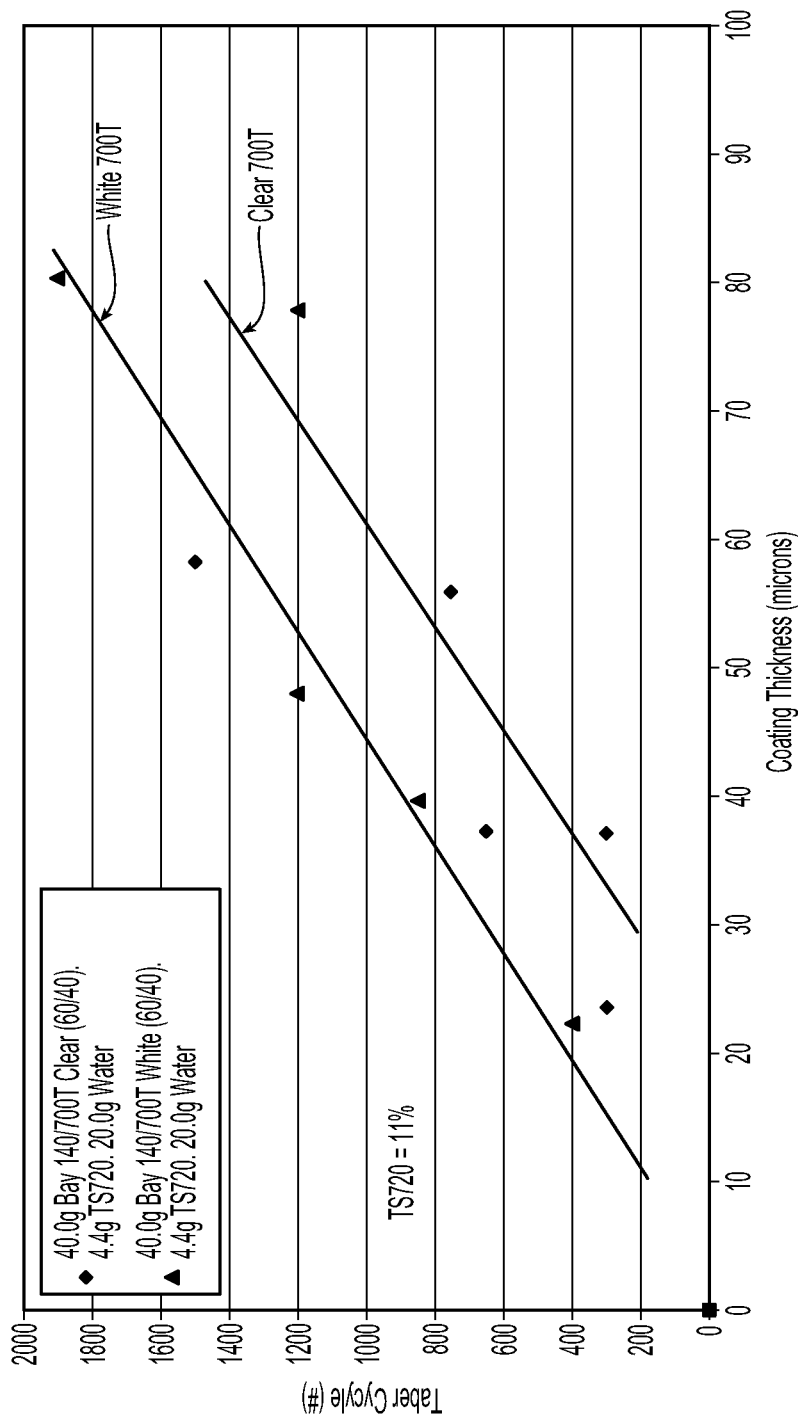
FIG. 25 shows a plot of Taber abrasion resistance (cycles to loss of superhydrophobicity) plotted as a function of coating thickness for one-step superhydrophobic coating on steel plates using BAYHYDROL® 140AQ and with clear and white 700T with TS720 of 11% without first particle. This plot shows that for all being equal, white POLANE 700T provides more Taber durability than clear 700T. For a coating thickness of 50 μm, Taber resistance for the white 700T are about 1.5× that of clear 700T.

Plots for the abrasion resistance vs. coating thickness obtained with binder that employed clear POLANE® 700T (FIG. 18) showed increasing durability with increasing coating thickness and increasing TS720 from 5-9%. The slope of the Taber durability data, however, is low for TS720 at 5% relative to larger slopes observed with higher levels of TS720 content. When CabO-Sil TS720 content increases to 11%, the slope of abrasion resistance vs. coating thickness plots increases sharply (see, e.g., FIG. 20), For white POLANE® 700T with titanium dioxide pigment third particles (white, FIG. 19), the observed change in slope with increasing coating thickness followed a similar trend to that observed with clear POLANE® 700T, but the actual slopes are greater than with clear POLANE® 700T.

Increases in the slope of the abrasion resistance vs. coating thickness plots again suggests that the second particles (e.g., TS720 particles) are distributed uniformly throughout the coating thickness (see e.g., FIG. 2), and the Taber cycles increase as abrasion does not simply remove the majority of second particles when the surface is abraded. Surface abrasion exposes more material with second particles resulting in the continued hydrophobicity and/or oleophobicity of the newly exposed surface. The physical manifestation of this aspect is that the end of superhydrophobicity occurs when coating wears through (e.g., down to bare metal or an underlying coating layer), not when its surface is abraded away. At TS720 concentrations less than 11%, the slopes of the lines representing a correlation between abrasion resistance and coating thickness, suggest the TS720 particles may be concentrated to a greater degree at the outside (the exposed surface of the coating that forms an interface with air). Thus, as the exposed surface wears out, the superhydrophobicity is more quickly lost.

Figure 26:
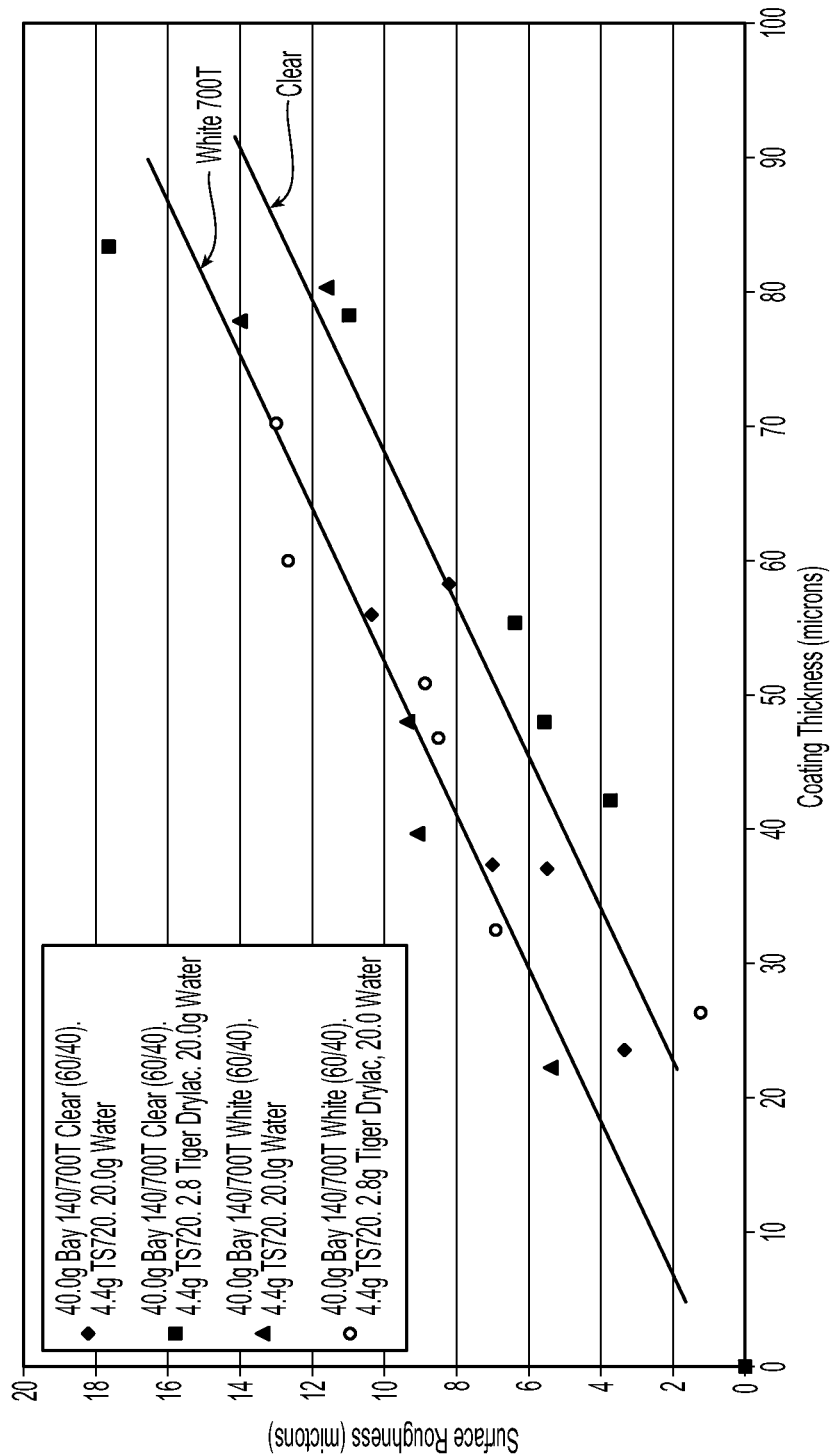
FIG. 26 shows a plot of surface roughness, Ra, as a function of thickness for one-step superhydrophobic coatings on steel plates. The coatings were prepared using BAYHYDROL® 140AQ in combination with clear or white POLANE 700T as a binder, TS720 second particles at 11% (w/w), and Tiger Drylac first particle of 7% as indicated.
Figure 27:
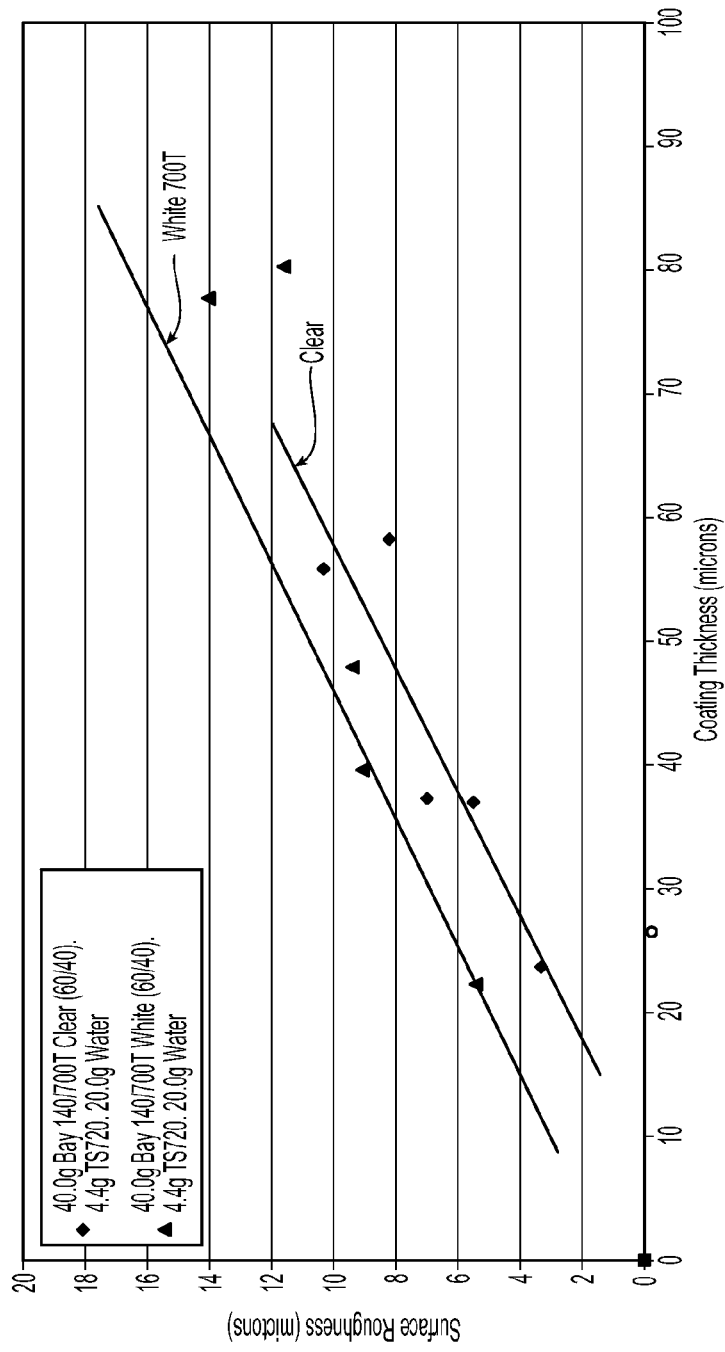
FIG. 27 shows a plot of surface roughness, Ra, as a function of thickness for one-step superhydrophobic coating on steel plates. Coatings were prepared using BAYHYDROL® 140AQ in combination with clear or White POLANE 700T as a binder, and TS720 second particles at 11% w/w. The coating composition contained no first particles.
Figure 28:
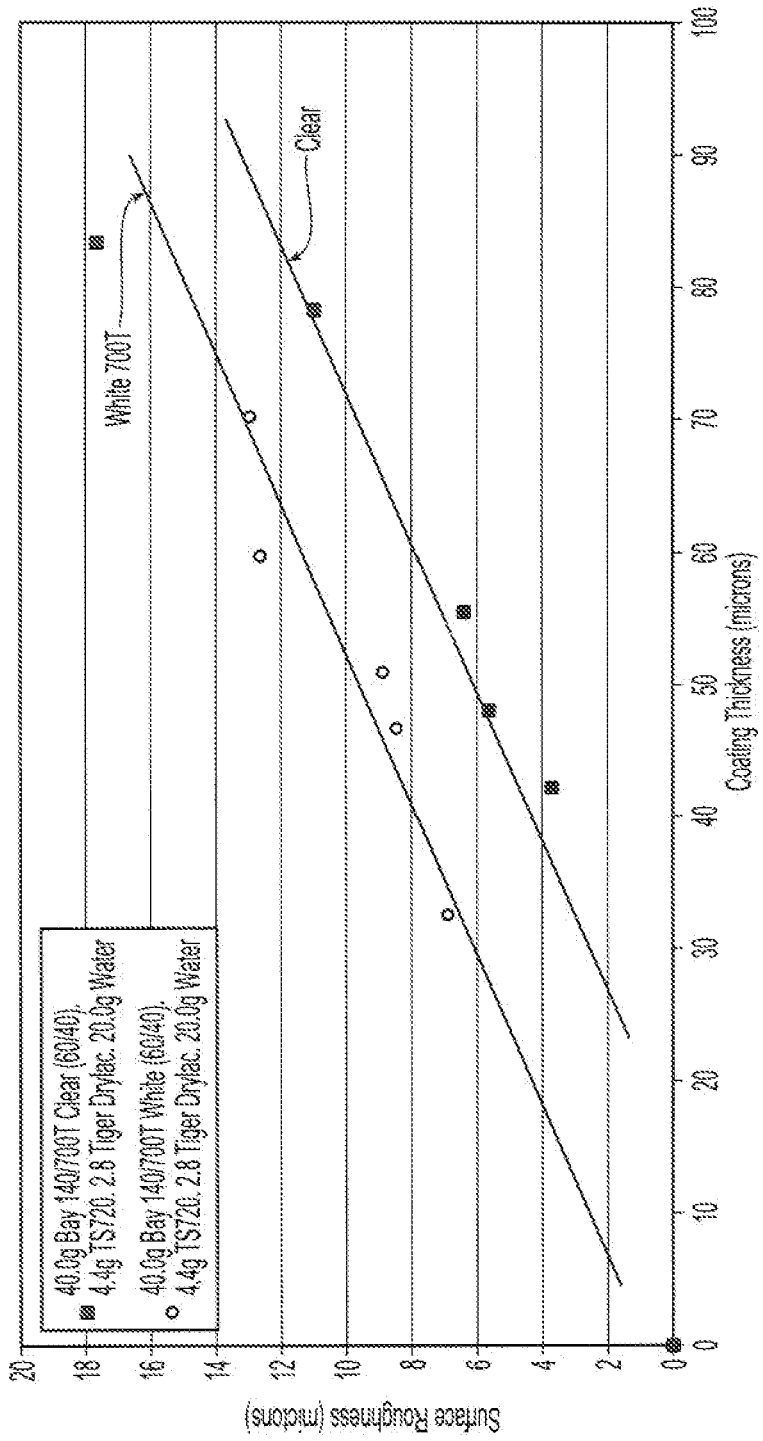
FIG. 28 shows a plot of surface roughness, Ra, as a function of thickness for one-step superhydrophobic coating on steel plates. The coatings were prepared using BAYHYDROL® 140AQ in combination with either clear or white POLANE 700T as a binder, TS720 second particles at 11% (w/w), and Tiger Drylac first particle at 7% w/w.
Figure 29:
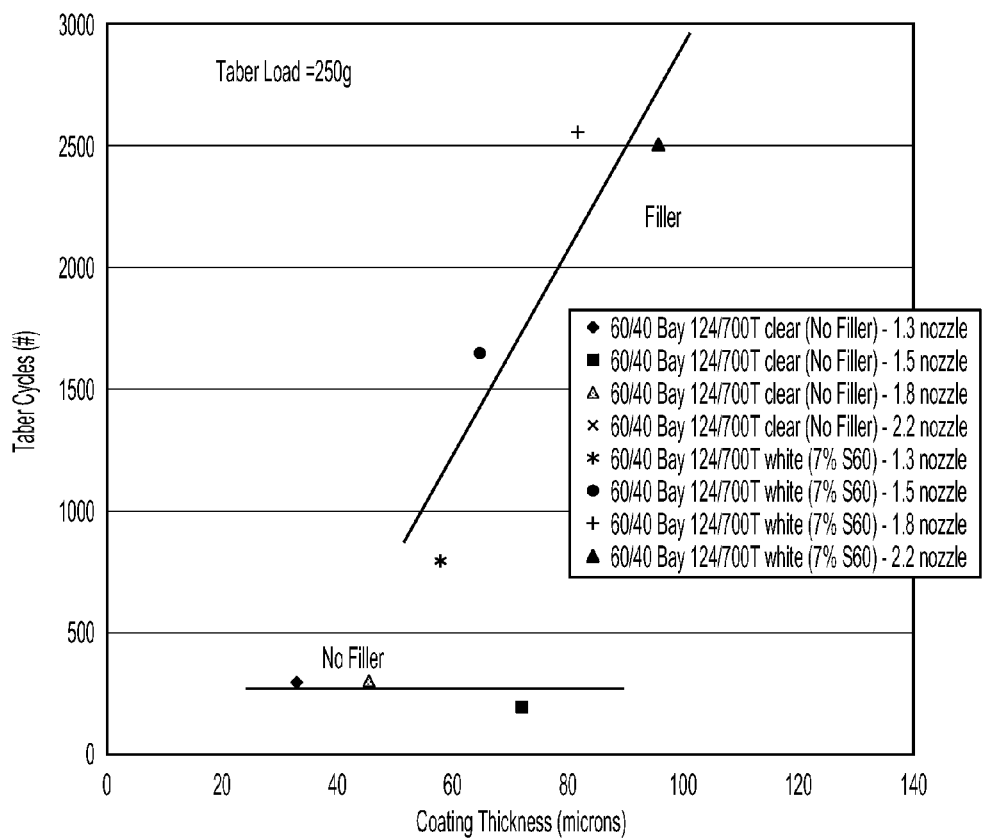
FIG. 29 shows a plot comparing the abrasion resistance (measured as Taber cycles to loss of superhydrophobicity) plotted against coating thickness. Coatings were prepared with clear POLANE 700T and second particles of M5T at 11%, either with or without 7% of S60 first particles. Taber measurements were conducted with a 250-g load and CS10 wheels.
Figure 30:
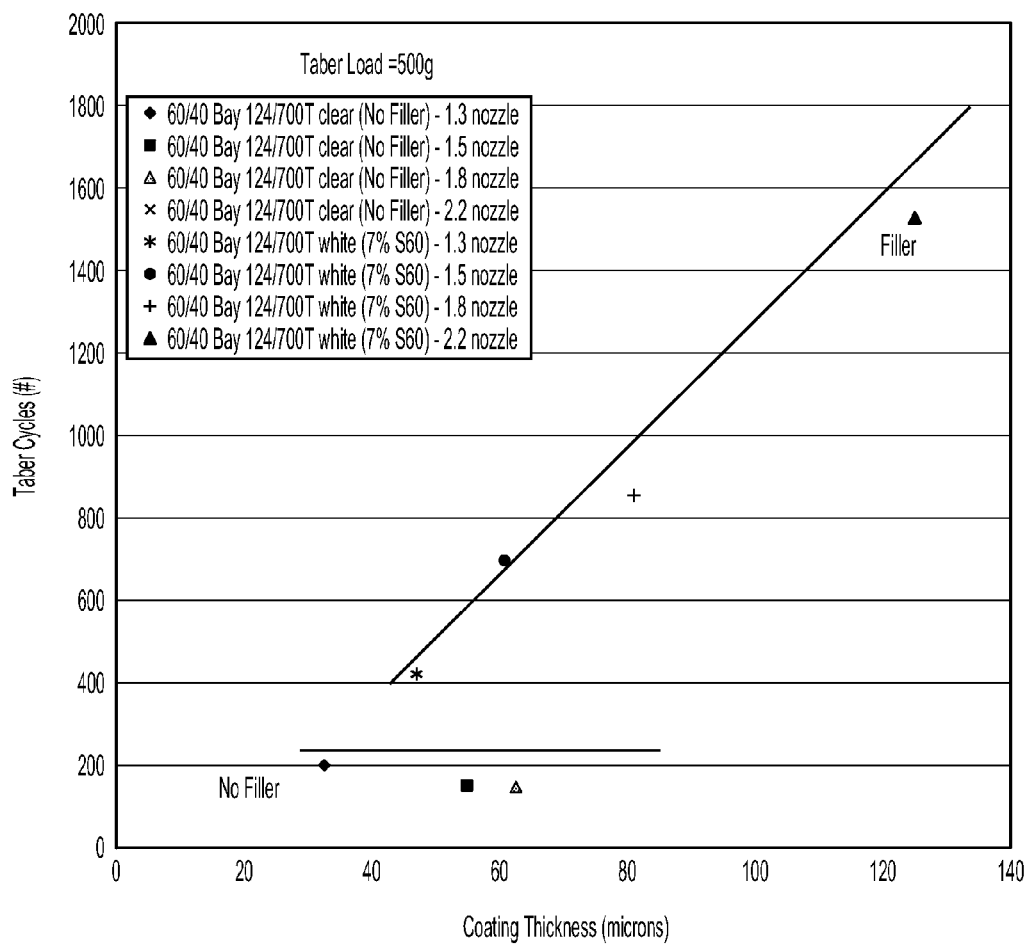
FIG. 30 shows a plot comparing the abrasion resistance (measured as Taber cycles to loss of superhydrophobicity) plotted against coating thickness. Coatings were prepared with clear POLANE 700T and second particles of M5T at 11%, either with or without 7% of S60 first particles. Taber measurements were conducted with a 500-g load and CS10 wheels.
Figure 31:
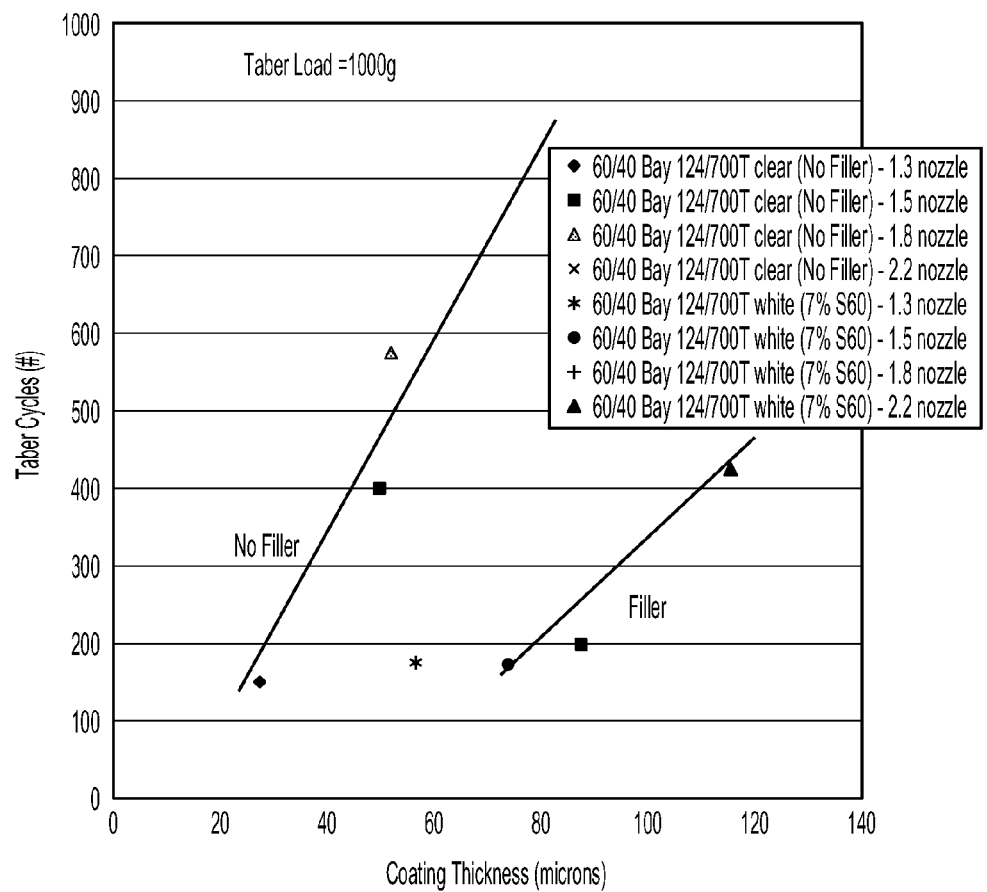
FIG. 31 shows a plot comparing the abrasion resistance (measured as Taber cycles to loss of superhydrophobicity) plotted against coating thickness. Coatings were prepared with clear POLANE 700T and second particles of M5T at 11%, either with or without 7% of S60 first particles. Taber measurements were conducted with a 1,000-g load and CS10 wheels.

Surface roughness (Tables 9 and 10) for the samples in this example, suggest that TS720 content of about 11% with white POLANE® 700T provides highly durable SH and/or OP coatings that display thickness dependent abrasion resistance. Where smoother surfaces finishes are desired, clear POLANE® 700T can be employed to achieve highly durable SH and/or OP coatings that display thickness dependent abrasion resistance Surface Roughness Data The surface roughness data for all four coatings with a fixed TS720 content of 11% are shown in FIGS. 26-28. FIG. 26 shows that white POLANE® 700T results in more surface roughness with or without first particle than clear POLANE® 700T. FIG. 27 shows the difference between coating formed with clear and white POLANE® compositions without first particle additions. For a coating thickness of 50 μm, the surface roughness of the coatings with white 700T is ~1.3× that of clear 700T.

Data in FIG. 28 compared the surface roughness with first particle between white 700T and clear 700T. Again, for a coating thickness of 50 μm, the white 700T results in a factor of ~1.6×. Thus, if surface roughness is critical, the 60:40 BAYHYDROL® 140AQ should be blended with clear 700T.

Example 8

Top Coating of One-Step Coatings Made with Bayhydrol®140AQ to Achieve Enhanced Oleophobic Performance Aluminum plates, 4×4-inch, were base-coated with a composition prepared by mixing:
1. 60:40 mixture of BAYHYDROL® 140AQ: clear POLANE® 700T by volume as the binder;
2. 7% (by weight of binder) Tiger Drylac clear matte first particle;
3. 11% (by weight) TS720; and
4. 50% (by weight) water.
After drying or approximately 30 min at room temperature in ambient humidity, the base coat was top coated with either top coat composition No. 1 or No. 2.
Top Coat No. 1: Top coat composition No. 1 consisted of 1% M5 (untreated fumed silica), (0.5% $SiCl_4$, and 0.5% (Gelest 8174) (tridecafluoro-1,1,2,2-tetrahyrctyl-trichlorsilane). The top coated plate was cured for 1 h at 200° F. The top coated plate was SH and OP. It lasted 5 min under a shower and demonstrated an abrasion resistance of 600 Taber cycles at a 250 g load with CS10 wheels
Top Coat No. 2: Top coat composition No. 2 employed the same component composition as top coat No. 1, with the exceptions that the M5 silica content was increased from 1 to 2% and the silane content was increased from 0.5 to 1%. The plate top coated with composition No. 2 was cured for 1 h at 200° F. This plate lasted 5-10 min under a shower and demonstrated an abrasion resistance of 900 Taber cycles at a 250 g load with CS10 wheels.
Shower Test: A measure of the durability of superhydrophobicity can be made by measuring time exposure to a constant water shower which is required to wet a specimen. This equipment consists of a shower spray head positioned 6 feet above the sample through which a full flow of water is delivered from normal facility water supply.

Example 9

A One-Step Coating Composition Yielding Superhydrophobic and Oleophobic Coatings A coating composition comprising:
BAYHYDROL® 124—24.0 grams
POLANE® 700T (white)—16.0 grams
M5T=9.0 grams (Cab-o-Sil M5 silica treated with (3,3,4,4,5,5,6,6,6-Nonafluorohexyl)trichlorosilane (SIN 6597.6) as described below)
Corvel Black—2.8 grams and
$H_2O$—20.0 grams
was prepared by blending the components as follows:
BAYHYDROL® 124 (24.0 grams) and POLANE® 700T (16.0 grams) were blended together for 20 minutes. The addition of M5T (9.0 grams, M5 silica treated with (3,3,4,4,5,5,6,6,6-Nonafluorohexyl)trichlorosilane (SIN 6597.6)) to the solution was followed by mixing in a ball mill for 30 minutes. Addition of Corvel Black (2.8 grams) and $H_2O$ (20.0 grams) to the solution was followed by an additional 30 minutes of mixing in a ball mill.
The coating was applied using a Central Pneumatic spray gun with the nozzle size of 0.020-0.025 inches. A coating thickness of 1.2-1.4 mils was applied to a 4×4 inch Al-plate. The plate was cured at room temperature for 30 minutes followed by curing at 200F for 1-2 hours. After curing, the plates were tested for superhydrophobicity, oleophobicity, Taber abrasion resistance, and shower resistance to loss of superhydrophobicity. The results of the tests show the coating displays superhydrophobicity (contact angle=167.33, after Taber abrasion testing=(155.23). The coatings also display oleophobic/superoleophobic behavior (contact angle=153.67). The coating lost its superhydrophobicity after 500 Taber abrasion cycles with a 250 gram load. Superhydrophobicity is lost after 55-60 minutes in shower testing (described above); however, superhydrophobicity returns after drying.

Example 10

Volatile Organic Compounds (VOCs) Content of Coatings with Bayhydrol® 140AQ

Of the binder components employed in this disclosure, BAYHYDROL® 140AQ employed more volatile organic solvent (toluene) than any other component. As it is desirable for environmental reasons to reduce the VOC contents of products, including those employed in making SH and OP coatings, an analysis of the expected VOC content of exemplary coating composition components is set forth for reference. The calculated VOC content, based on ingredients for various coatings/coating components, is set forth in Table 11.

TABLE 11

| Volatile Organic Compound Values for Select Coatings (Minus Water and Exempt Solvents) | |
|---|---|
| Coating Component/Compositions | Approximate VOC Content (pounds per gallon) |
| Composition 1: 60:40 BAYHYDROL ® 140AQ:clear/white POLANE ® 700T, 9-20% TS720 second particles, 0-7% first particle Corvel Black or Tiger Drylac) | 0.3 |
| Composition 2: 0.5-1% Fluorinated silanizing agent, 0.5% SiCl4, 1-2% M5, balance Acetone | 0 |
| Composition 3: POLANE ® B component POLANE ® A components | 4.7 2.2 |
| Composition 4: 5-1% Fluorinated silane, 0.5% SiCl4, 1-3% M5, balance Hexane | 5.4 |

It can be seen from Table 11 that Composition 1, which is a BAYHYDROL® 140AQ-based coating, has approximately 0.3 lb/gallon of VOCs. That coating delivers SH behavior with a very significant abrasion resistance based on Taber Abrader durability data with limited VOCs released in the coating process. The application of a top coat top coat of Composition 2 to the coating formed from Composition 1 adds no additional VOCs, but the coating now also delivers the OP behavior in addition to hydrophobic behavior. In contrast, coatings formed using solvent based POLANE® A and B (Composition 3), with a top coat (Composition 4) delivers excellent abrasion durability and wetting resistance but with a significant release of VOC compounds.

Example 11

A One-Step Coating with Different Levels of Treated Cab-O-Sil M5 Particles Treated with a Silanizing Agent M5 silica particles treated with tridecafluorotetrahydrooctyltrichlorosilane were incorporated into binder a binder composition and applied using different spraying techniques. The base composition consisted of:

BAYHYDROL® 124 (Bayer)=24.0 g
POLANE® 700T (with white pigment, Sherwin Williams)=16.0 g
(In some cases, as indicated, clear POLANE® 700T of the same amount was used)
M5T (fumed silica particles treated with SIT 8174.0 (Gelest, tridecafluoro-tetrahydrooctyltrichlorosilane)=4.4 g
Water=18.20 g The treated particles were added to the BAYHYDROL® 124/700T mix to make a paste. The paste was diluted with water to achieve the consistency for spraying or painting. The composition was applied to 4×4-in. aluminum plates by using the following procedures: (All plates were tested for surface roughness and resistance to SH and/or OP loss using Taber abrasion. The loss of oleophobicity with Taber abrasion was also measured for each sample

Example 11

Part A

BAYHYDROL® 124/POLANE® 700T (White)—40.0 g
M5T (8174 Tridecafluorotetrahydrooctyltrichlorosilane)—4.4 g (11% w/w to the binder)
H2O—18.0-20.0 g The composition was applied using an air spray gun with 1.4 mm nozzle and the surface of the plates to be coated placed vertically. Visual inspection of plates after curing (drying at 200° F.) showed sagging of the coating due to water running down the plate during application. Some of the areas of the coating were much lighter visually then other areas that seemed to have proper coating coverage.

The plates were found to be superhydrophobic and superoleophobic. Roughness measures yielded an Ra values of 2.307, 1.392, 1.824, 1.842, and 1.679, and Rz values of 16.0, 11.0, 13.7, 12.7, and 11.7. Taber abrasion measurements using a 250 g load (CS10 wheels) gave values of 200, with one sticky spot due to a thick coating area. Taber abrasion resistance for loss of superoleophobicity yielded a value of 3.5. Shower resistance to loss of superhydrophobicity greater than 1 hours with some wetting at 2 hours. Exposure to rain showed superhydrophobicity after one hour of rain exposure outdoors.

Example 11

Part B

BAYHYDROL® 124/POLANE® 700T (White)—40.0 g
M5T (8174 Tridecafluorotetrahydrooctyltrichlorosilane)—4.4 g (11% w/w to the Binder)
H2O—18.0-20.0 g
The composition was applied using an air spray gun and the surface of the plates to be coated placed horizontally. Visual inspection of plates after curing (drying at 200° F.) showed good coverage, smoothness, and substantially uniform coatings.

The plates were found to be superhydrophobic and superoleophobic. Roughness measures yielded an Ra values of 2.377, 2.386, 2.657, and 1.679, and Rz values of 16.1, 17.0, 18.5, 12.7, and 11.7. Taber abrasion measurements using a 250 g load (CS10 wheels) gave values of 400-500 abrasion cycles for superhydrophobicity. Taber abrasion resistance for loss of superoleophobicity yielded a value of 15 abrasion cycles. Shower resistance to loss of superhydrophobicity greater than 2 hours. Exposure to rain showed superhydrophobicity after one hour of rain exposure outdoors.

Example 11

Part C

BAYHYDROL® 124/POLANE® 700T (White)—40.0 g
M5T (8174 Tridecafluorotetrahydrooctyltrichlorosilane)—4.4 g (11% w/w to the Binder)
H2O—18.0-20.0 g The composition was applied using an air spray gun with small nozzle (600 micron opening) and the surface of the plates to be coated placed horizontally Visual inspection of plates after curing (drying at 200° F.) showed good coverage and smoothness. The small nozzle is less effective at spraying a good uniform coating when simultaneously spraying multiple plates with a large area to be coated.

The plates were found to be superhydrophobic and superoleophobic. Roughness measures yielded Ra values of 2.903, 3.581, and 2.920 and Rz values of 16.5, 19.7, and 14.6. Taber abrasion measurements using a 250 g load (CS10 wheels) gave values of 200 abrasion cycles, worn to bare metal. Taber abrasion resistance for loss of superoleophobicity yielded a value of 10. Exposure to rain showed superhydrophobicity after one hour of rain exposure outdoors.

Example 11

Part D

BAYHYDROL® 124/POLANE® 700T (Clear)—40.0 g
M5T (8174 Tridecafluorotetrahydrooctyltrichlorosilane)—4.4 g (11% w/w to the Binder)
H2O—18.0-20.0 g
Procedure: Small Gun with Plates Horizontal. Visual inspection of plates after curing showed good coverage, very smooth, and high uniformity.

The composition was applied using an air spray gun with small nozzle (0.6 mm or 600 micron opening) and the surface of the plates to be coated placed horizontally Visual inspection of plates after curing (drying at 200° F.) showed good coverage, a very smooth finish, and high uniformity over the surface.

The plates were found to be superhydrophobic and superoleophobic. Roughness measures yielded Ra values 0.847, 0.840, and 1.143 microns, and Rz values of 6.46, 6.50, and 9.17 microns. Taber abrasion measurements using a 250 g load (CS10 wheels) gave values of 300 abrasion cycles. Taber abrasion resistance for loss of superoleophobicity yielded a value of 5 abrasion cycles. Exposure to rain showed superhydrophobicity after one hour of rain exposure outdoors.

Example 11

Part E

BAYHYDROL® 124/POLANE® 700T (Clear)—60.0 g
M5T (8174 Tridecafluorotetrahydrooctyltrichlorosilane)—5.3 g (8.8% w/w to the binder)
H2O—10.0 g The composition was applied using an air spray gun with small nozzle (0.6 mm or 600 micron opening) and the surface of the plates to be coated placed horizontally Visual inspection of plates after curing (drying at 200° F.) showed good coverage, a very smooth finish, and high uniformity over the surface.

The plates were found to be superhydrophobic and superoleophobic. Roughness measures yielded Ra values 1.310, 0.997 microns, and 1.266, and Rz values of 10.2, 7.34, and 9.79 microns. Taber abrasion measurements using a 250 g load (CS10 wheels) gave values of 400 abrasion cycles. Taber abrasion resistance for loss of superoleophobicity yielded a value of 5 abrasion cycles. Exposure to rain showed superhydrophobicity after one hour of rain exposure outdoors.

Example 11

Part F

BAYHYDROL® 124/POLANE® 700T (Clear)—60.0 g
M5T (8174 Tridecafluorotetrahydrooctyltrichlorosilane)—4.4 g (7.3% w/w to the Urethane)
H2O—10.0 g The composition was applied using an air spray gun with small nozzle (0.6 mm or 600 micron opening) and the surface of the plates to be coated placed horizontally Visual inspection of plates after curing (drying at 200° F.) showed good coverage, a very smooth finish, and high uniformity over the surface.

The plates were found to be superhydrophobic and superoleophobic. Roughness measures yielded Ra values 0.777, 0.643, and 0.607 microns, and Rz values of 8.44, 6.53, and 5.50 micron. Taber abrasion measurements using a 250 g load (CS10 wheels) gave values of 300 abrasion cycles. Taber abrasion resistance for loss of superoleophobicity yielded a value of 5 abrasion cycles. Exposure to rain showed superhydrophobicity after one hour of rain exposure outdoors.

TABLE 12

Summary of Data for Example 11

| Coating Composition | Spray Gun | Surface Roughness Ra (micron) | Taber Cycles for End of SH (#) | Taber Cycles for End of SO (#) | Shower Time (h) |
|---|---|---|---|---|---|
| 124/700T(W) = 40 g<br>M5T (8174) = 4.4 g<br>Water = 18-20 g | Large Gun Plate Vertical | 1.81 | 200 | 4 | 2 |
| 124/700T(W) = 40 g<br>M5T (8174) = 4.4 g<br>Water = 18-20 g | Large Gun Plate Horizontal | 2.47 | 450 | 15 | 2 |
| 124/700T(W) = 40 g<br>M5T (8174) = 4.4 g<br>Water = 18-20 g | Small Gun Plate Horizontal | 3.13 | 200 | 10 | |
| 124/700T(C) = 40 g<br>M5T (8174) = 4.4 g<br>Water = 18-20 g | Small Gun Plate Horizontal | 0.943 | 300 | 5 | |

TABLE 12-continued

Summary of Data for Example 11

| Coating Composition | Spray Gun | Surface Roughness Ra (micron) | Taber Cycles for End of SH (#) | Taber Cycles for End of SO (#) | Shower Time (h) |
|---|---|---|---|---|---|
| 124/700T(C) = 40 g<br>M5T (8174) = 3.53 g<br>Water = 6.67 g | Small Gun Plate Horizontal | 1.191 | 400 | 5 | |
| 124/700T(C) = 40 g<br>M5T (8174) = 2.93 g<br>Water = 6.67 g | Small Gun Plate Horizontal | 0.675 | 300 | 5 | |

Example 12

A One-Step Coatings with Glass Bead First Particle Addition

To the compositions of Example 11 was added 7% (by weight of the binder) of glass bubbles (S60, from 3M Company, see Table 1). Coatings without first particles added were prepared with clear POLANE 700T and those with S60 were Prepared with white POLANE 700T. The coatings were applied on 4×4 inch steel plates with gun using four different nozzle sizes to create different coating thicknesses. All of the plates were cured at 200° F. for 1 hour (h) after which coating thickness was measured and Taber abrasion wear resistance to the point where they lost superhydrophobicity assessed. The Taber testing was conducted at three different loads (250, 500, and 1000 g). All of the Taber data and coating thickness (in mils and microns) are summarized in Table 13.

TABLE 13

Taber Data for Example 11 for Various Thicknesses at Loads of 250, 500, and 1000 g

| System | Plate # | Thickness (mil) | Tabers | Taber Load (g) | microns |
|---|---|---|---|---|---|
| 60/40 Bay 124/700T clear (No Filler) - 1.3 nozzle | 1 | 1.30 | 300 | 250 | 33.02 |
| | 2 | 1.28 | 200 | 500 | 32.512 |
| | 3 | 1.08 | 150 | 1000 | 27.432 |
| 60/40 Bay 124/700T white (7% S60) - 1.3 nozzle | 4 | 2.28 | 800 | 250 | 57.912 |
| | 5 | 1.84 | 425 | 500 | 46.736 |
| | 6 | 2.22 | 175 | 1000 | 56.388 |
| 60/40 Bay 124/700T clear (No Filler) - 1.5 nozzle | 7 | 2.84 | 200 | 250 | 72.136 |
| | 8 | 2.16 | 150 | 500 | 54.864 |
| | 9 | 1.96 | 400 | 1000 | 49.784 |
| 60/40 Bay 124/700T white (7% S60) - 1.5 nozzle | 10 | 2.54 | 1650 | 250 | 64.516 |
| | 11 | 2.38 | 700 | 500 | 60.452 |
| | 12 | 2.90 | 175 | 1000 | 73.66 |
| 60/40 Bay 124/700T clear (No Filler) - 1.8 nozzle | 13 | 1.78 | 300 | 250 | 45.212 |
| | 14 | 2.46 | 150 | 500 | 62.484 |
| | 15 | 2.04 | 575 | 1000 | 51.816 |
| 60/40 Bay 124/700T white (7% S60) - 1.8 nozzle | 16 | 3.22 | 2550 | 250 | 81.788 |
| | 17 | 3.18 | 850 | 500 | 80.772 |
| | 18 | 3.44 | 200 | 1000 | 87.376 |
| 60/40 Bay 124/700T clear (No Filler) - 2.2 nozzle | 19 | 2.24 | 350 | 250 | 56.896 |
| | 20 | 2.64 | 350 | 500 | 67.056 |
| | 21 | 3.06 | 800 | 1000 | 77.724 |
| 60/40 Bay 124/700T white (7% S60) - 2.2 nozzle | 22 | 3.78 | 2500 | 250 | 96.012 |
| | 23 | 4.92 | 1525 | 500 | 124.968 |
| | 24 | 4.54 | 425 | 1000 | 115.316 |

Figure 32:
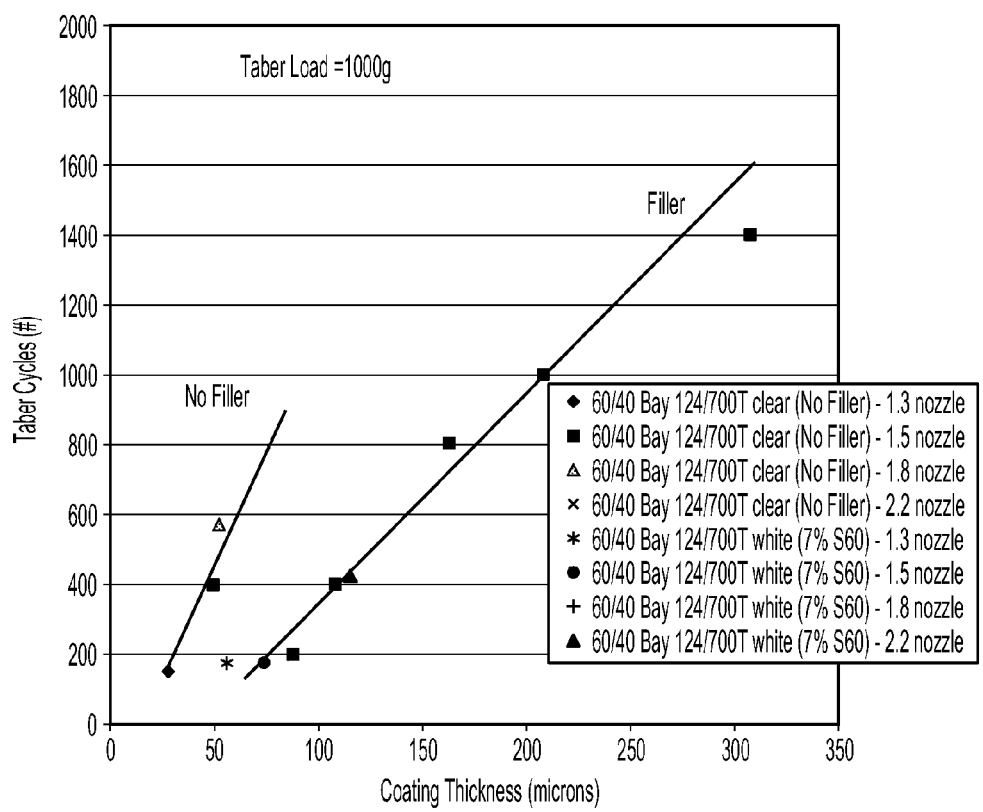
FIG. 32 shows a plot comparing the abrasion resistance (measured as Taber cycles to loss of superhydrophobicity) plotted against coating thickness. Coatings were prepared with clear POLANE 700T, second particles of M5T at 11%, either with or without 7% of S60 first particles and a coating thickness up to 350 microns. Taber measurements were conducted with a 1,000-g load and CS10 wheels.

Four additional plates were coated to create coatings thicker than those appearing in Table 13. The coatings on the additional plates range in thickness from 4 to 12 mils. Data for this study are presented in Table 13 (continued) and included in FIG. 32.

TABLE 13 (continued)

Taber Data for Very Thick Coatings using 1000-g Load

| System | Palate # | Thickness | Tabers | Taber Load (g) | Microns |
|---|---|---|---|---|---|
| 60/40 BAYHYDROL 124/White POLANE 700T (7% S60) small gun | 25 | 12.1 | 1400 | 1000 | 307.34 |
| | 26 | 8.18 | 1000 | 1000 | 207.772 |
| | 27 | 6.40 | 800 | 1000 | 162.56 |
| | 28 | 4.24 | 400 | 1000 | 107.669 |

Data from Table 13 are plotted in FIGS. 29-32, Those plots show Taber abrasion resistance data for each applied load (250, 500, and 1000 g).

The invention claimed is:

1. A coating composition for the application of superhydrophobic and oleophobic coatings on surfaces comprising:
   a polyurethane dispersion (PUD) comprising one or more of a polyester urethane, a polyacrylic urethane and/or a polycarbonate urethane; and
   about 5 to about 30% by weight of second particles comprising one or more siloxanes, and/or one or more alkyl, haloalkyl, fluoroalkyl, or perfluoroalkyl containing moieties;
   said composition optionally comprising up to about 26% by weight of third particles;
   wherein said coating composition comprises less than 0.3 pounds per gallon of volatile non-exempt organic compounds; and
   wherein the superhydrophobic and oleophobic coating resulting from the application of said composition to a surface retains its superhydrophobicity after 150-1,400 Taber abrasion cycles at a 1000 g load for a coating thickness range of 25-300 microns, and/or 100-2,500 Taber abrasion cycles at a 250 g load, using a CS10 wheel, as judged by the inability of more than 50% of the water droplets applied to the area of the coating subjected to said abrasion cycles to remain on the surface when the planar surface is inclined at 3 degrees.

2. The composition of claim 1, wherein said composition does not comprise first particles and the coating resulting from the application of said composition to a planar surface retains its superhydrophobicity after 150-800 Taber abrasion cycles at a 1,000 g load, for a thickness range of 25-75 microns, and/or 200-1,400 Taber abrasion cycles at a 250 g load for a thickness range of 25-75 microns, on a planar surface using a CS10 wheel, as judged by the inability of more than 50% of the water droplets applied to the area of the coating subjected to said abrasion cycles to remain on the surface when the planar surface is inclined at an angle of 3 degrees.

3. The composition of claim 1, wherein said composition further comprises first particles.

4. The composition of claim 3, wherein the first particles are selected from oxides of metalloids, metal oxides, one or more thermoplastics, one or more thermoset plastics, one or more metals, one or more glasses, and/or one or more hollow spheres.

5. The composition of claim 3, wherein the coating resulting from the application of said composition to a planar surface retains its superhydrophobicity after 100-600 Taber abrasion cycles at a 250 g load for a thickness range of 40-85 microns using a CS10 wheel, as judged by the inability of more than 50% of the water droplets applied to the area of the coating subjected to said abrasion cycles to remain on the surface when the planar surface is inclined at an angle of 3 degrees.

6. The composition of claim 1, wherein said polyurethane dispersion comprises third particles.

7. The composition of claim 1, wherein the composition comprises a mixture of polyacrylic urethanes and polycarbonate urethanes.

8. The composition of claim 1, wherein said second particles comprise one or more alkylsilane and/or fluoroalkylsilane groups.

9. The composition of claim 8, wherein said alkylsilane and/or fluoroalkylsilane result from the reaction of silica or metal oxide particles with one or more silanes selected from the group consisting of: a compound of formula I, (tridecafluoro-1,1,2,2-tetrahydrooctyl)silane (SIT8173.0); (tridecafluoro-1,1,2,2-tetrahydrooctyl)trichlorosilane (SIT8174.0); (tridecafluoro-1,1,2,2-tetrahydrooctyl)triethoxysilane (SIT8175.0); (tridecafluoro-1,1,2,2-tetrahydrooctyl)trimethoxysilane (SIT8176.0); (heptadecafluoro-1,1,2,2-tetrahydrodecyl)dimethyl(dimethylamino)silane (SIH5840.5); (heptadecafluoro-1,1,2,2-tetrahydrodecyl)tris(dimethylamino)silane (SIH5841.7); n-octadecyltrimethoxysilane (SIO6645.0); n-octyltriethoxysilane (SIO6715.0); and 3,3,4,4,5,5,6,6,6-nonafluorohexyldimethyl(dimethylamino)silane (SIN6597.4).

10. The composition of claim 9, wherein said second particles are present from about 20 to about 30% by weight.

11. The composition of claim 1, that when dried and cured produces a surface with an arithmetic mean roughness (Ra) of less than about 20 microns.

12. The composition of claim 1, comprising from about 30% to about 50% polyurethanes by weight.

13. The composition of claim 1, wherein said polyurethane dispersion comprises at least one polyester urethane, polyacrylic urethane, and/or polycarbonate urethane composition that when dried and cured produces a coating that has: (a) a modulus at 100% elongation of 1300 psi or greater, and/or (b) an elongation percent at break of 150% or greater.

14. The composition of claim 1, further comprising 30-40, 40-50 or 50-60 g of one or more compatible solvents per 100 g of coating composition.

15. The composition of claim 14, wherein said one or more compatible solvents are VOC-exempt solvents, and wherein said coating composition comprises less than 0.3 pounds per gallon of volatile non-exempt organic compounds.

16. The composition according to claim 15, wherein said one or more VOC-exempt solvents consists of water.

17. A superhydrophobic and oleophobic coating formed by the application of the composition of claim 1.

18. The coating of claim 17, wherein said coating formed on a flat flexible surface can withstand being bent to a right angle around a ¼ inch cylinder greater than about 100 times without loss of hydrophobicity or oleophobicity.

19. A method of coating at least part of a surface comprising the application of a composition of claim 1.

20. A superhydrophobic or superhydrophobic and oleophobic coating formed by the application of the composition of claim 16.

21. A coating composition for the application of superhydrophobic and oleophobic coatings on surfaces comprising:

a water-based polyurethane dispersion (PUD) as a binder, the PUD comprising one or more of a polyester urethane, a polyacrylic urethane and/or a polycarbonate urethane;

about 5 to about 30% by weight of second particles comprising one or more siloxanes, alkyl, fluoroalkyl, or perfluoroalkyl containing moieties;

said composition optionally comprising up to about 26% by weight of third particles;

wherein said coating composition optionally comprises less than 0.3 pounds per gallon of volatile non-exempt organic compounds and 30-40, 40-50 or 50-60 g of one or more compatible solvents per 100 g; and wherein the superhydrophobic and oleophobic coating resulting from the application of said composition to a surface retains its superhydrophobicity after 150-1,400 Taber abrasion cycles at a 1000 g load for a coating thickness range of 25-300 microns, and/or 100-2,500 Taber abrasion cycles at a 250 g load, using a CS10 wheel, as judged by the inability of more than 50% of the water droplets applied to the area of the coating subjected to said abrasion cycles to remain on the surface when the planar surface is inclined at 3 degrees.

22. The coating composition of claim 21, where the one or more compatible solvents comprises 30-40, 40-50 or 50-60 g of water.

23. The composition of claim 21, wherein said composition does not comprise first particles and the coating resulting from the application of said composition to a planar surface retains its superhydrophobicity after 150-800 Taber abrasion cycles at a 1,000 g load, for a thickness range of 25-75 microns, and/or 200-1,400 Taber abrasion cycles at a 250 g load for a thickness range of 25-75 microns, on a planar surface using a CS10 wheel, as judged by the inability of more than 50% of the water droplets applied to the area of the coating subjected to said abrasion cycles to remain on the surface when the planar surface is inclined at an angle of 3 degrees.

24. The coating composition of claim 23, where the one or more compatible solvents comprises 30-40, 40-50 or 50-60 g of water.

25. A coating composition for the application of superhydrophobic coatings on surfaces comprising:

a polyurethane dispersion (PUD) comprising one or more of a polyester urethane, a polyacrylic urethane and/or a polycarbonate urethane; and about 5 to about 30% by weight of second particles comprising one or more siloxanes, and/or one or more alkyl, haloalkyl, fluoroalkyl, or perfluoroalkyl containing moieties;

said composition optionally comprising up to about 26% by weight of third particles;

wherein said coating composition comprises less than 0.3 pounds per gallon of volatile non-exempt organic compounds; and wherein the superhydrophobic coating resulting from the application of said composition to a surface retains its superhydrophobicity after 150-1,400 Taber abrasion cycles at a 1000 g load for a coating thickness range of 25-300 microns, and/or 100-2,500 Taber abrasion cycles at a 250 g load, using a CS10 wheel, as judged by the inability of more than 50% of the water droplets applied to the area of the coating subjected to said abrasion cycles to remain on the surface when the planar surface is inclined at 3 degrees.

* * * * *